US008943785B2

(12) United States Patent
Blickhan et al.

(10) Patent No.: US 8,943,785 B2
(45) Date of Patent: Feb. 3, 2015

(54) AUTOMATED HIGH-THROUGHPUT SEED PROCESSING APPARATUS

(75) Inventors: Roger Blickhan, Des Moines, IA (US); Bruce E. Cadwell, Johnston, IA (US); Joseph L. Glaubitz, Johnston, IA (US); David W. Goldsberry, Linden, IA (US); Michael E. Hartman, Des Moines, IA (US); Kent Hoeppner, Dallas Center, IA (US); James L. Hunter, Littleton, CO (US); Timothy P. Meyer, Des Moines, IA (US); Andrew S. Nickerson, Gothenburg, NE (US); Lyndon J. Schroeder, Urbandale, IA (US); Mark Spicer, Ankeny, IA (US); Timothy J. Wilhelm, Des Moines, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 1108 days.

(21) Appl. No.: 12/544,731

(22) Filed: Aug. 20, 2009

(65) Prior Publication Data

US 2011/0047042 A1 Feb. 24, 2011

(51) Int. Cl.
| B65B 1/30 | (2006.01) |
| B65B 57/20 | (2006.01) |
| A01F 12/50 | (2006.01) |
| A01F 11/00 | (2006.01) |
| G06Q 10/06 | (2012.01) |
| G06Q 30/06 | (2012.01) |

(52) U.S. Cl.
CPC . *A01F 12/50* (2013.01); *B65B 1/30* (2013.01); *B65B 57/20* (2013.01); *A01F 11/00* (2013.01); *G06Q 10/06* (2013.01); *G06Q 30/0607* (2013.01)
USPC ................................. 53/500; 53/501; 53/167

(58) Field of Classification Search
CPC ............ A01F 12/50; B65B 1/30; B65B 57/20
USPC .......................... 53/167, 500, 501; 705/26.25
See application file for complete search history.

(56) References Cited

U.S. PATENT DOCUMENTS

| 2,523,517 | A | * | 9/1950 | Potter .............................. 53/500 |
| RE25,013 | E | * | 7/1961 | Cleveland et al. ............... 53/500 |
| 3,604,432 | A | * | 9/1971 | McCollough ................... 53/500 |
| 3,618,819 | A | * | 11/1971 | Blackburn et al. ............... 53/500 |
| 3,677,437 | A | * | 7/1972 | Haigler ............................ 53/500 |

(Continued)

FOREIGN PATENT DOCUMENTS

EP 1 489 546 A1 12/2004

OTHER PUBLICATIONS

Search Report for International Application No. PCT/US2009/054496 mailed May 10, 2010.

*Primary Examiner* — Stephen F Gerrity
(74) *Attorney, Agent, or Firm* — Pioneer Hi-Bred Int'l

(57) ABSTRACT

An apparatus and method for automated high-throughput processing seed requests or orders includes an autonomous single seed counter and packager which operates by pre-programmed criteria. Optional features can include a thresher, a spiral separator, and a label applicator. A conveyance path, controlled automatically, can move the seed to appropriate and desired stations during the processing while maintaining segregation from subsequent seed being processed. Validation of the seed request matching the sample requested occurs prior to processing and information about the seed to process or having been processed can be derived and stored for further use.

14 Claims, 73 Drawing Sheets

(56) References Cited

U.S. PATENT DOCUMENTS

| | | | |
|---|---|---|---|
| 3,682,303 A | | 8/1972 | Feterl |
| 4,602,716 A | | 7/1986 | Barla-Szbao et al. |
| 4,679,709 A | | 7/1987 | Poitras et al. |
| 4,982,412 A | * | 1/1991 | Gross ............................. 53/500 |
| 5,135,114 A | | 8/1992 | Satake et al. |
| 5,369,940 A | * | 12/1994 | Soloman ......................... 53/500 |
| 5,607,061 A | | 3/1997 | Felden |
| 5,669,511 A | | 9/1997 | Satake et al. |
| 5,733,592 A | | 3/1998 | Wettstein et al. |
| 5,813,542 A | | 9/1998 | Cohn |
| 5,979,252 A | | 11/1999 | Precetti et al. |
| 5,986,230 A | | 11/1999 | Novak et al. |
| 6,093,926 A | | 7/2000 | Mertins et al. |
| 6,248,968 B1 | | 6/2001 | Suzuki et al. |
| 6,705,827 B2 | | 3/2004 | Keller et al. |
| 6,706,989 B2 | | 3/2004 | Hunter et al. |
| 7,290,665 B2 | | 11/2007 | Hunter et al. |
| 7,588,151 B2 | | 9/2009 | Hunter et al. |
| 7,591,374 B2 | | 9/2009 | Hunter et al. |
| 2002/0144458 A1 | | 10/2002 | Hunter et al. |
| 2005/0060958 A1 | * | 3/2005 | Harmon et al. ................. 53/500 |
| 2008/0009962 A1 | * | 1/2008 | Hood et al. .................... 700/213 |
| 2008/0034652 A1 | | 2/2008 | Hunter et al. |
| 2008/0131924 A1 | * | 6/2008 | Cope et al. ................. 435/40.51 |
| 2008/0179226 A1 | * | 7/2008 | Hunter et al. ................. 209/606 |
| 2009/0032441 A1 | * | 2/2009 | Corak et al. .................... 209/3.3 |
| 2011/0132721 A1 | * | 6/2011 | Kevin et al. .................... 198/349 |

\* cited by examiner

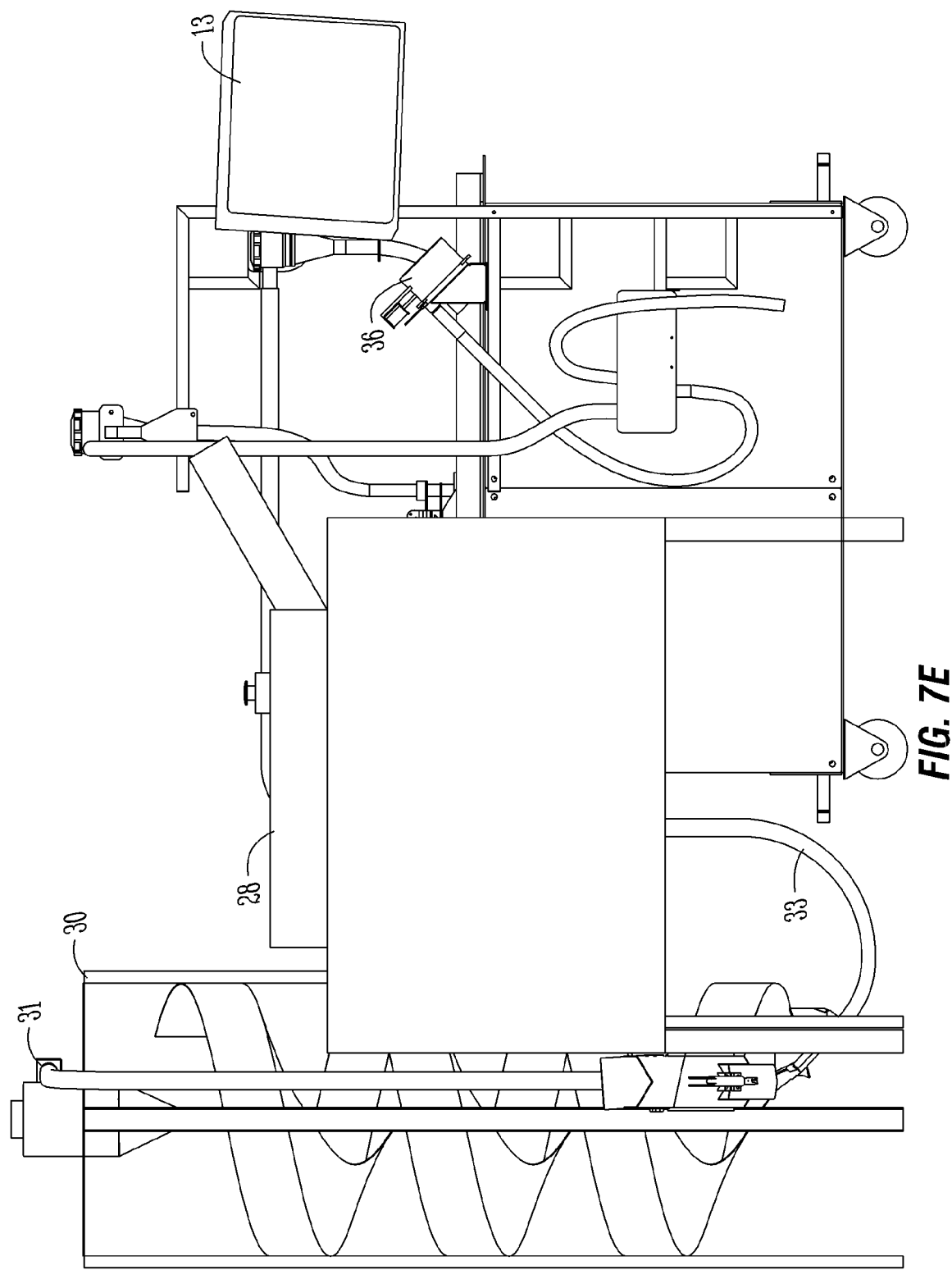

| M.L.BLBR.BR | | | | | | CLEAR COMMENT |
|---|---|---|---|---|---|---|
| SCATCH PAD | | | | | | |
| A | B | C | D | E | F | G | H | PREVIEW COMMENT |
| I | J | K | L | M | N | O | P | UNDO COMMENT |
| Q | R | S | T | U | V | W | X | SAVE COMMENT |
| Y | Z | 1 | 2 | 3 | 4 | CAP | SP | EXIT |
| 5 | 6 | 7 | 8 | 9 | 0 | - | DEL | CLR |

*FIG. 52*

Need new tray - Remove Tray

| Req | Own | Processed | Experiment | Plants | Seeds | EUID | Adv | Comment |
|---|---|---|---|---|---|---|---|---|
| SJ | SJ | MM/DD/YYYY 00:00:00 AM/PM | 3 | 28 | 45 | 41210499 | T | |
| SJ | SJ | MM/DD/YYYY 00:00:00 AM/PM | 3 | 31 | 45 | 41210500 | | |
| HL | SJ | | 6 | 96 | 45 | 41210499 | T | |

REQUESTS

CELL STATUS    MAIN SCREEN

AUTOMATED HIGH-THROUGHPUT SEED PROCESSING APPARATUS

I. BACKGROUND OF THE INVENTION

A. Field of the Invention

The present invention relates to handling seed, and in particular, to the automatic and high-throughput processing of previously harvested plants, plant parts and/or seed used in plant breeding programs and applications.

B. Problems in the Art

As is well known in the art, soybean breeding is an arduous science. The harvesting, handling, and ultimate processing of soybean seed into containers is an exacting and labor intensive process. Strict standards exist with regard to the same. One important part is the harvesting and handling of breeding seeds. Not only is it crucial to keep track of such things as particular characteristics of the seeds (e.g. genotype, inbred identification, where they were grown); each seed and each seed sample must be carefully handled and evaluated, so that there is a high probability the selected seeds will germinate and so that there is no contamination of the seeds. Only those that meet certain criteria (e.g. undamaged, not diseased, correct characteristics) are used for further breeding activities.

For example, breeding, product development, and product characterization/commercialization processes require the production, evaluation, and use of many samples of soybean. Each sample may be taken from one, a few or many soybean plants. Typically, soybean plants are grown to maturity, and then conditioned and processed in the following separate steps: artificially or naturally cured, threshed, the seed cleaned and sized, and then packaged either for replanting or shipment to other locations for yield testing or breeding evaluation. This process must be conducted so that there is no intermingling or cross-contamination of seed samples, and must include a step for removing such things as inert matter, excessively small or large seed, and damaged or diseased seed. This process, from threshing through packaging, is currently substantially manual in nature, and processes samples at the rate of 15-20 samples/person-hour. Each of the steps is usually conducted separately, with non-integrated devices or machinery.

For example, seed samples are conventionally processed as follows. Soybean plants are harvested in the field and then an identifying tag is secured to each plant separately or to a group of bundled plants. The soybean plants are passed through a thresher. The seed is then cleaned using any of a number of different methods ranging from spiral separators and aspirators.

All of these approaches seek to remove non-round, immature or small seed along with any other unwanted plant material and/or debris. The semi-finished seed is then manually inspected and any damaged or diseased beans are removed. The seed is then counted by hand, packaged and shipped to other nurseries for planting.

All of the seed transfers between pieces of equipment occur by hand, the cleaning operation may be performed manually, and the transfer to a package occurs manually. Given that the processing of seed relies heavily on manual processes or intervention, there is always the likelihood of errors or mistakes occurring because of fatigue, operator error, or boredom.

It can therefore be seen that there is a significant need in the art for an improvement in such processing of soybean seed. Similar methods are used to process other types of seed samples. It is therefore a principal object of the present invention to provide an automated high-throughput seed processing apparatus and method which improves over the state of the art. Other objects, features and advantages of the present invention include a seed processing apparatus and method for seed samples which:

(a) provides significant improvement in the time needed to process seeds;
(b) maintains or exceeds quality of current seed processing apparatuses and methods;
(c) reduces labor costs;
(d) reduces errors or mistakes;
(e) can be substantially or completely automated;
(f) is flexible, can be varied according to need, and allows integration of a plurality of seed processing functions;
(g) provides good discrimination between desirable and undesirable seed;
(h) allows for accurate tracking and identification during and after processing of the seed;
(i) is economical and efficient;
(j) is durable;
(k) allows non-destructive, careful handling of seed;
(l) allows communication between those that need to use the seed and the processing of the samples to assist in the efficiency and intelligence of a wider system involving use of the seed;
(m) can include automatic notification or communication of intelligence about the processing and the seed to those wanting or needing to know such information;
(n) allows for automated or machine assisted decisions to assist in efficiency and accuracy of the seed processing;
(o) is integratable with a number of functions or processes to reduce labor, expense, time and errors in processing seed; and
(p) provides accurate counts of seed processed to ensure accuracy in post processing functions and processes, such as planting.

These and other objects, features, and advantages of invention will become more apparent with reference to the accompanying specification and claims.

II. SUMMARY OF THE INVENTION

An apparatus for automated processing of sets of seed for use in plant breeding programs is disclosed. The apparatus includes an identification system for matching identity of previously harvested seed with seed requests, a single seed counting system for autonomously quantifying sets of seed to fill seed requests, and a packaging system providing separation of one set of quantified seed from other sets of quantified seed. A possible feature of the invention includes a separation system for autonomously separating seed from unwanted plant parts, a sorting system for autonomously sorting seed based on characteristics automatically non-destructively sensed from the seed, and a conveyance system for communicating seed through the system to packaging.

In another aspect of the present invention, a seed processing apparatus providing automated submission and filling of seed delivery requests is disclosed. The apparatus includes a seed identification means matching identity of previously harvested seed with seed delivery requests, a seed sorting means autonomously separating and sorting seed from unwanted seed and/or plant parts based on distinguishing characteristics automatically non-destructively sensed, a single seed counting means quantifying sets of seed from retained seed, and a seed packaging means compartmentalizing sets of seed from subsequent sets of quantified seed with packaging for delivery to a seed requesting location. Optionally, the seed identification means may include a reader for perceiving an identifier associated with the plant, plant part, or a tag associated with the plant or plant part, the seed sorting means may include a thresher and/or spiral separator, the single seed counting means include a disc with apertures providing singulation of seed within each aperture for quantification, and the seed packaging means includes a shuttlable nozzle moveable in cooperation with the seed packaging.

A method providing automated submission and filling of seed delivery requests for facilitating plant breeding programs is also disclosed. The method includes the matching identity of previously harvested seed with requested seed at seed processing location and processing the seed request by (a) distinguishing desired seed from unwanted seed and/or plant parts, (b) autonomously counting sets of seed from kept seed by single seed quantification, and (c) isolating quantified sets of seed by packaging commensurate with each seed request.

An automated process for submitting and filling seed delivery requests using a seed processing system is also disclosed. The system includes a seed delivery requesting step logging a seed delivery request with the seed processing system, a seed matching step cross-checking identity of previously harvested seed against seed in seed delivery request to identify matches, a seed counting step autonomously singling seed into sets of quantified seed, and a seed packing step compartmentalizing sets of quantified seed by packaging within a container.

The apparatus, method and process can be substantially automated and can condition one seed request at a time from start to finish, or condition multiple seed requests serially. Still further automated functions can be added. The seed processing system and the derived information can be used in a substantially automated system of processing seed samples and administrating an inventory of a plurality of seed samples; validating requests for certain seed samples, confirming and maintaining purity and identification of seed requests, and packaging and preparing seed requests for shipment to requesting location(s).

III. BRIEF DESCRIPTION OF THE DRAWINGS

FIG. 1 is a diagrammatic view of a system according to a preferred embodiment of the invention.

FIGS. 2A-C is a flow chart of a method according to a preferred embodiment of the invention.

Figure 5A:
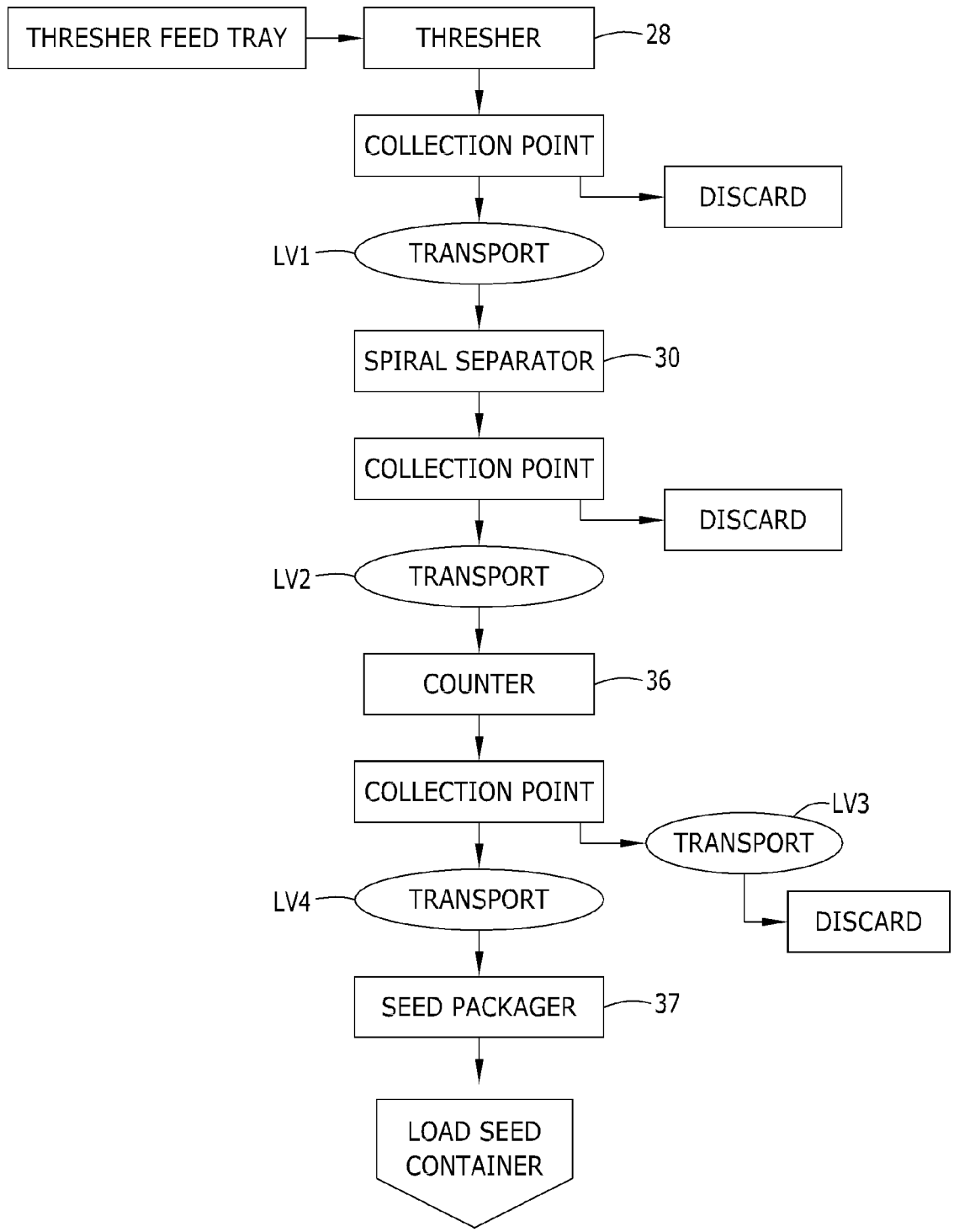
Figure 5B:
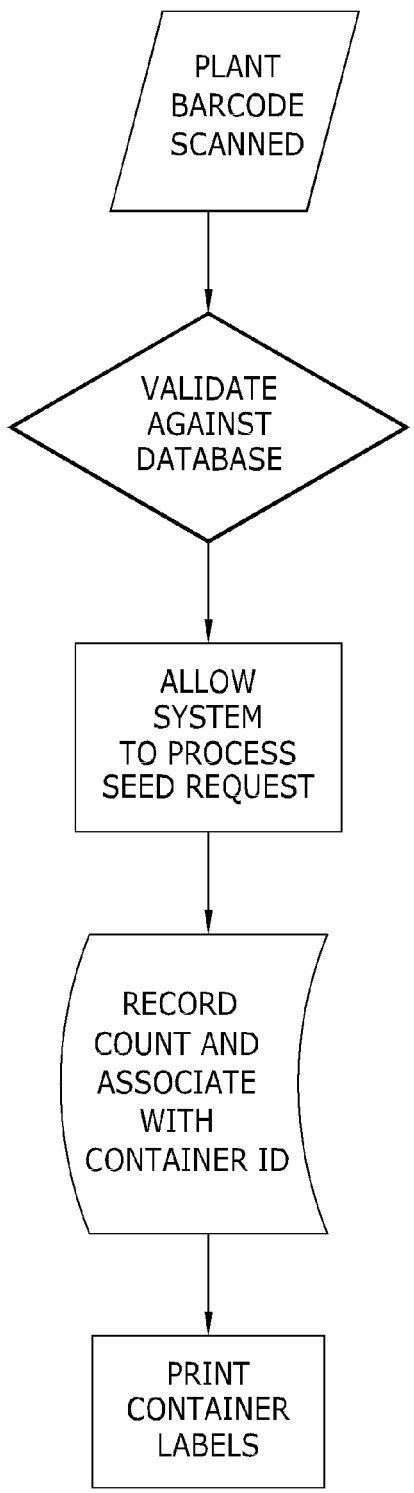

FIGS. 5A and B is a diagram illustrating the parallel relationship between seed processing and information processing according to an embodiment of the present invention.

Figure 1:
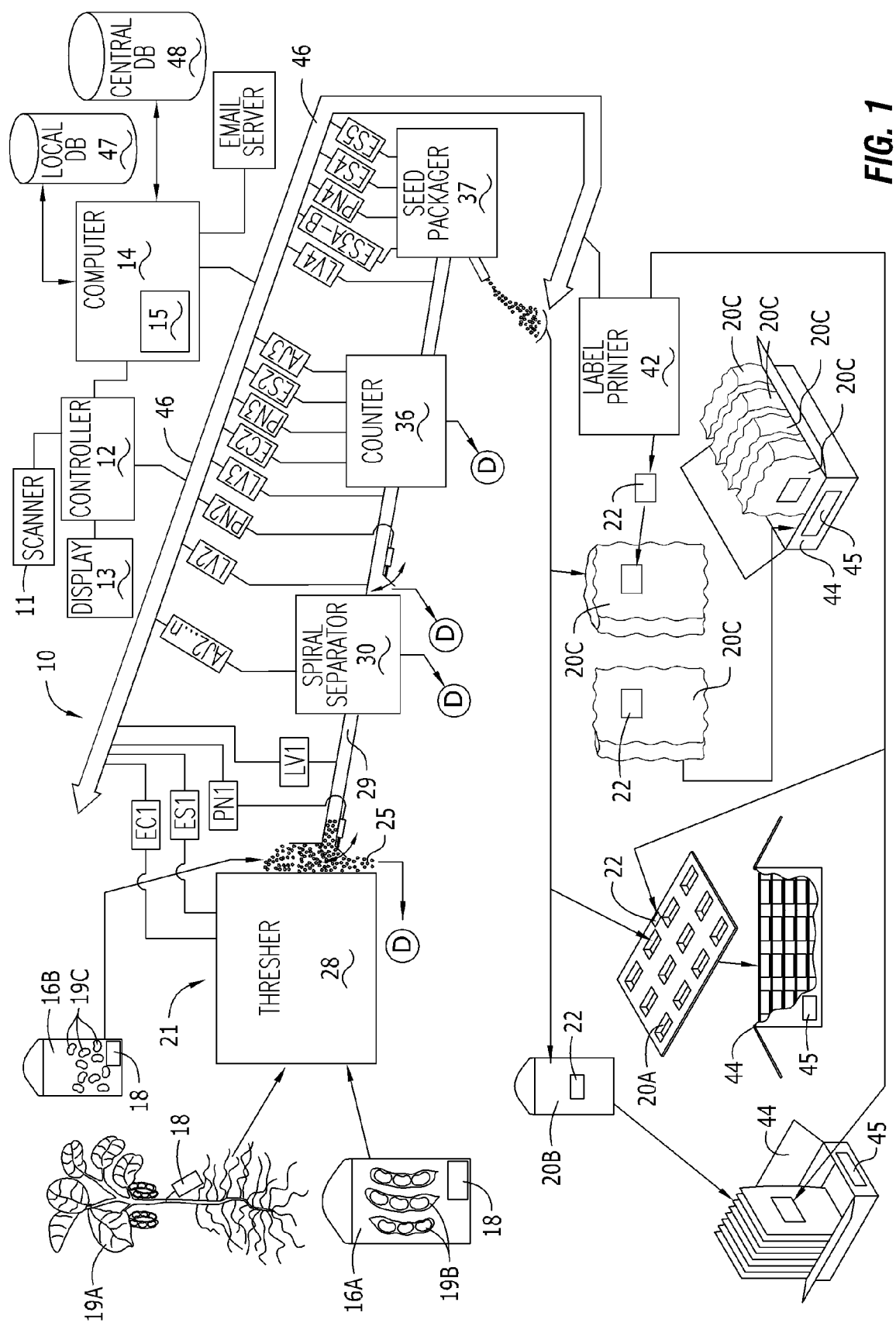
Figure 6:
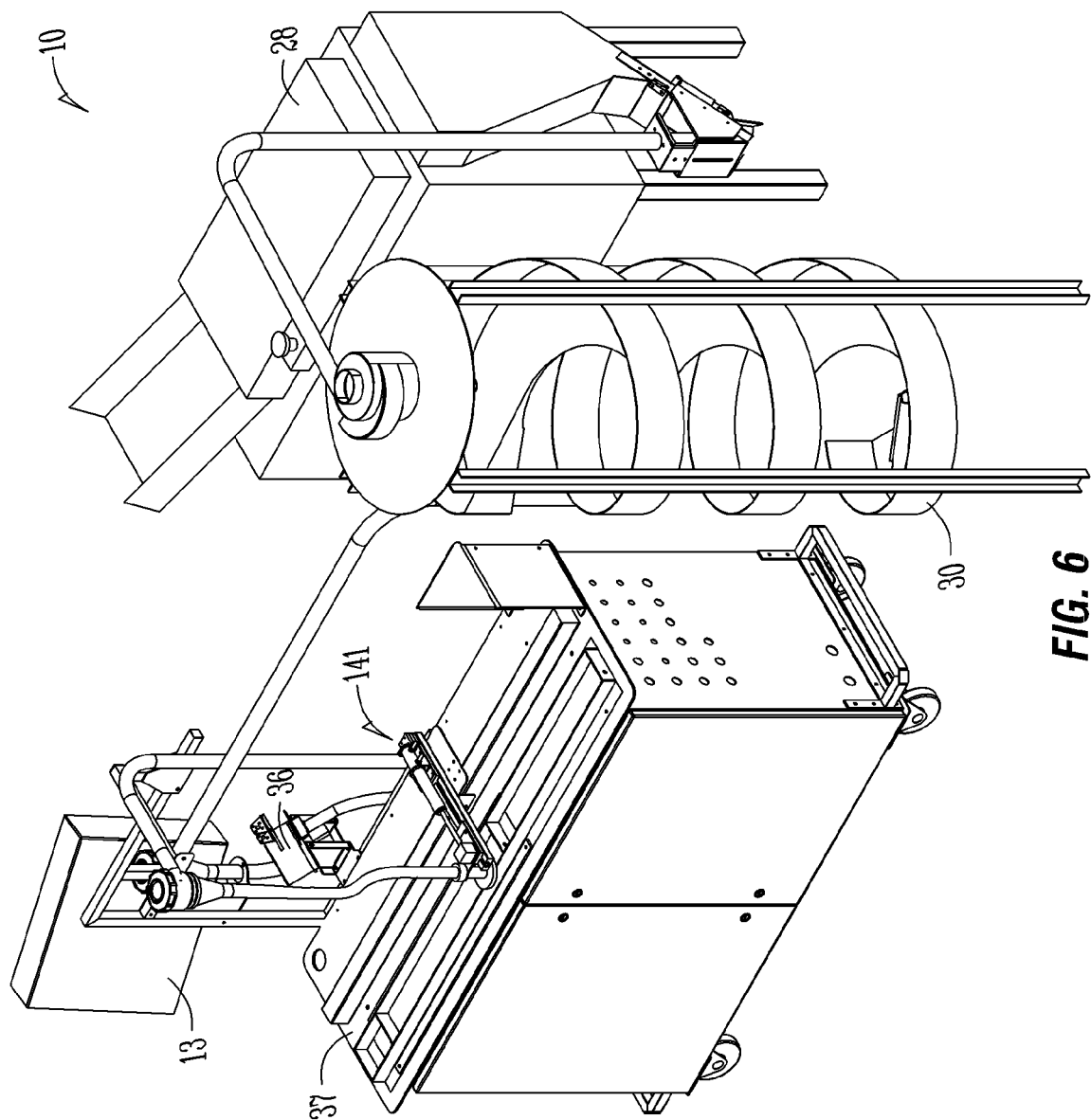

FIG. 6 is a perspective view of an embodiment of the system of FIG. 1.

Figure 7A:
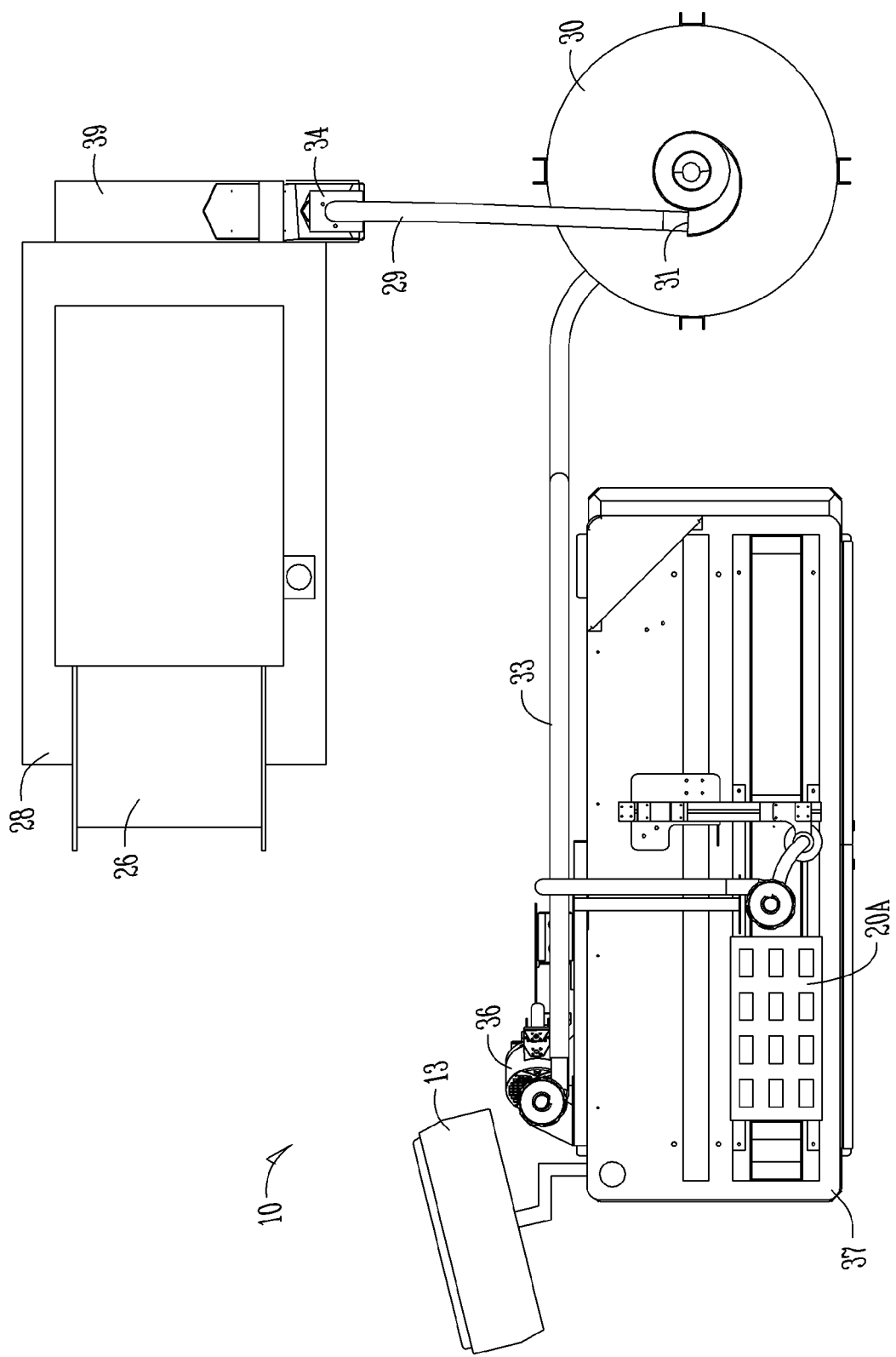

FIG. 7A is a top plan view of FIG. 6.

Figure 7B:
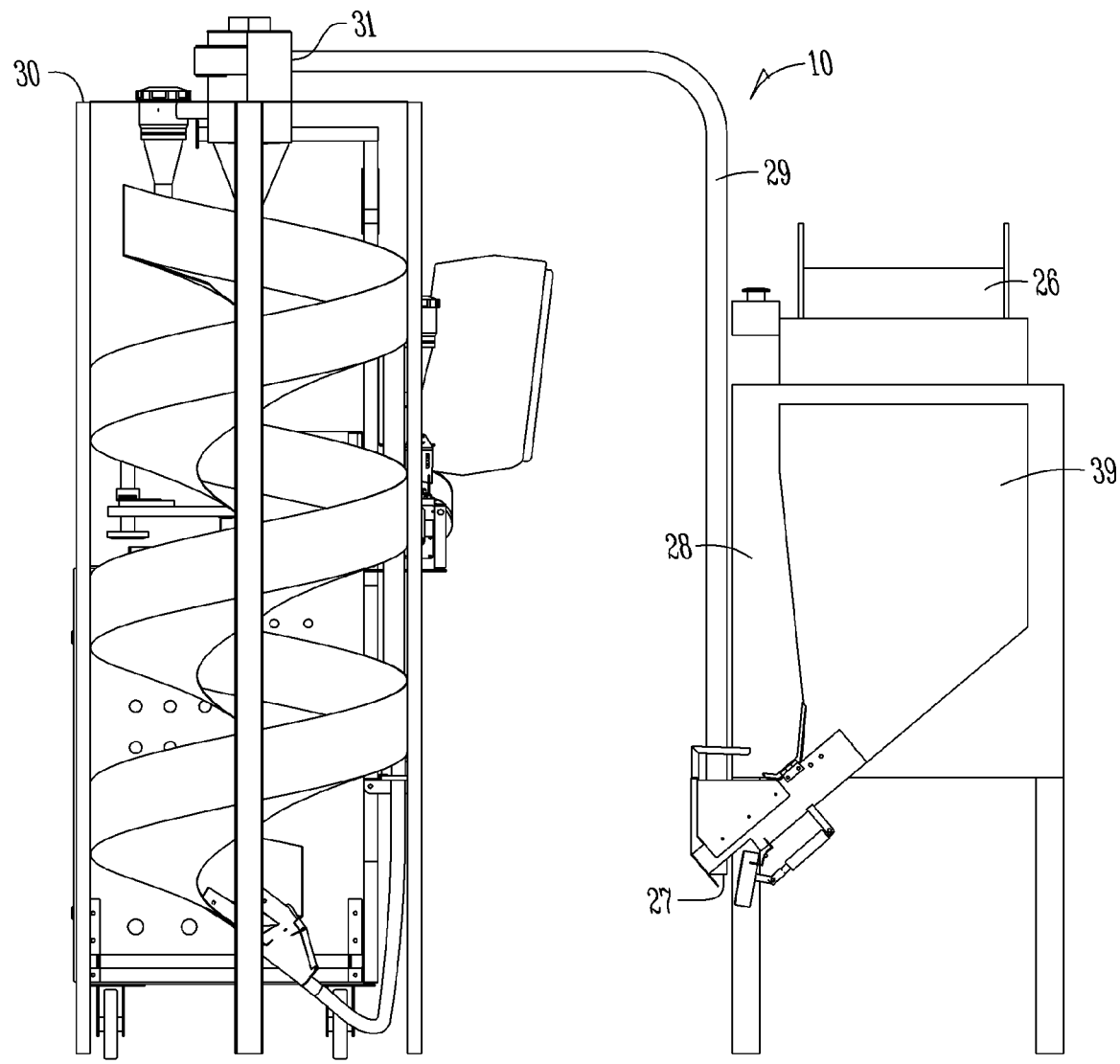

FIG. 7B is a right side elevation view of FIG. 7A.

Figure 7C:
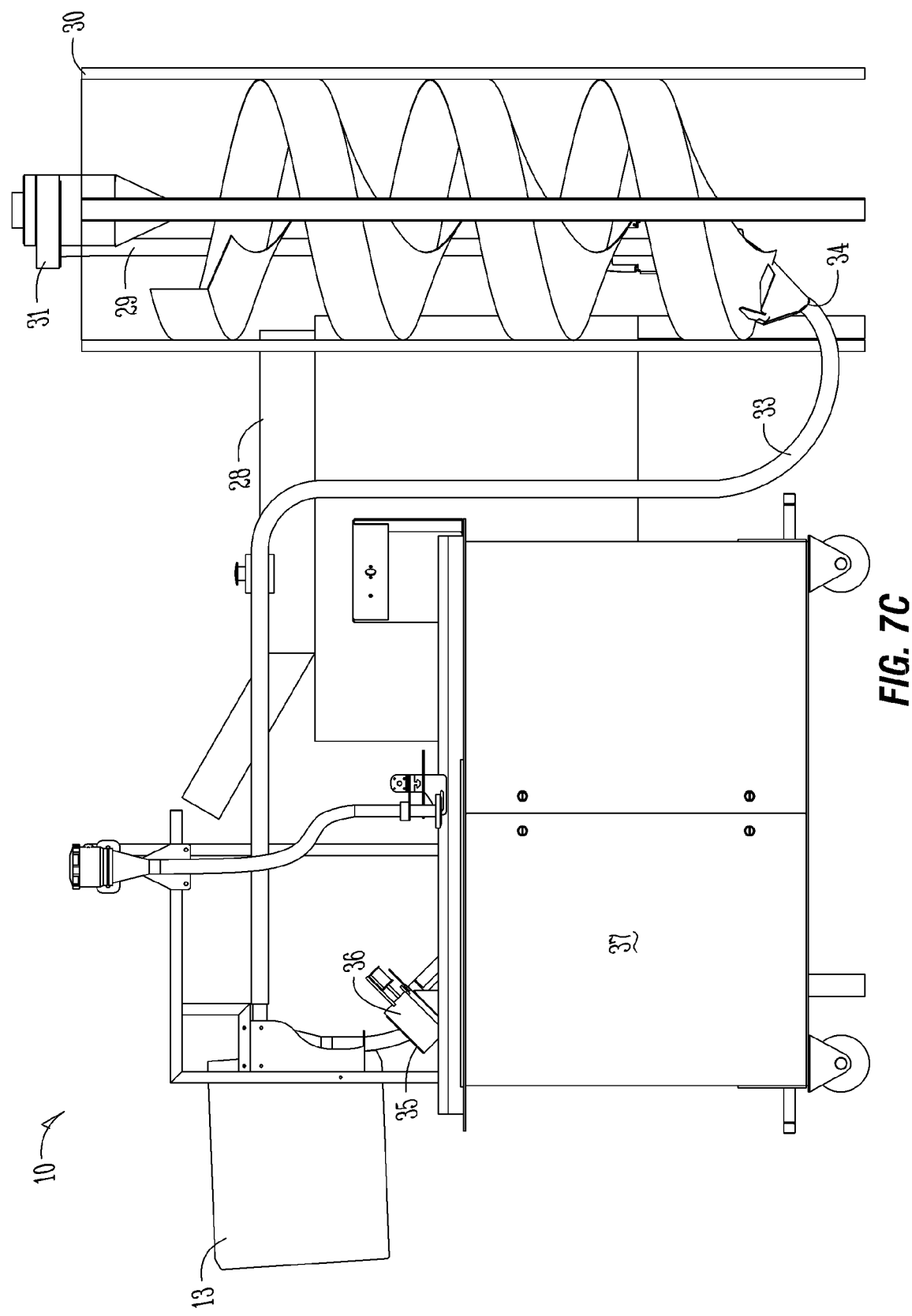

FIG. 7C is front elevation view of FIG. 7A.

Figure 7D:
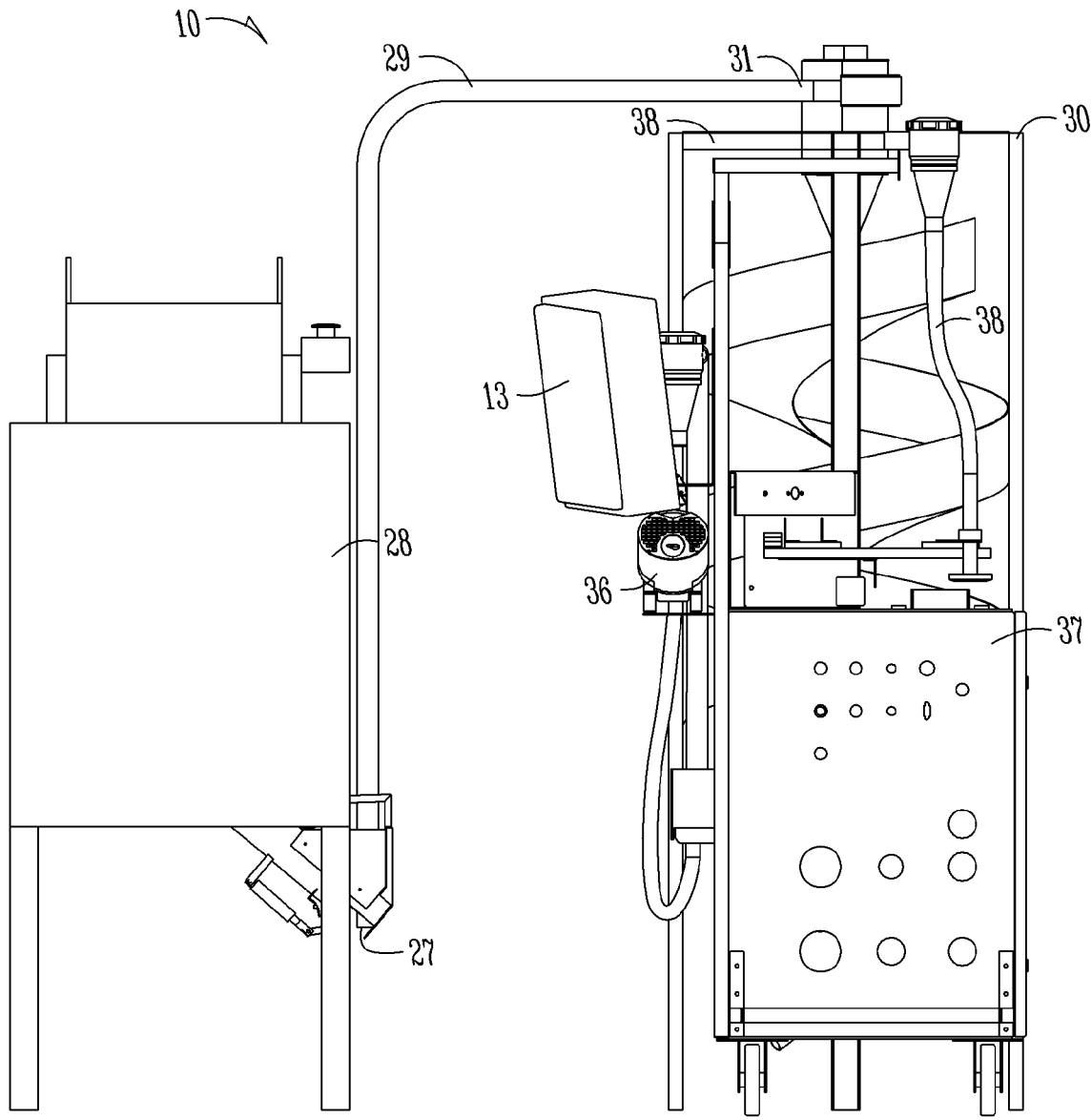

FIG. 7D is a left side elevation view of FIG. 7A.

FIG. 7E is a back side elevation view of FIG. 7A.

Figure 8:
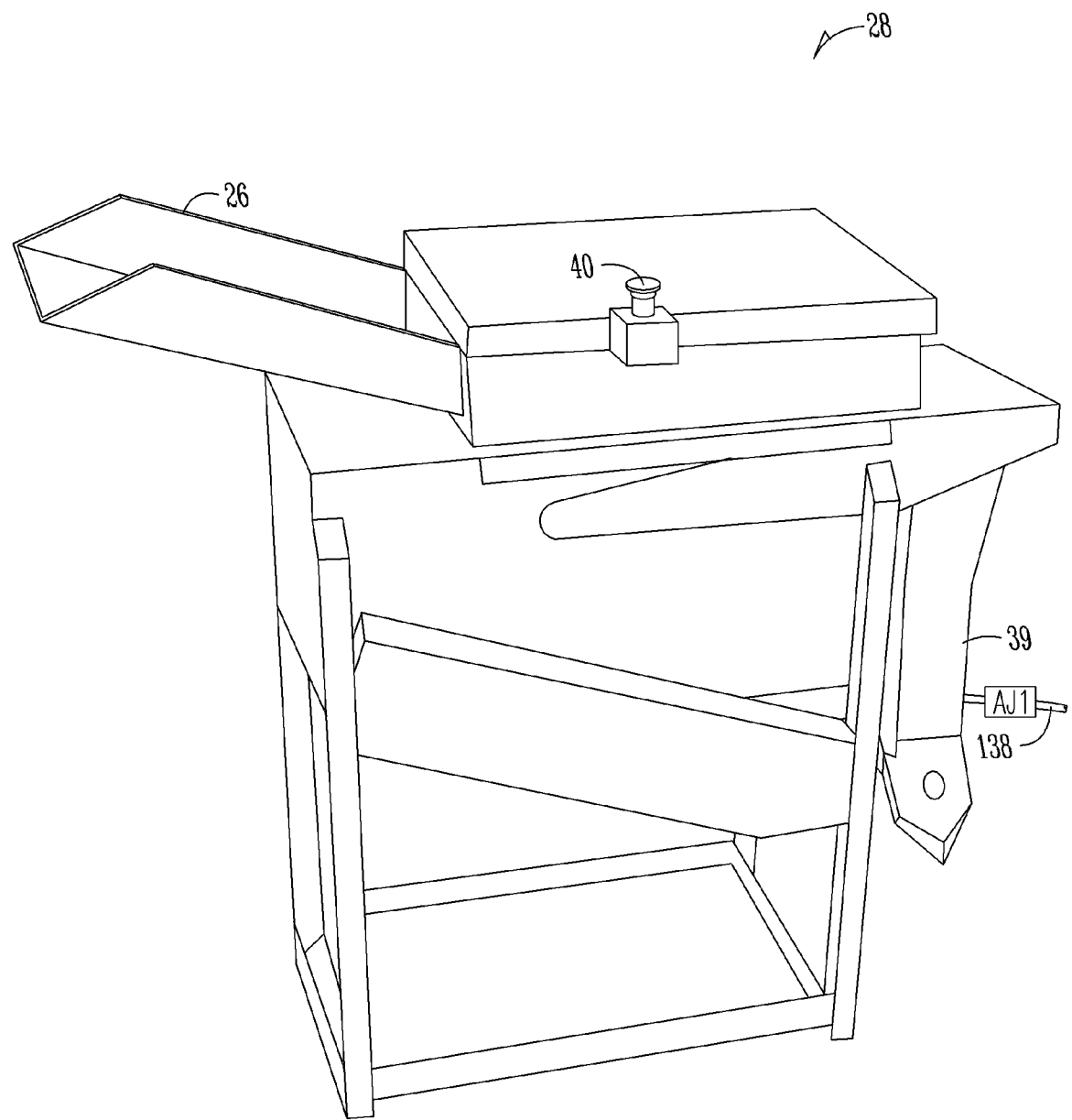

FIG. 8 is a perspective view of an embodiment of a commercially available thresher of the system of FIG. 1.

Figure 9:
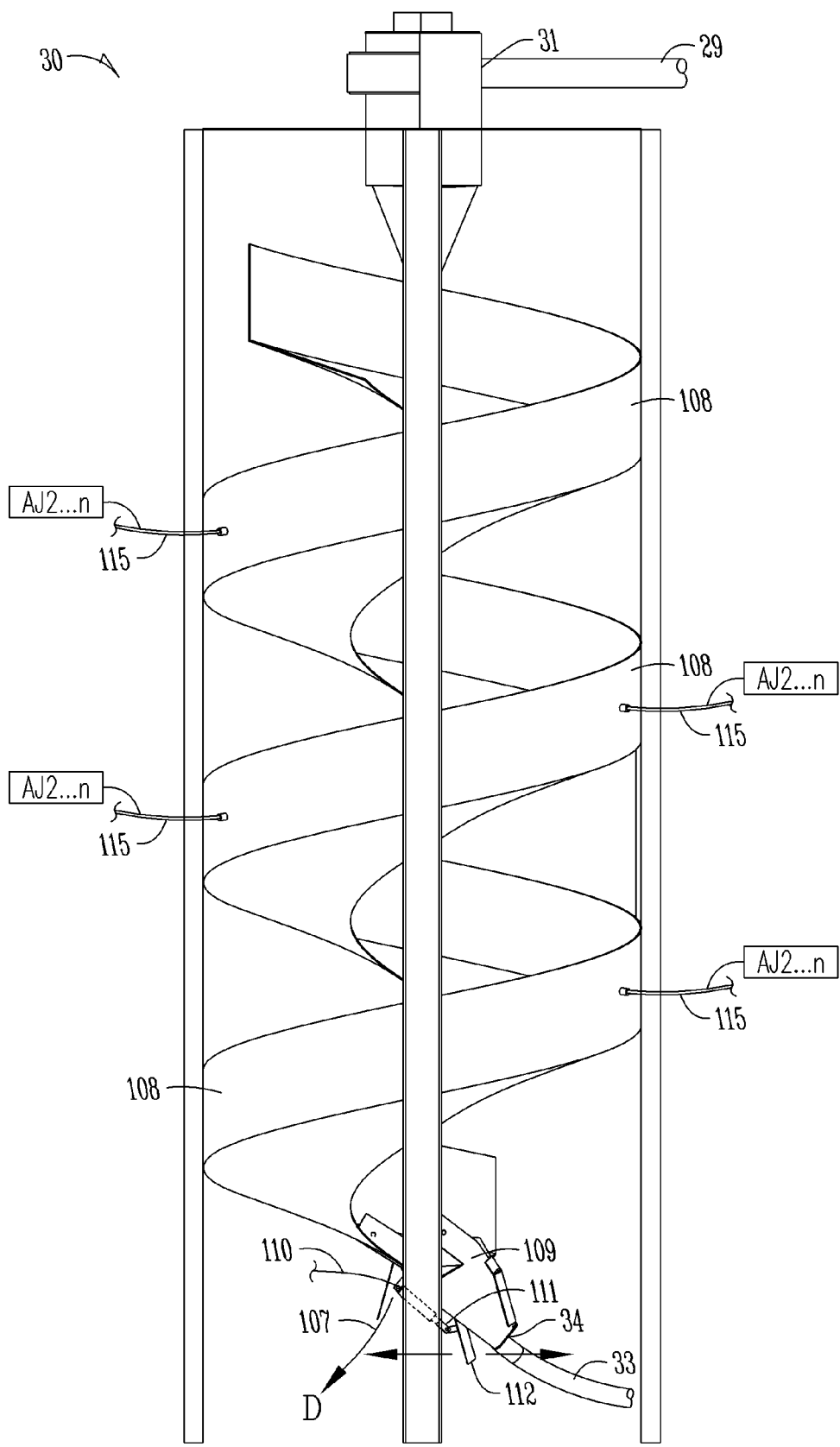

FIG. 9 is an elevation view of an embodiment of a commercially available spiral separator of the system of FIG. 1.

Figure 10:
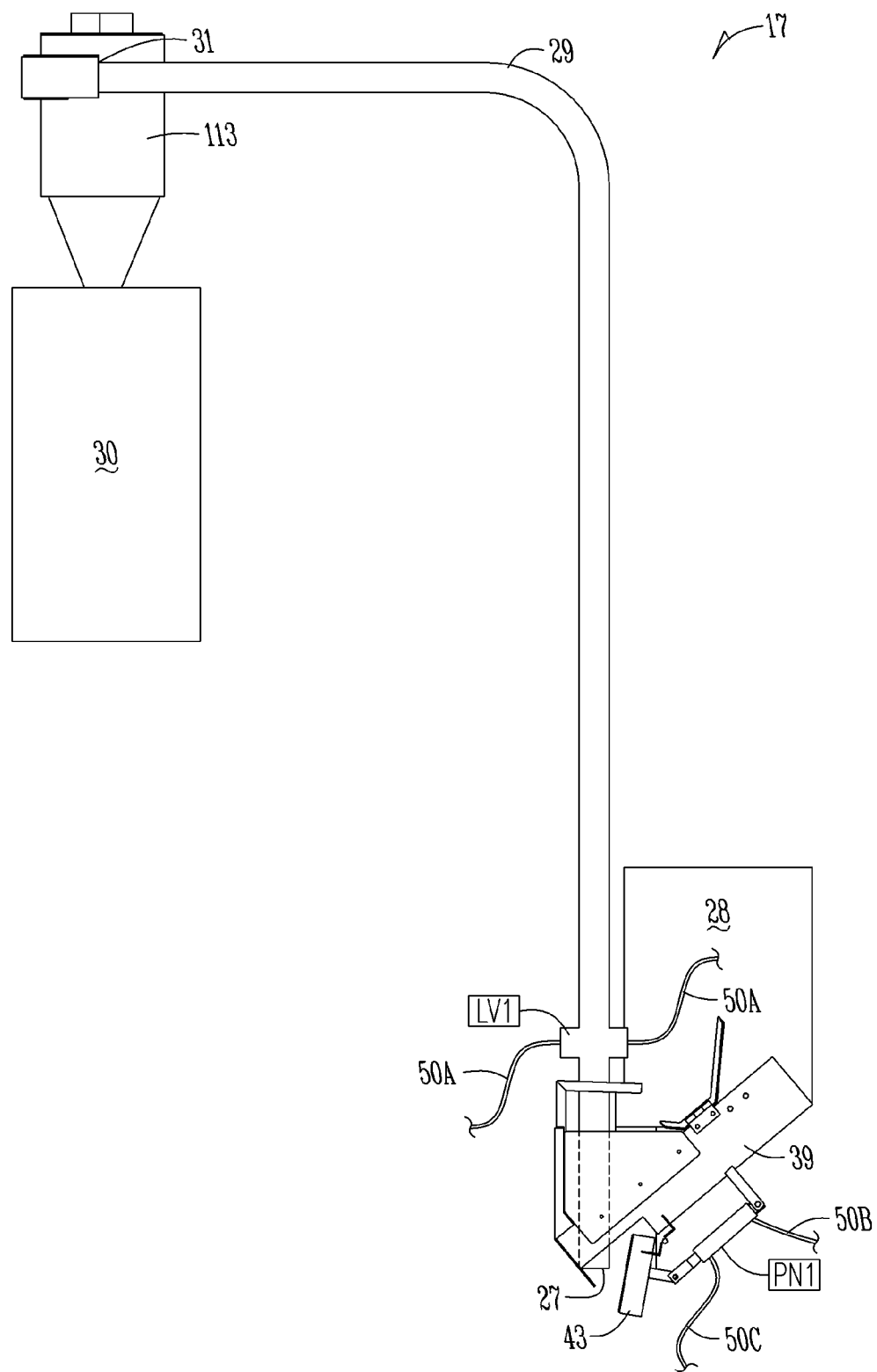

FIG. 10 is an elevation view of the seed conveyance path between the between the thresher shown in FIG. 8 and the spiral separator shown in FIG. 9.

Figure 11A:
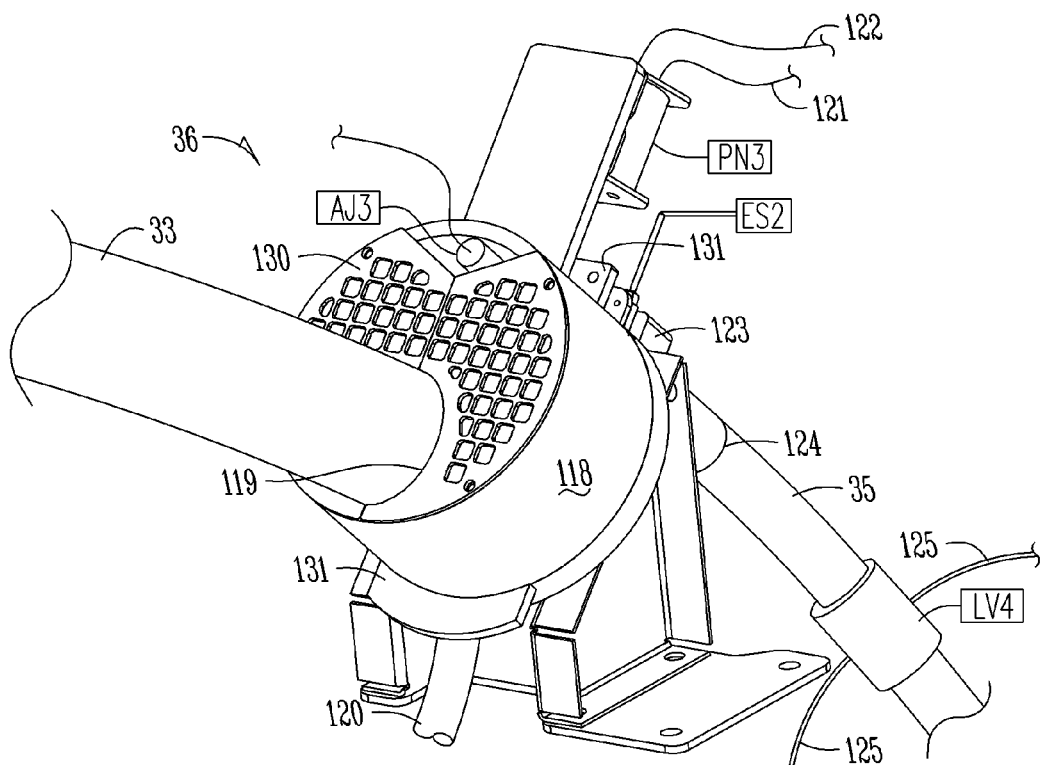

FIG. 11A is a perspective view of an embodiment of the seed counter system of FIG. 1.

Figure 11B:
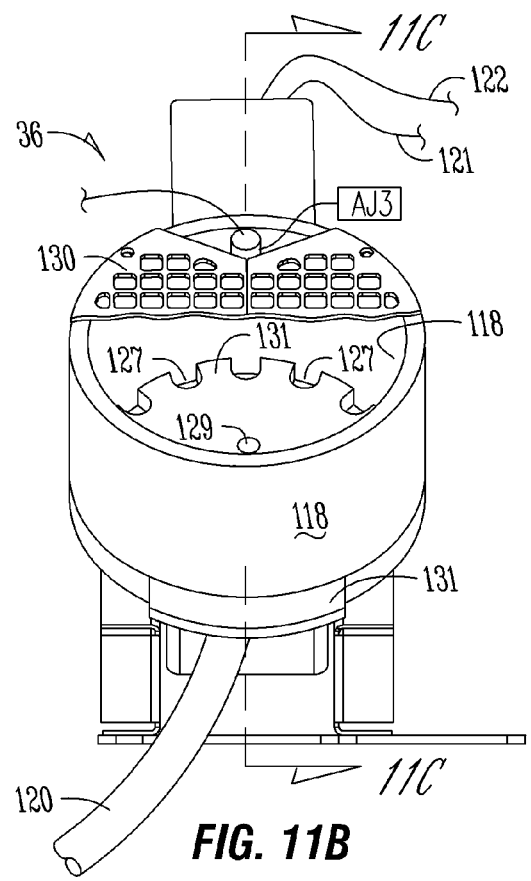

FIG. 11B is an elevation view of the seed counter system shown in FIG. 11A.

Figure 11C:
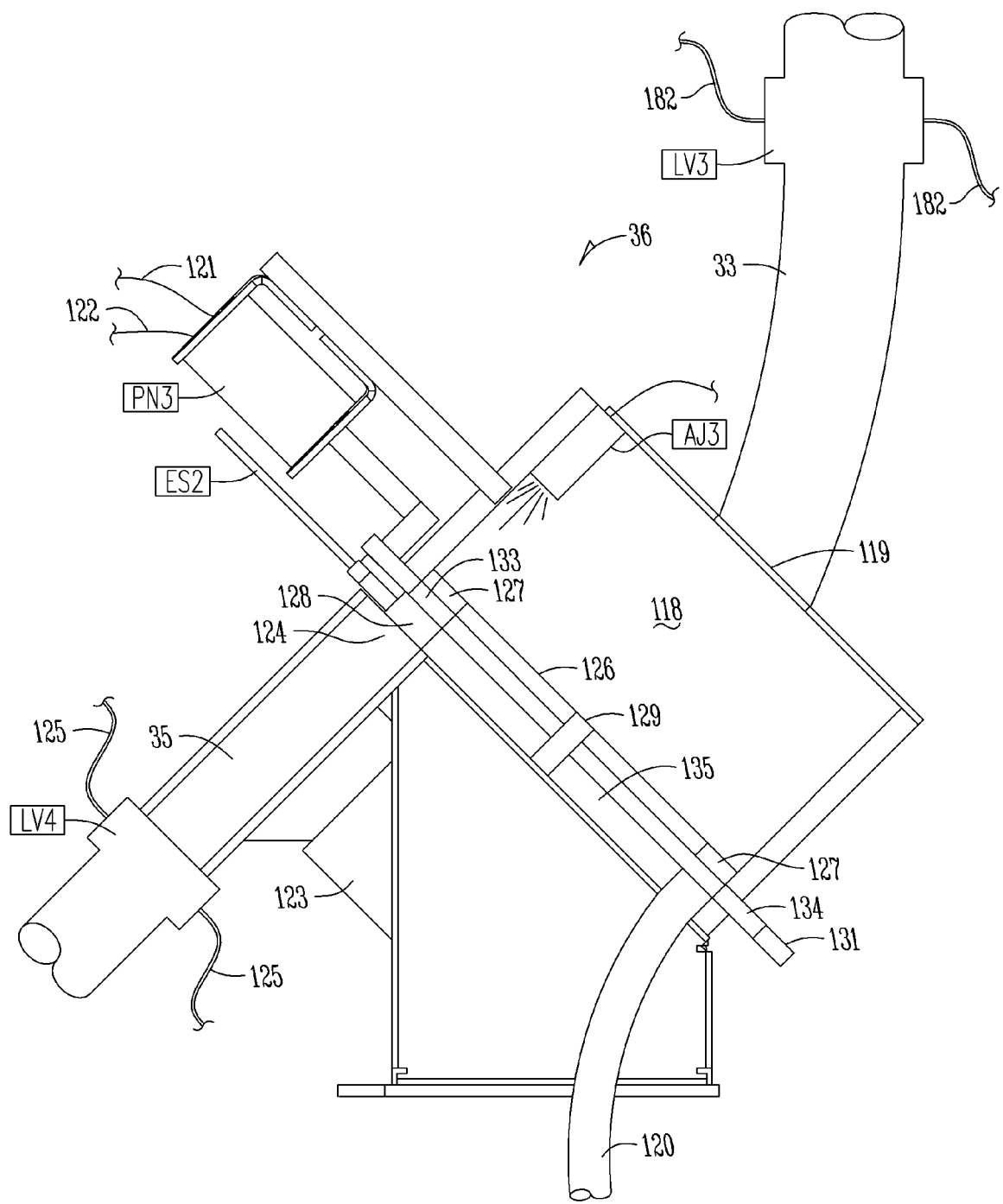

FIG. 11C is a sectional view taken along line 11C-11C in FIG. 11B.

Figure 11D:
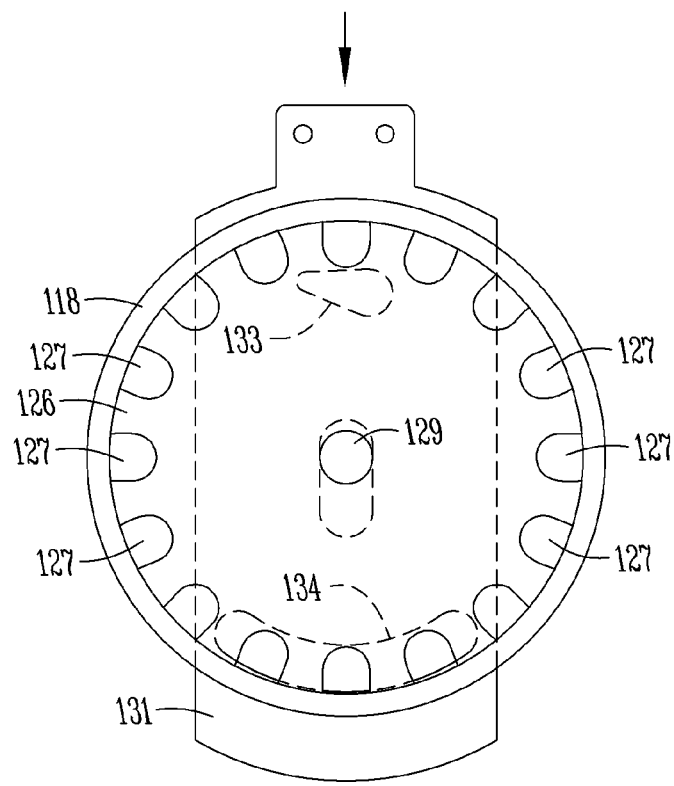

FIG. 11D is an elevation view of one operational position of the seed counter shown in FIG. 11C.

Figure 11E:
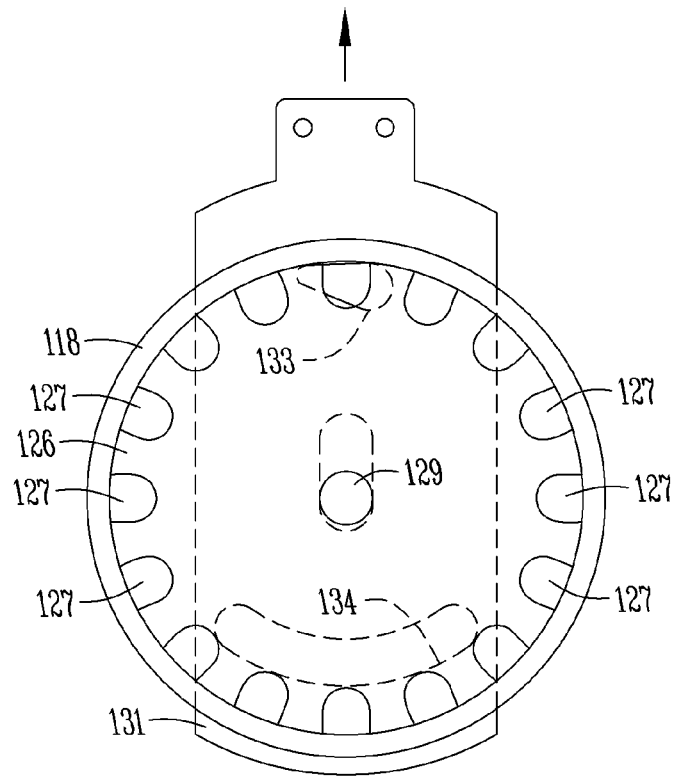

FIG. 11E is an elevation view of another operational position of the seed counter shown in FIG. 11E.

Figure 12:
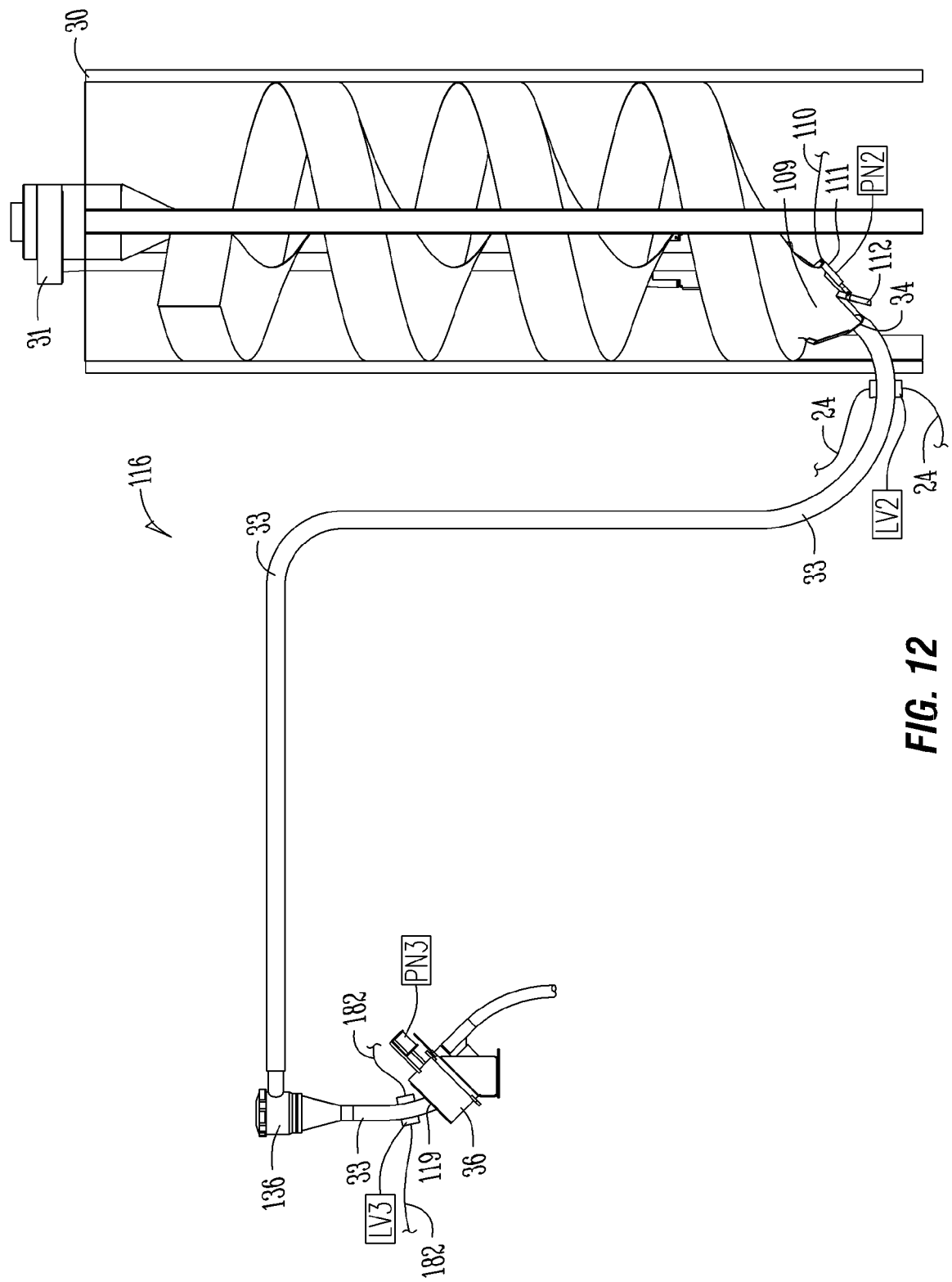

FIG. 12 is an elevation view of the seed conveyance path between the spiral separator shown in FIG. 9 and the seed counter system shown in FIG. 11A-E.

Figure 13A:
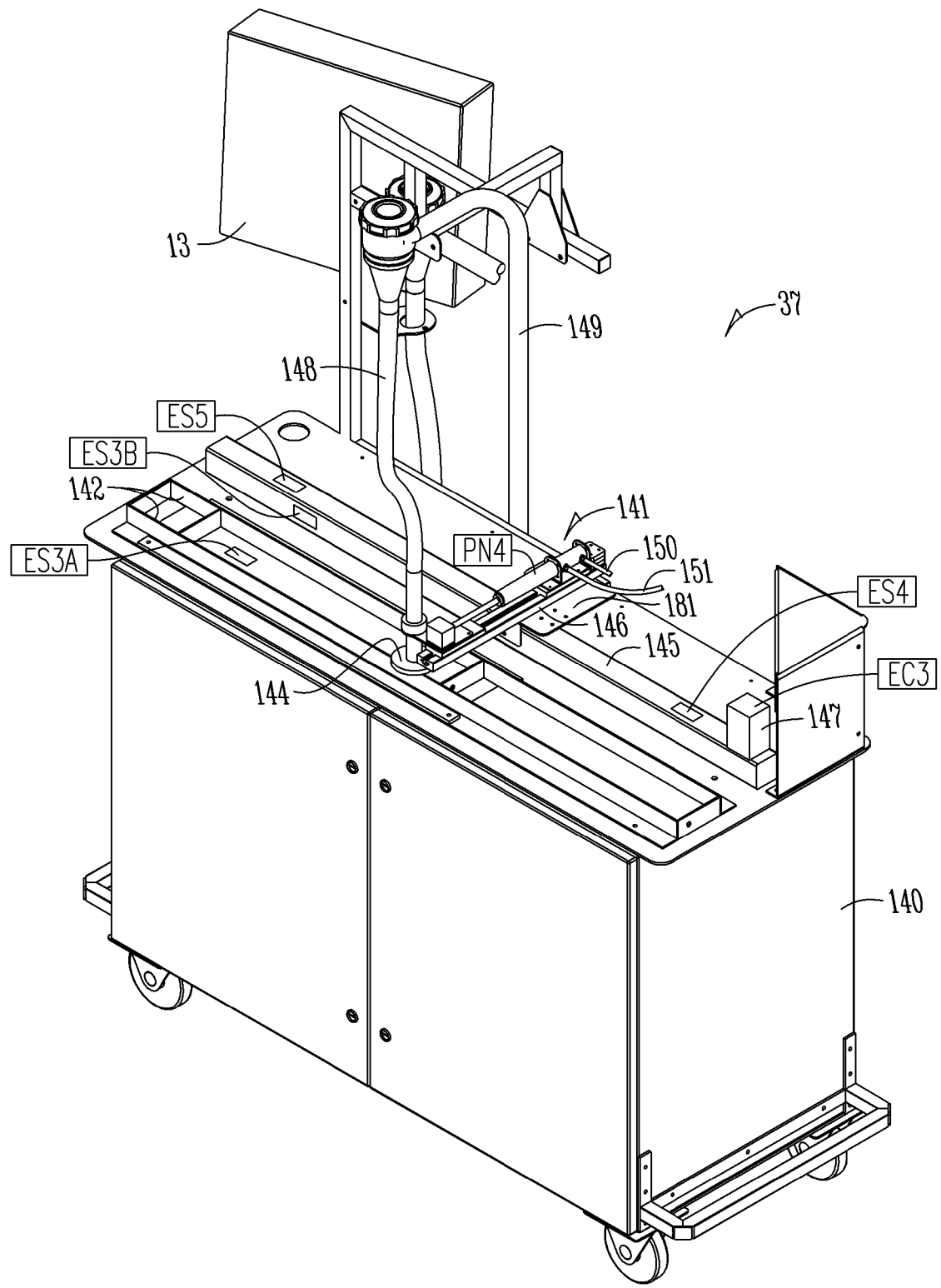

FIG. 13A is a perspective view of the seed packager system of FIG. 1.

Figure 13B:
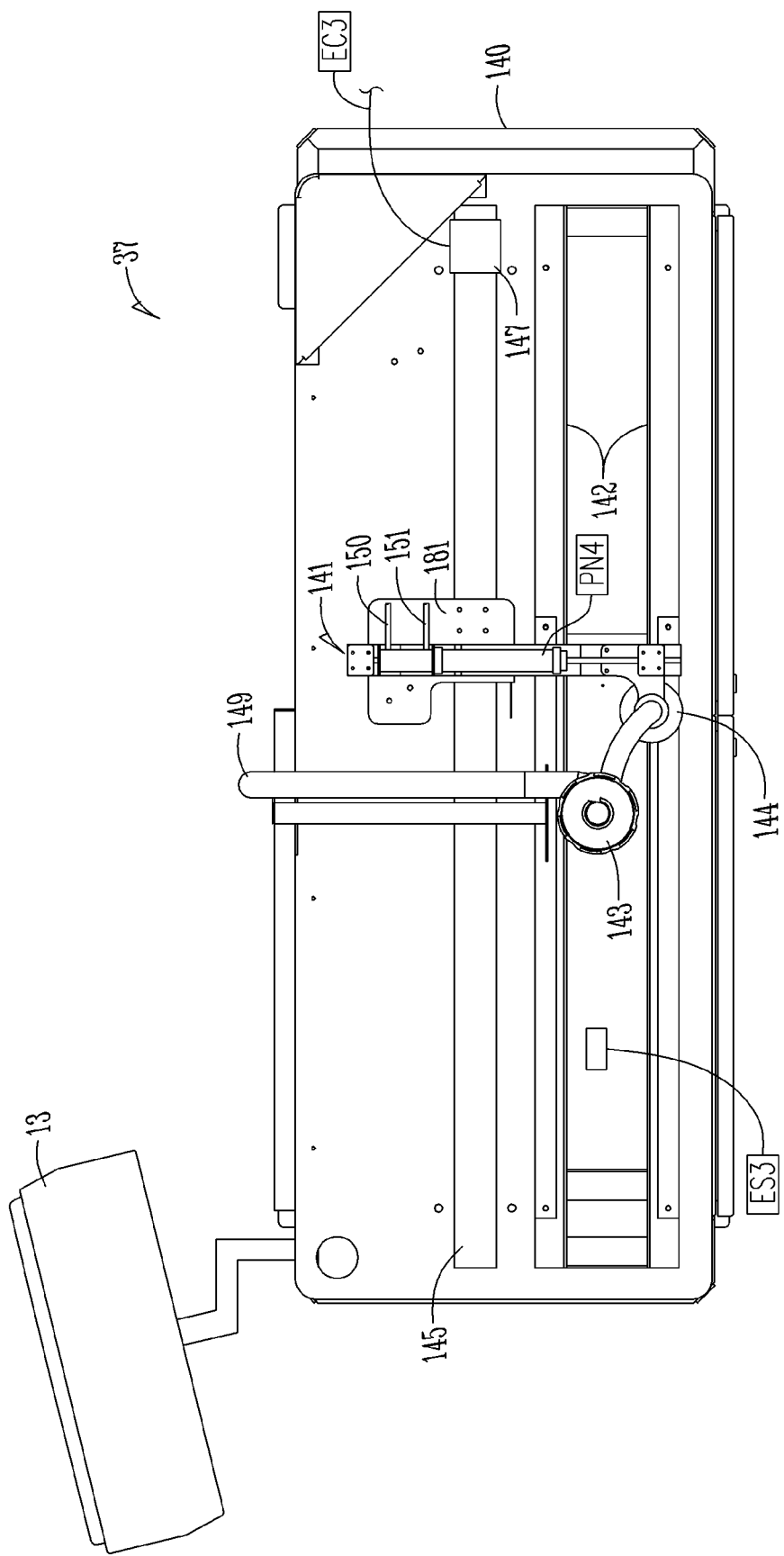

FIG. 13B is a top plan view of FIG. 13A.

Figure 13C:
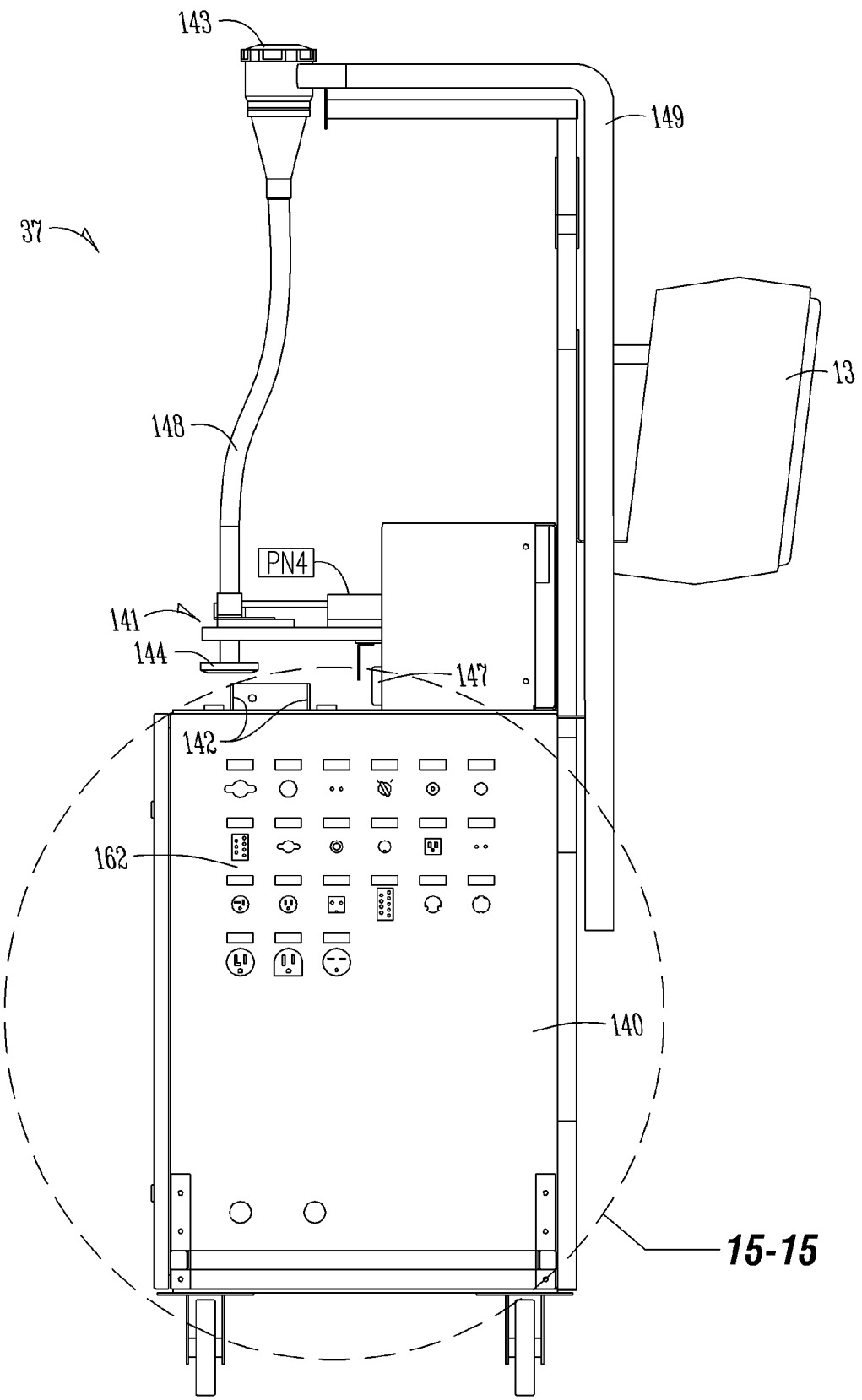

FIG. 13C is an end elevation view of FIG. 13B.

Figure 13D:
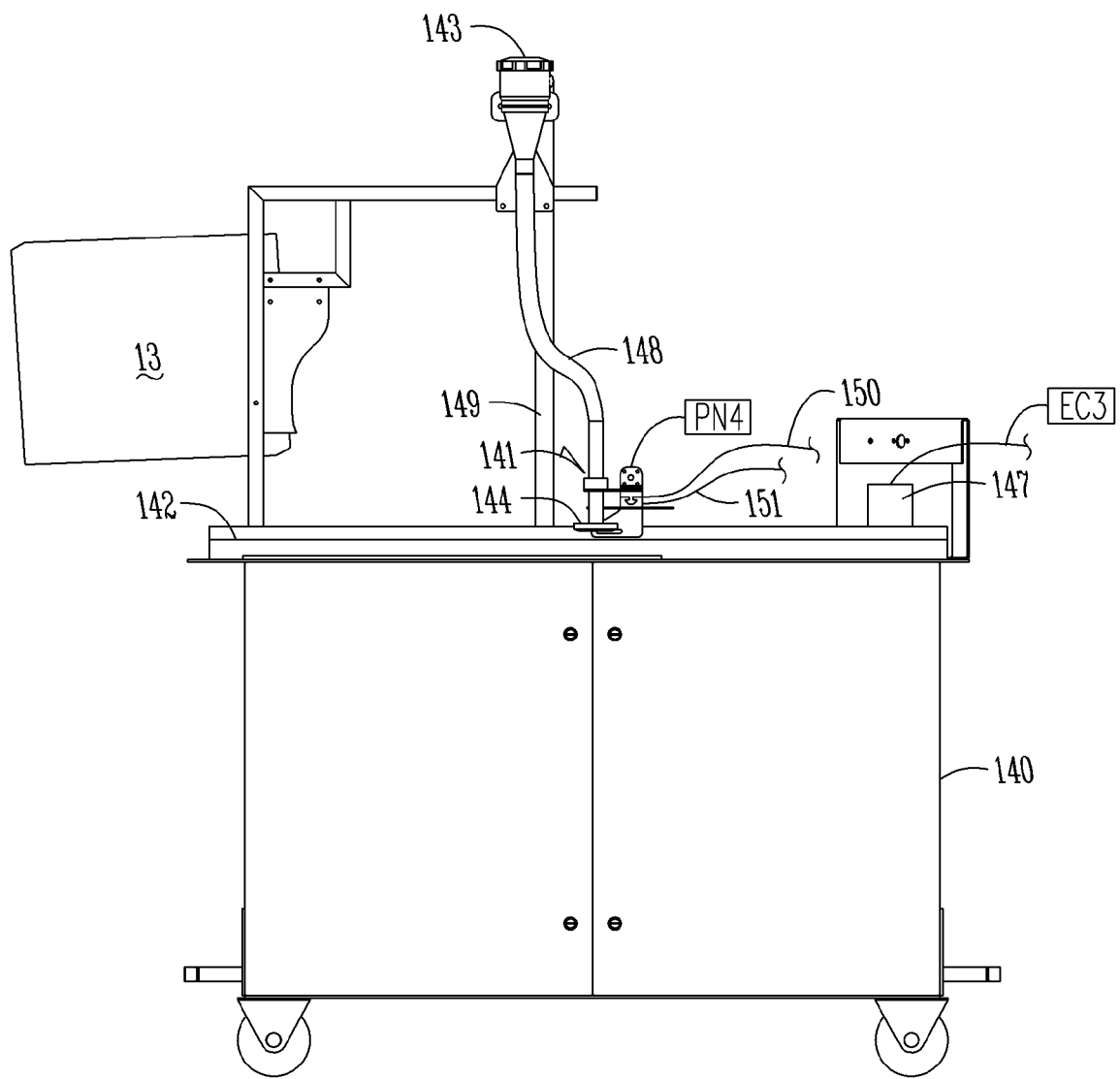

FIG. 13D is a front elevation view of FIG. 13C.

Figure 13E:
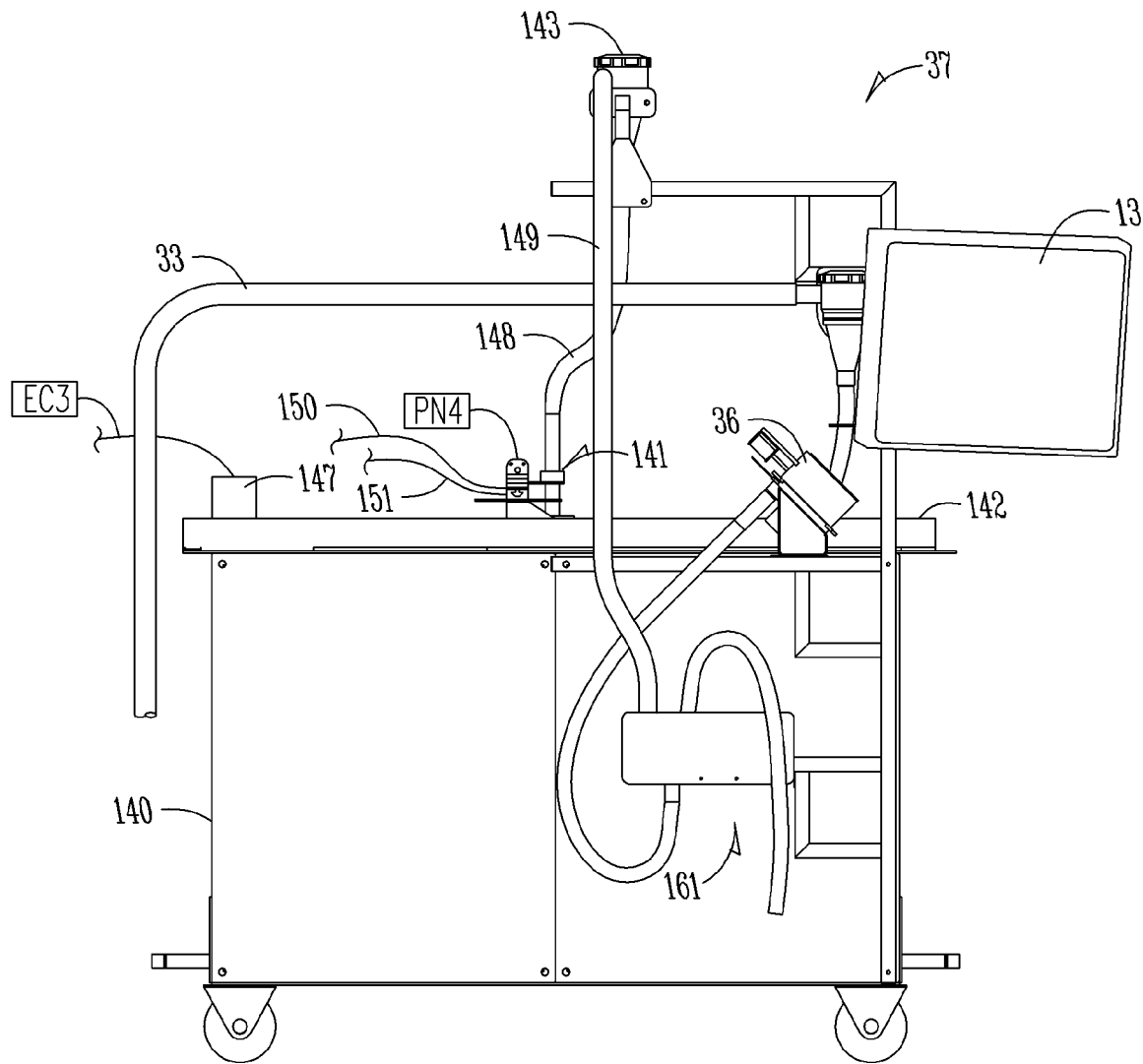

FIG. 13E is a back elevation view of FIG. 13D.

Figure 14A:
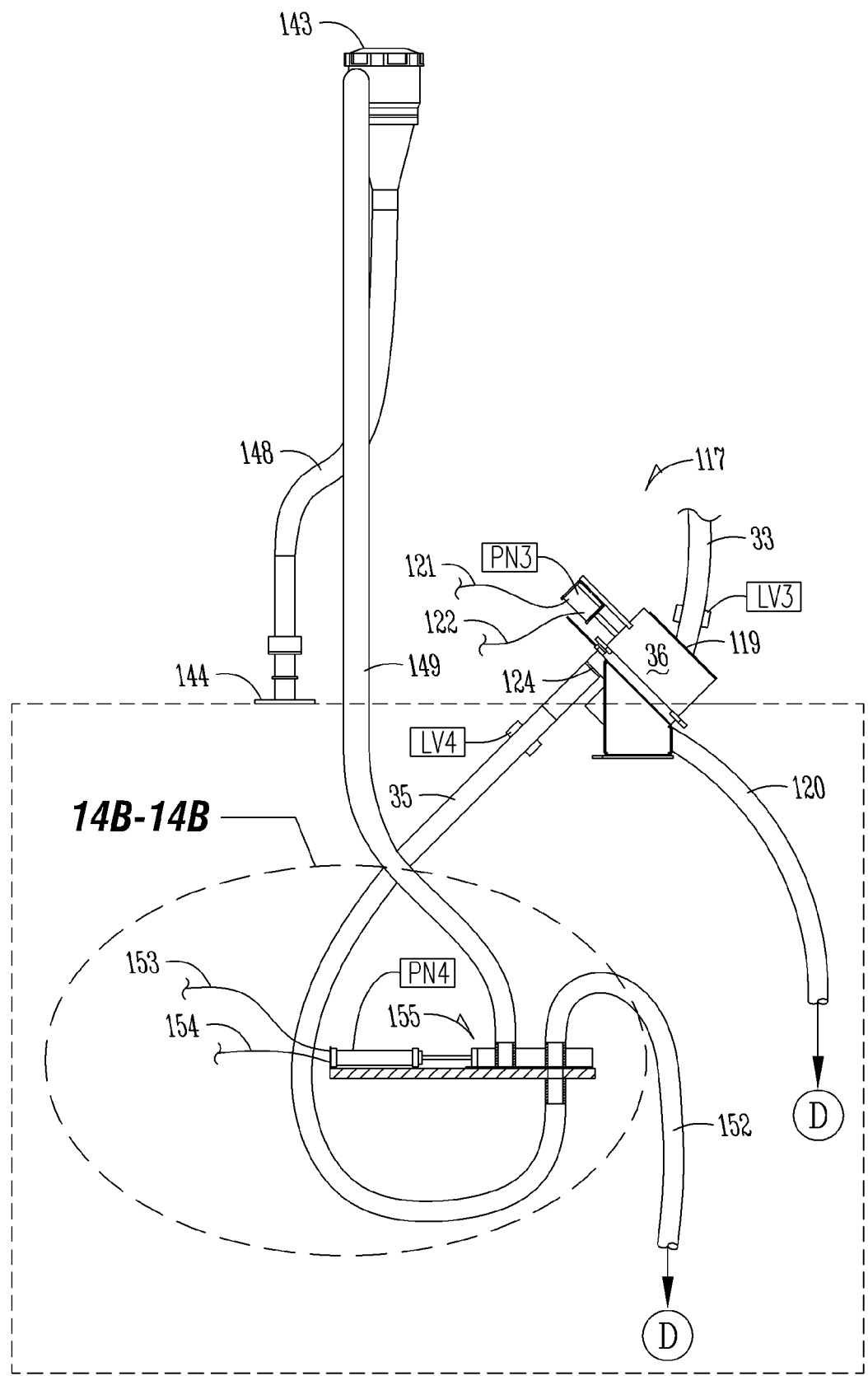

FIG. 14A is an elevation view of the seed conveyance path between the seed counter system shown in FIG. 11A-E and the seed packager system shown in FIG. 13A-E.

Figure 14B:
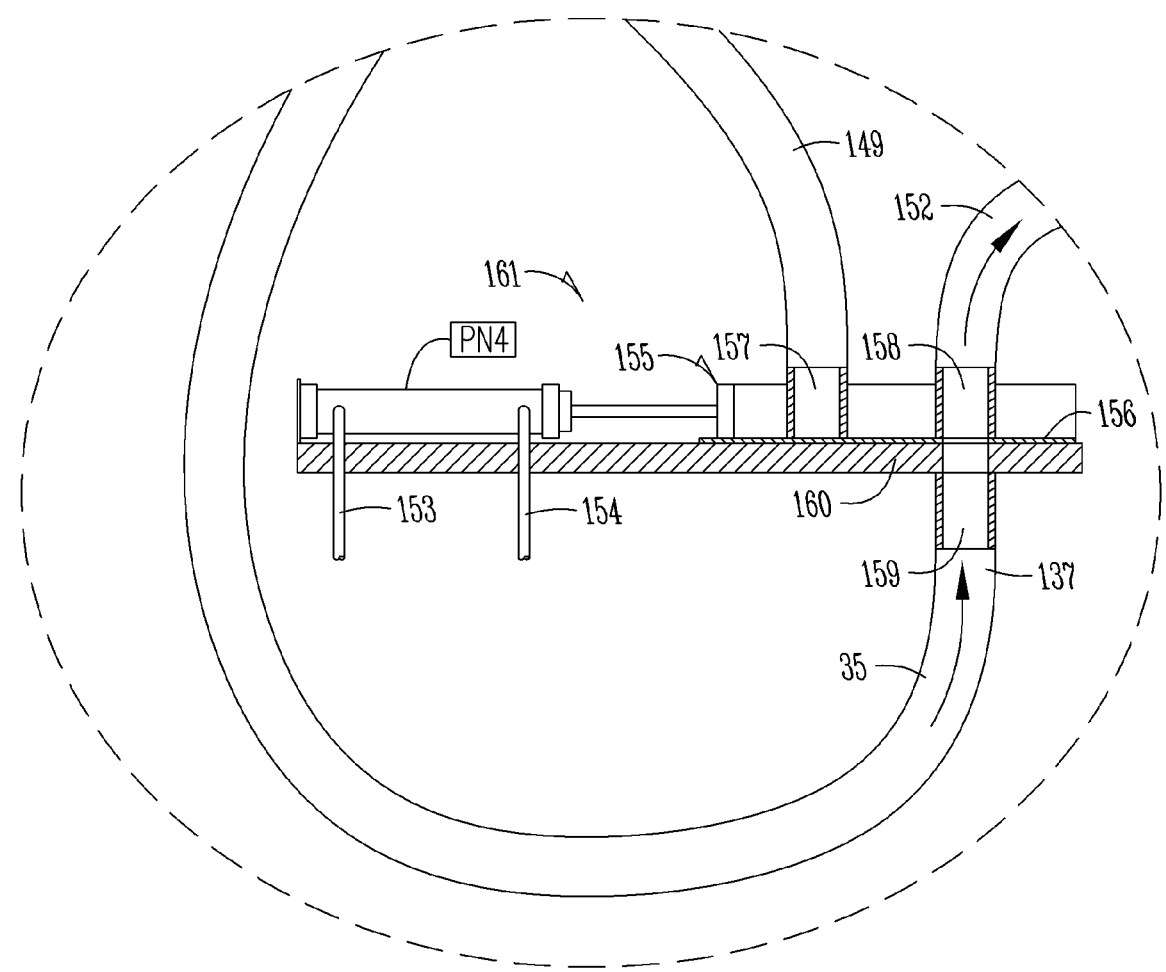

FIG. 14B is an enlarged elevation view of the seed distribution manifold taken along line 14B-14B in FIG. 14A.

Figure 15:
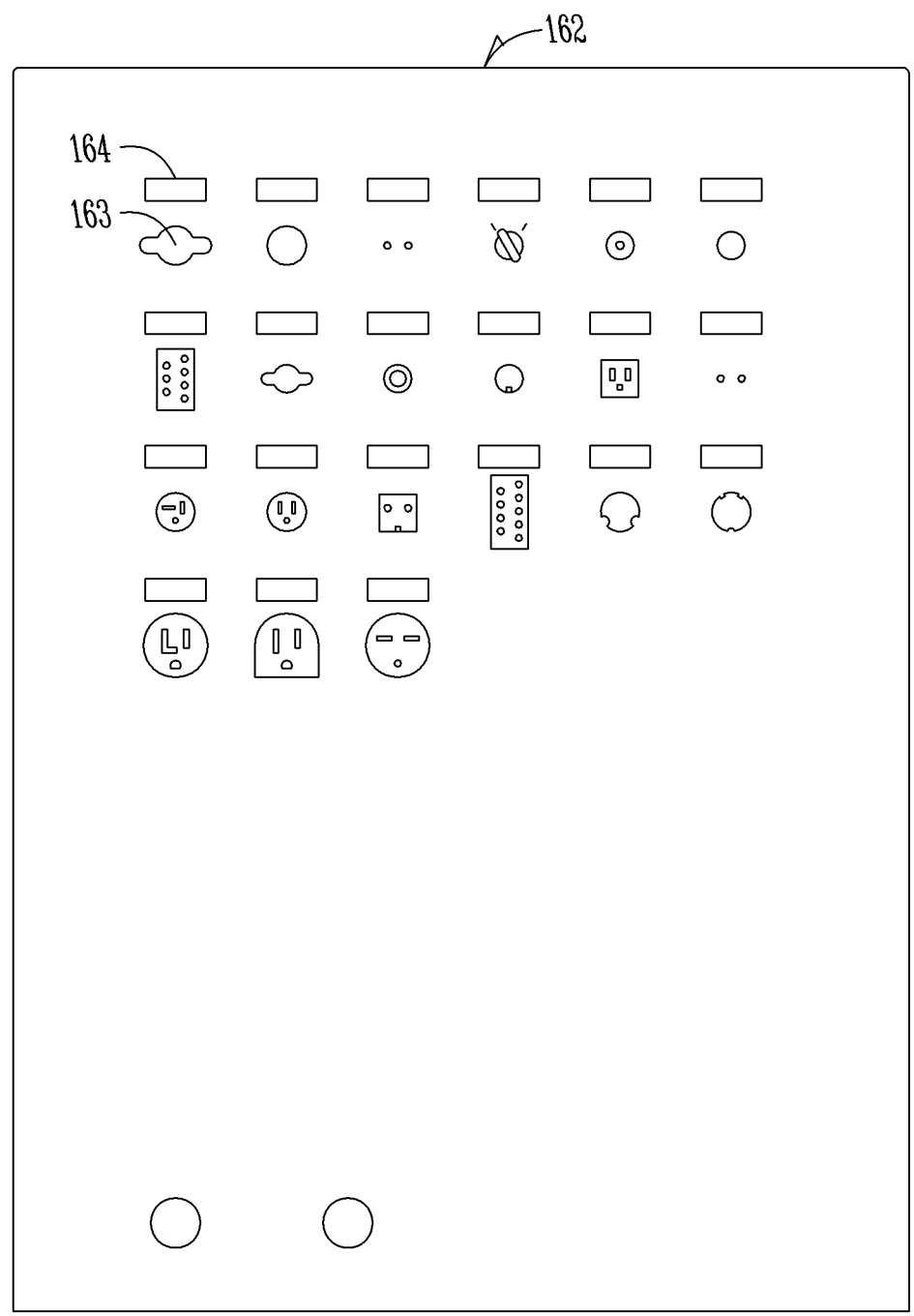

FIG. 15 is an embodiment of a control cabinet of the seed packager system taken along line 15-15 in FIG. 13C.

Figure 16:
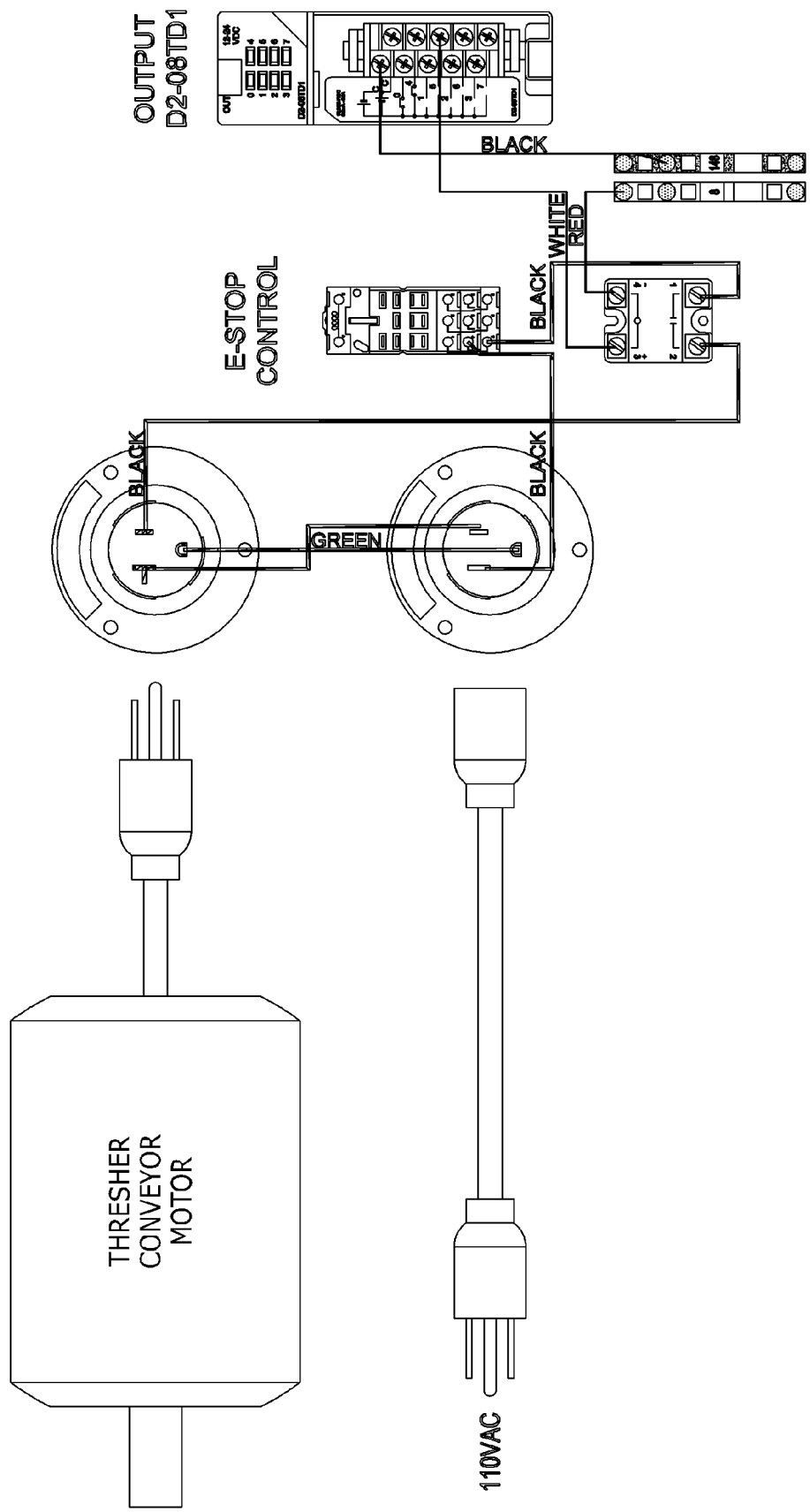

FIG. 16 is an electrical schematic of AC power distribution to a 110 VAC conveyor motor for the thresher shown in FIG. 8.

Figure 17:
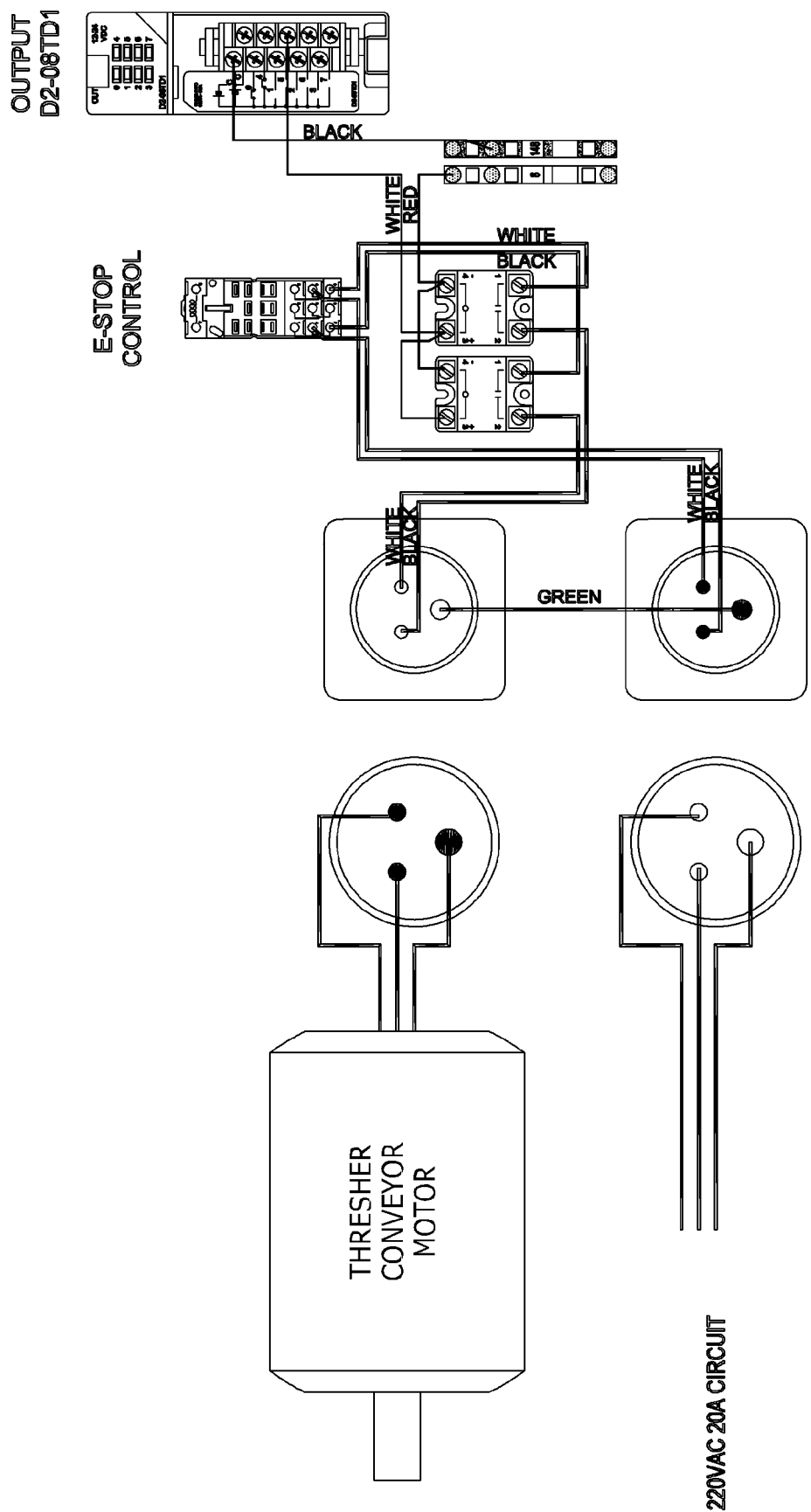

FIG. 17 is an electrical schematic of AC power distraction to a 220 VAC conveyor motor for the thresher shown in FIG. 8.

Figure 18:
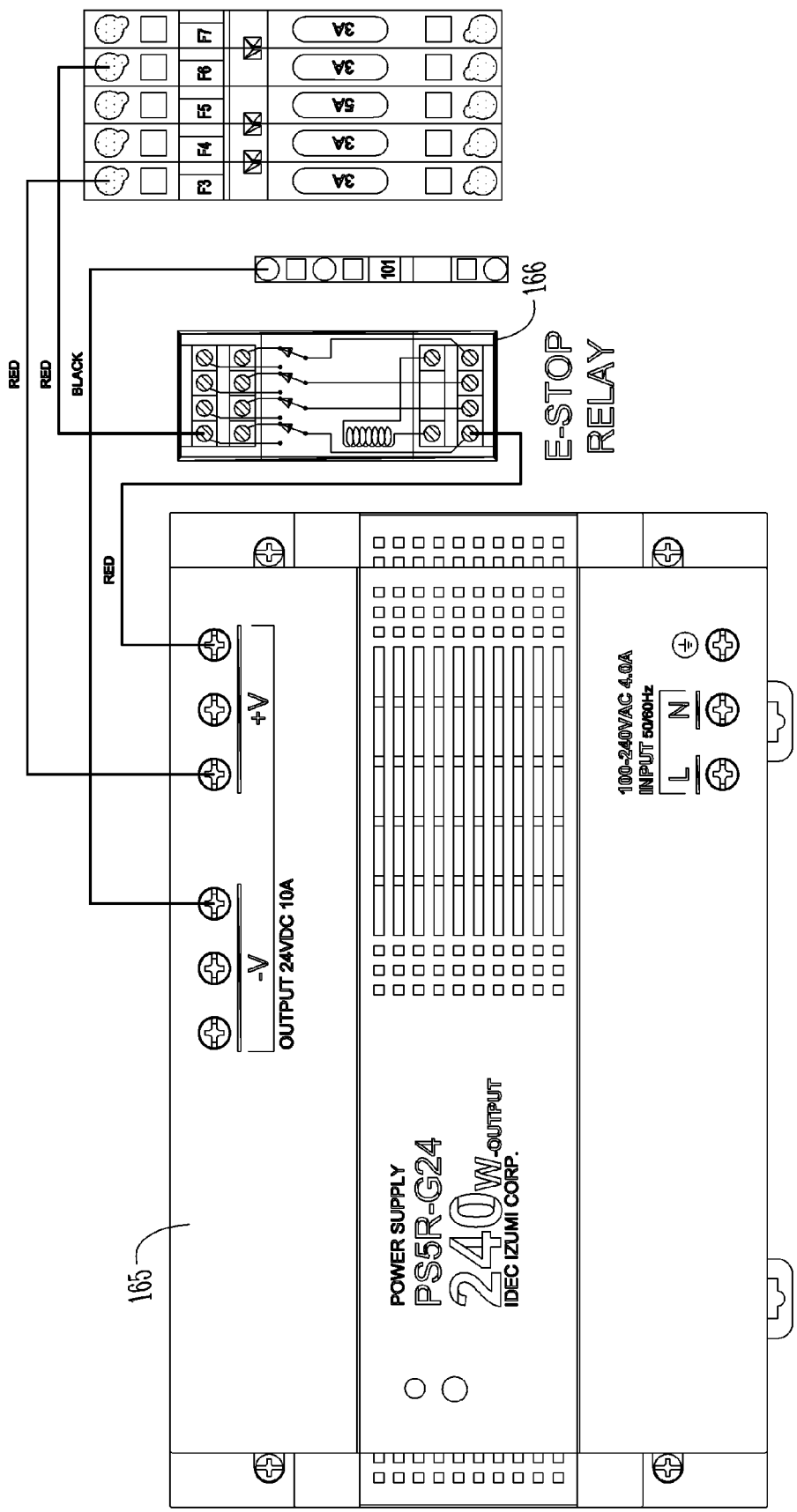

FIG. 18 is an electrical schematic of DC power distribution for the system according to an exemplary embodiment of the present invention.

Figure 19:
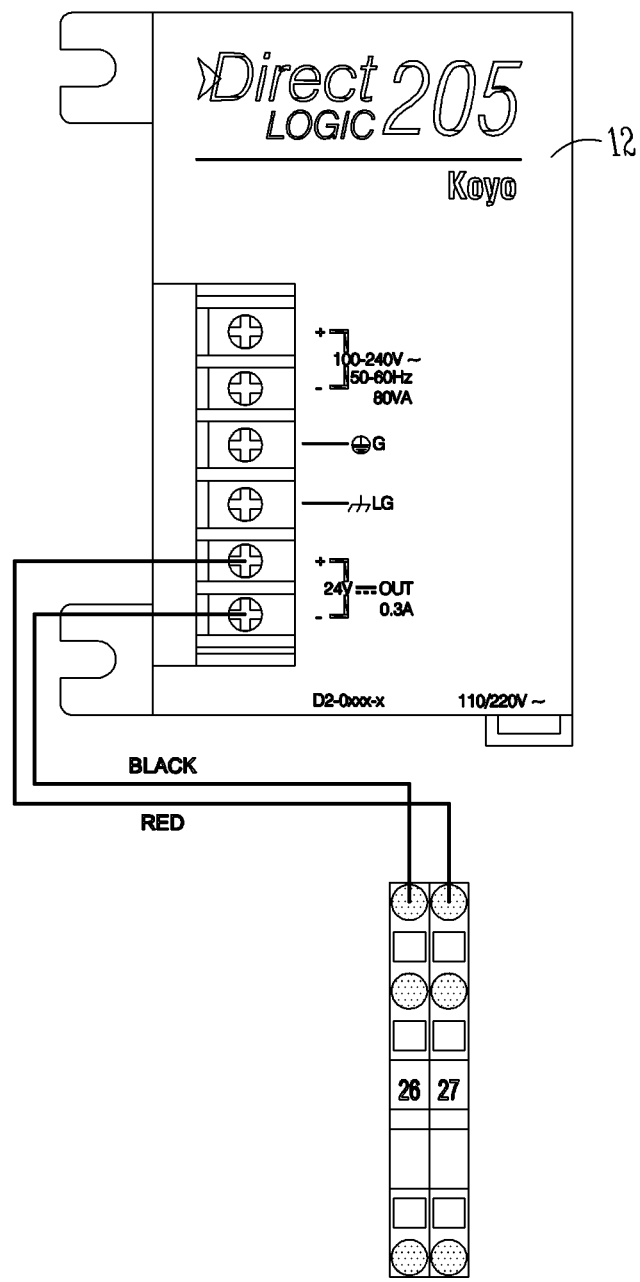

FIG. 19 is an electrical schematic of isolated DC power distribution controller for the system according to an exemplary embodiment of the present invention.

Figure 20:
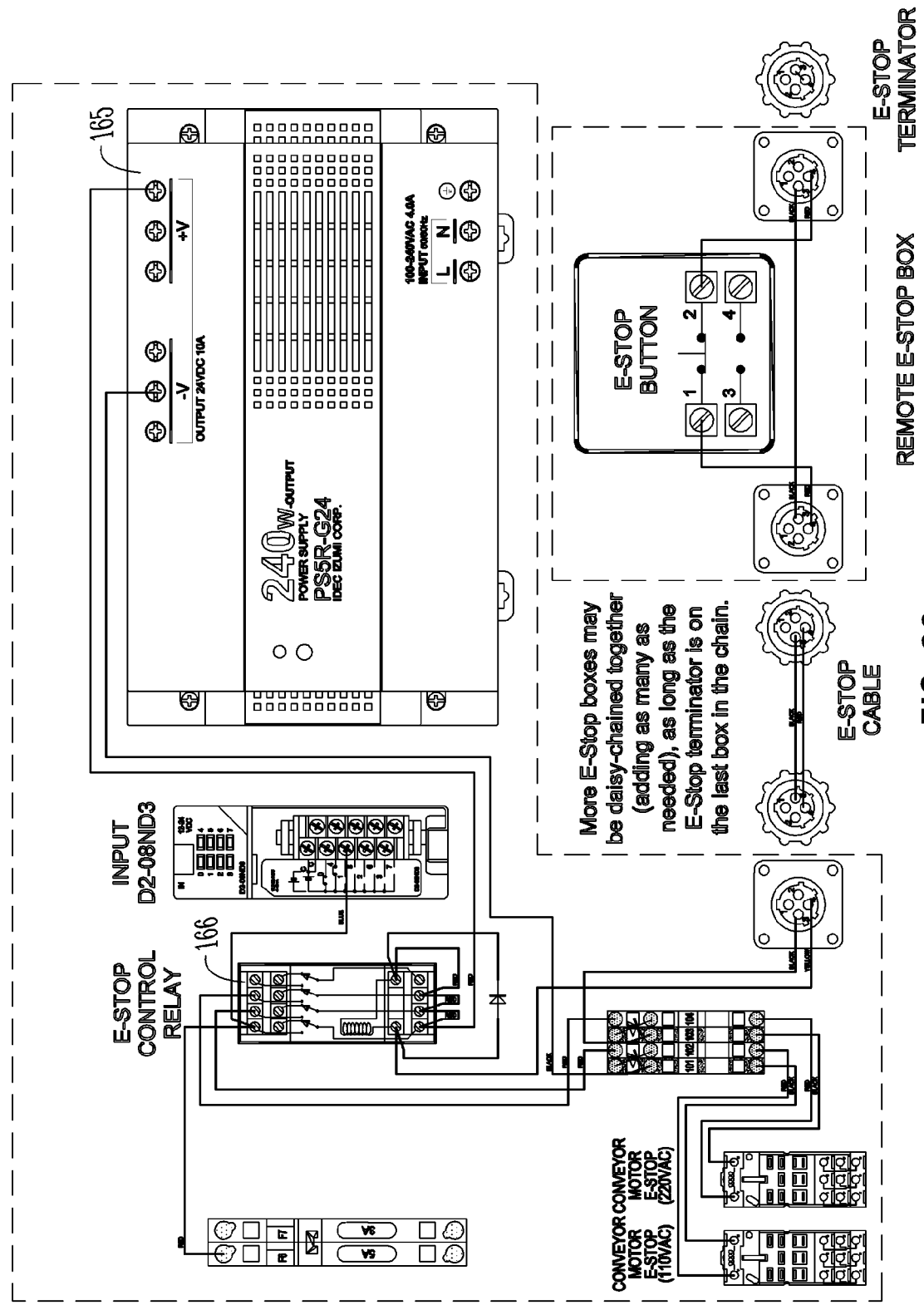

FIG. 20 is an electrical schematic of the E-Stop distribution of signal paths for the system according to an exemplary embodiment of the present invention.

Figure 21:
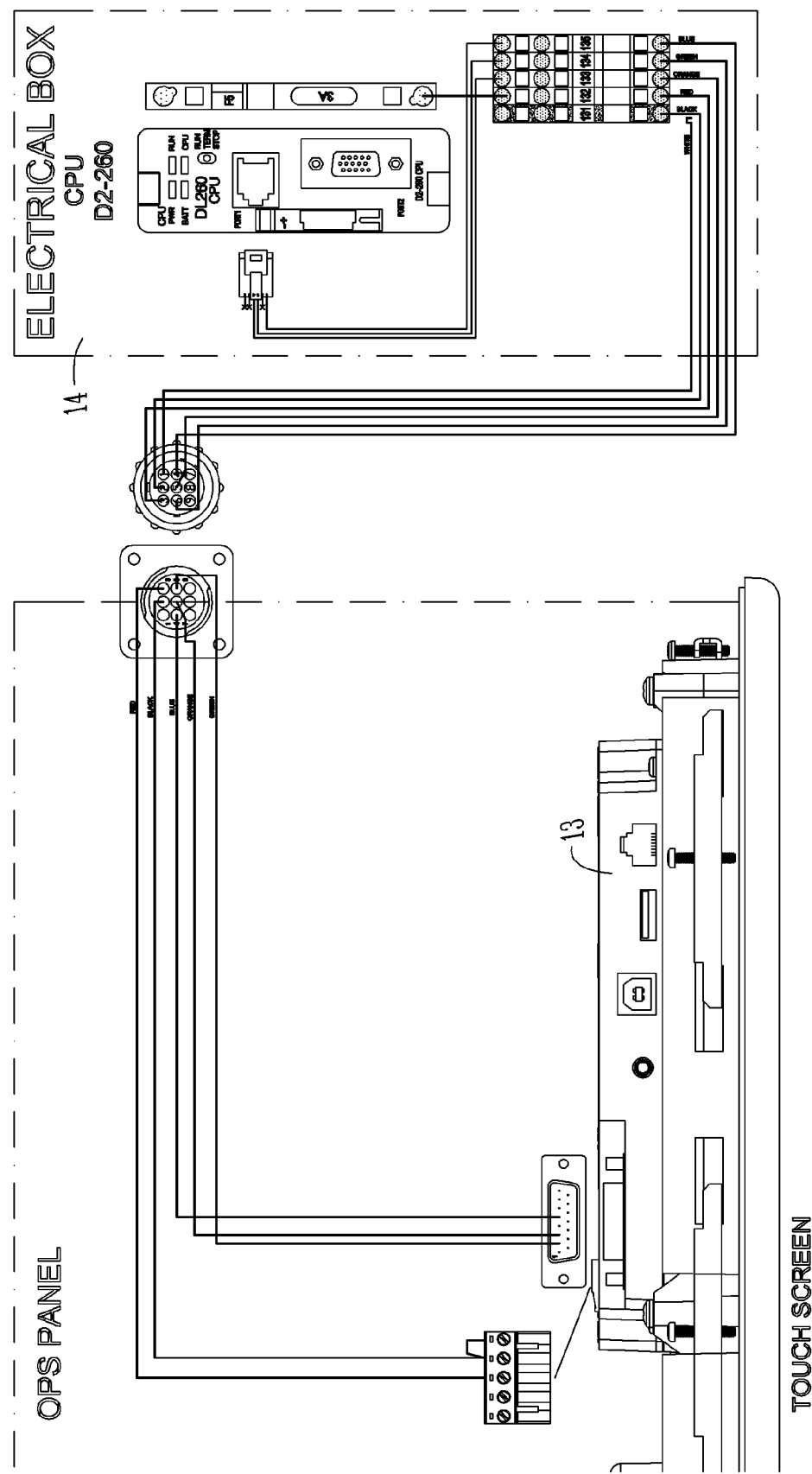

FIG. 21 is an electrical schematic of the power signal distribution for the graphical user interface of the system according an exemplary embodiment of the present invention.

Figure 22:
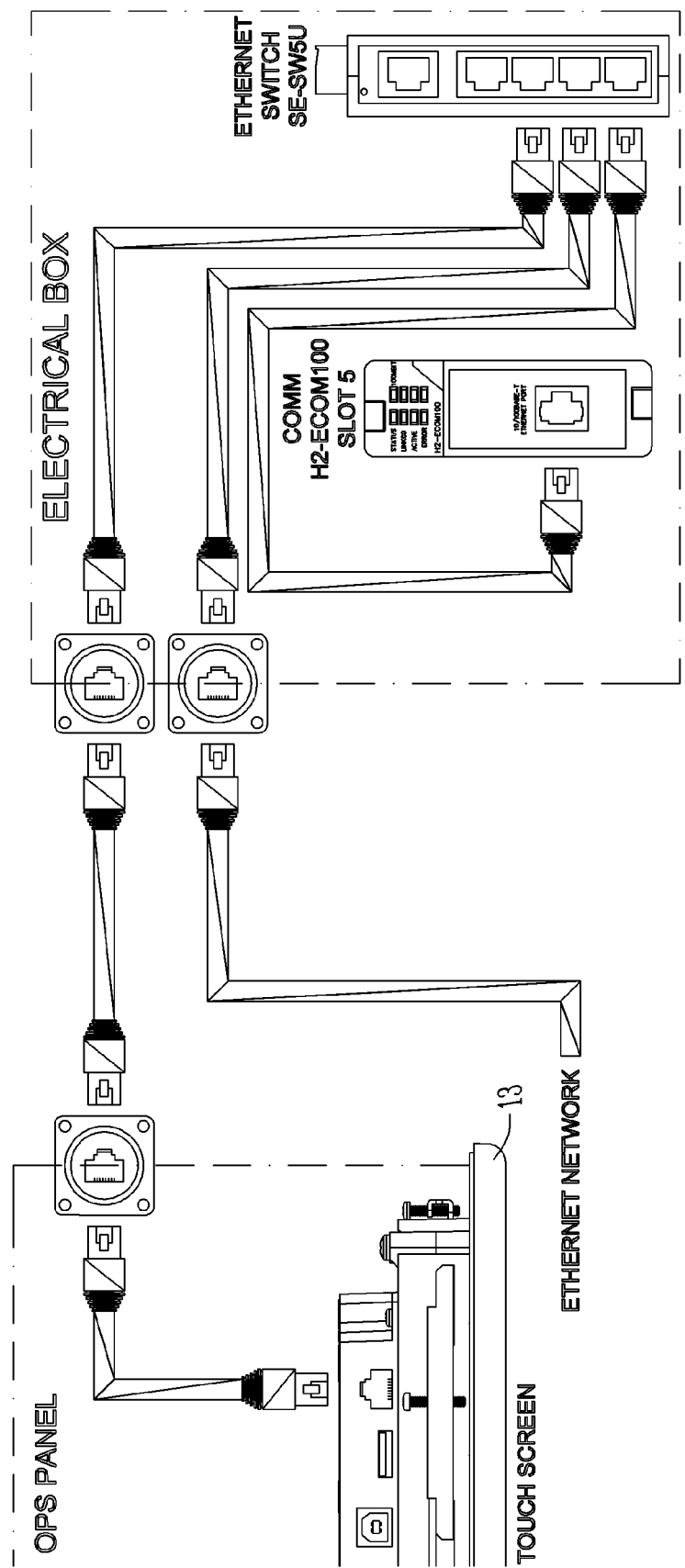

FIG. 22 is an electrical schematic of the signal distribution for Ethernet connections for the graphical user interface according to an exemplary embodiment of the present invention.

Figure 23:
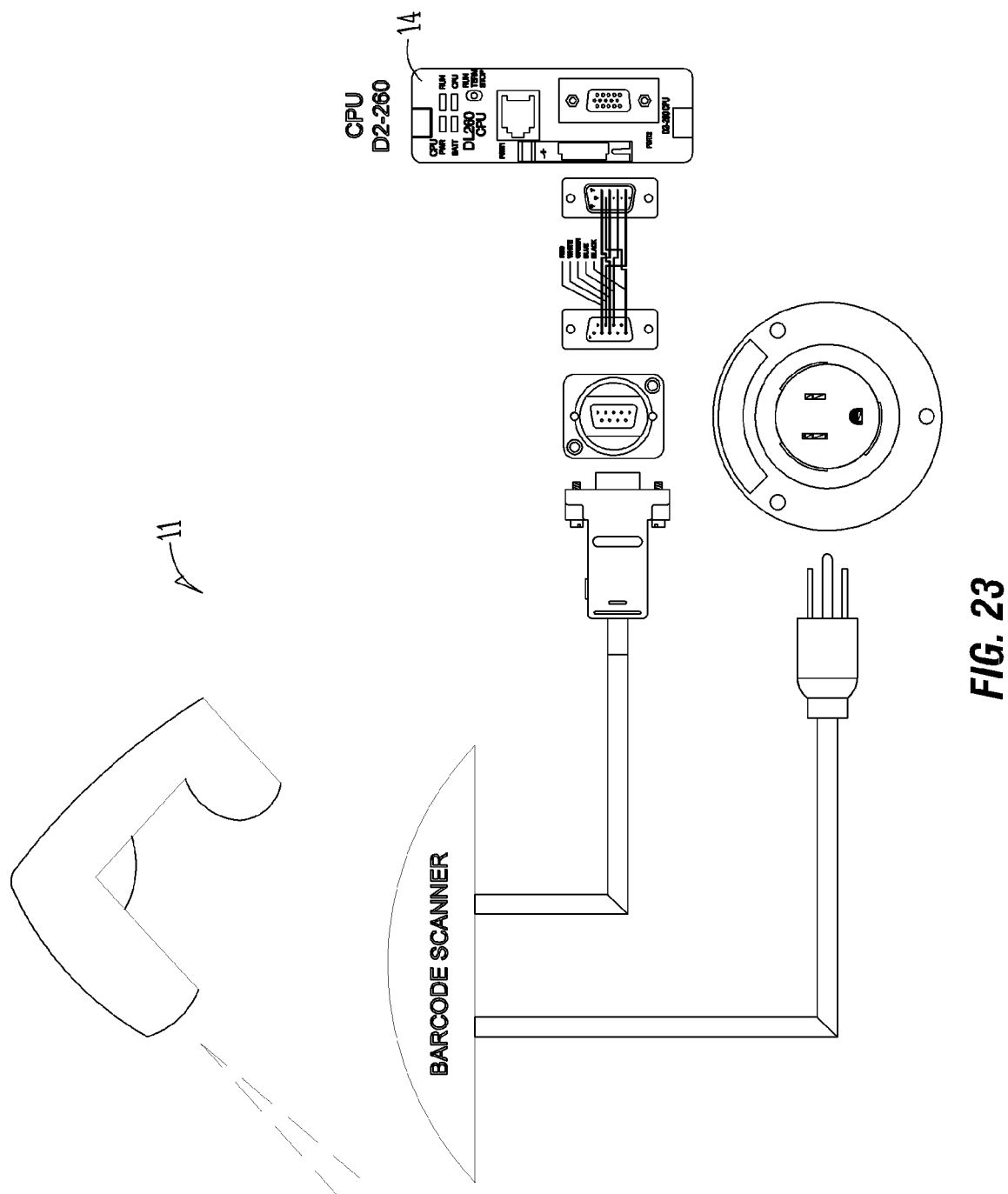

FIG. 23 is an electrical schematic of the signal distribution for the scanner according to an exemplary embodiment of the present invention.

Figure 24:
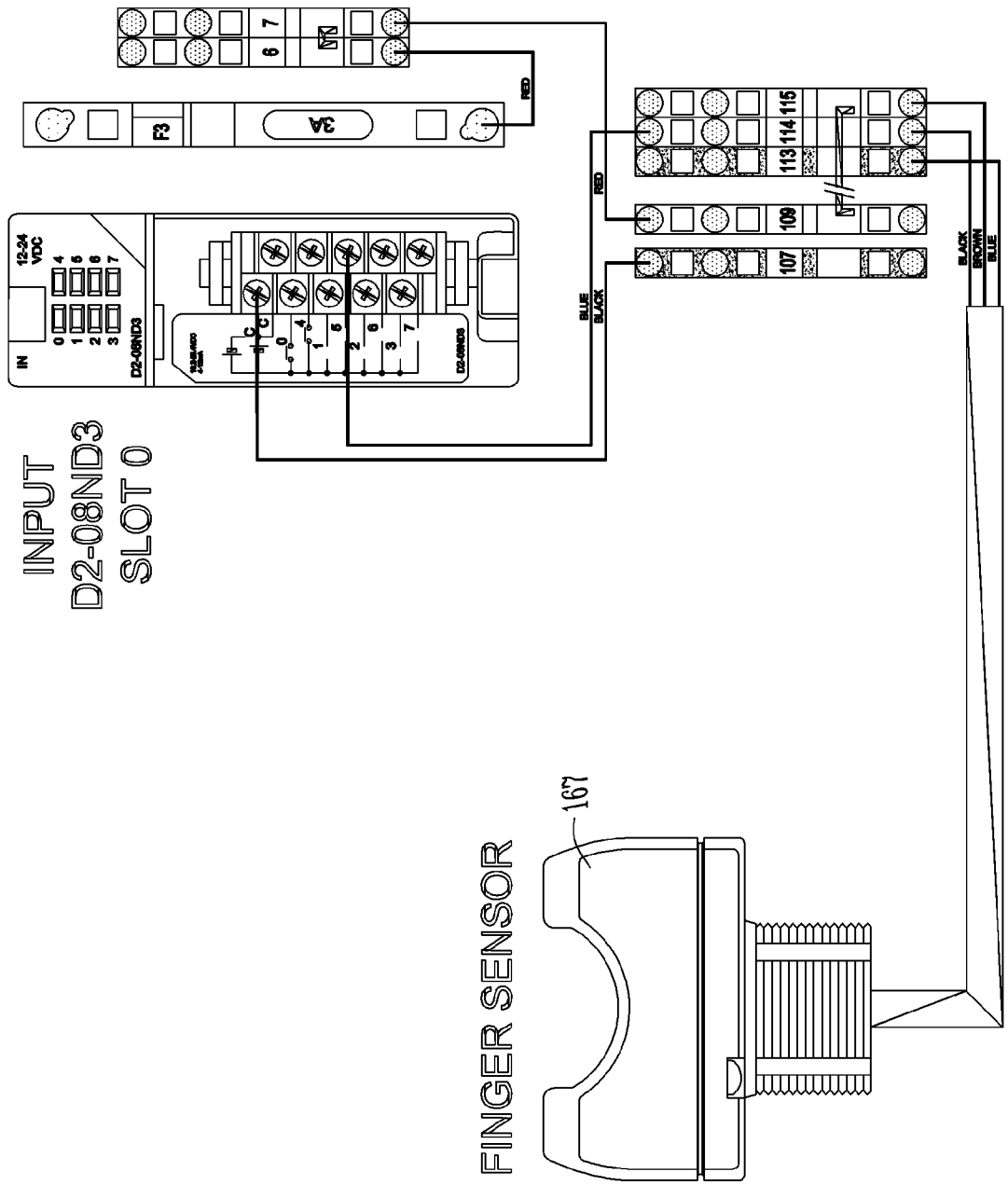

FIG. 24 is an electrical schematic of the signal path for a finger sensor of the system according to an exemplary embodiment of the present invention.

Figure 25:
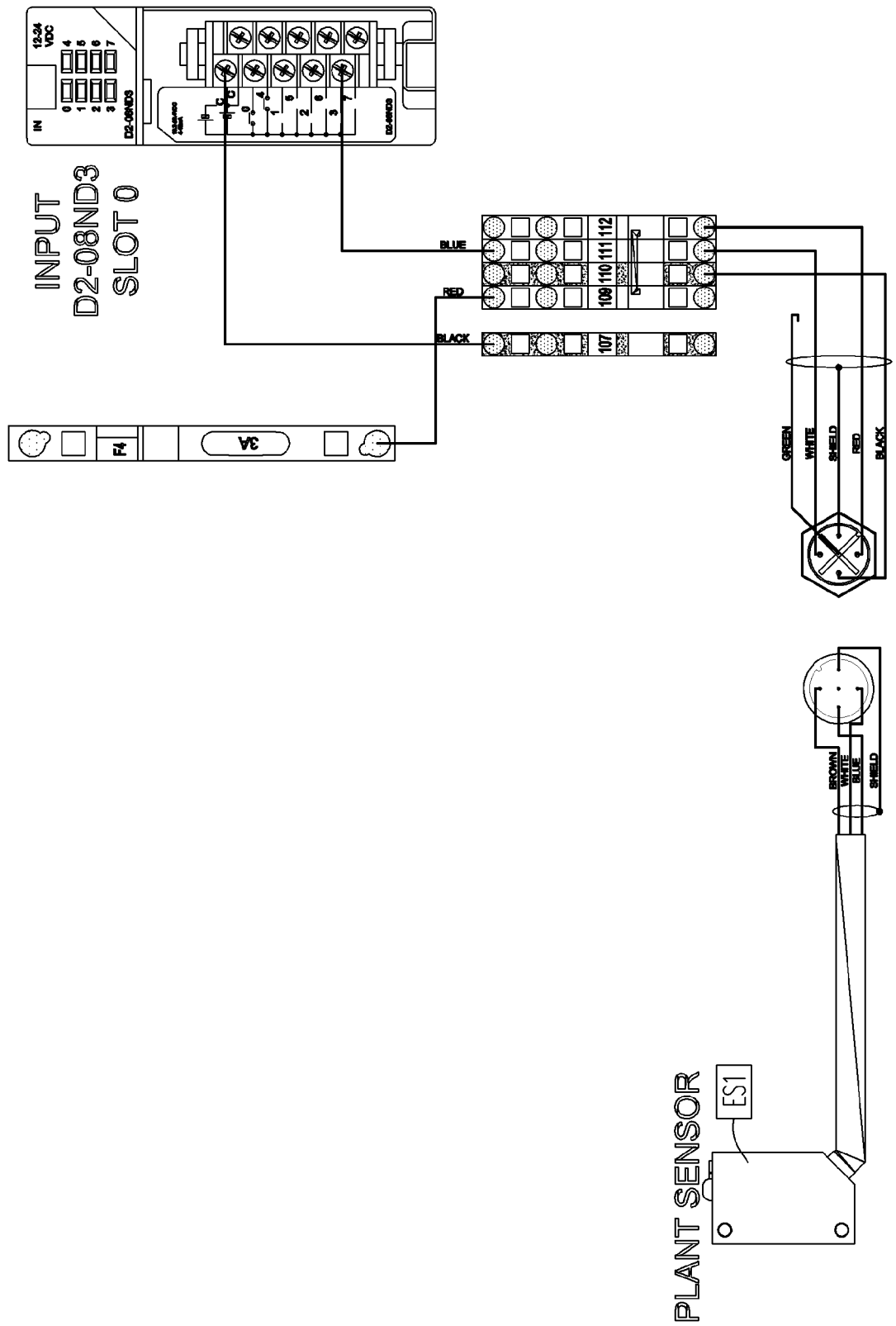

FIG. 25 is an electrical schematic of the signal path for a plant sensor of the system according to an exemplary embodiment of the present invention.

Figure 26:
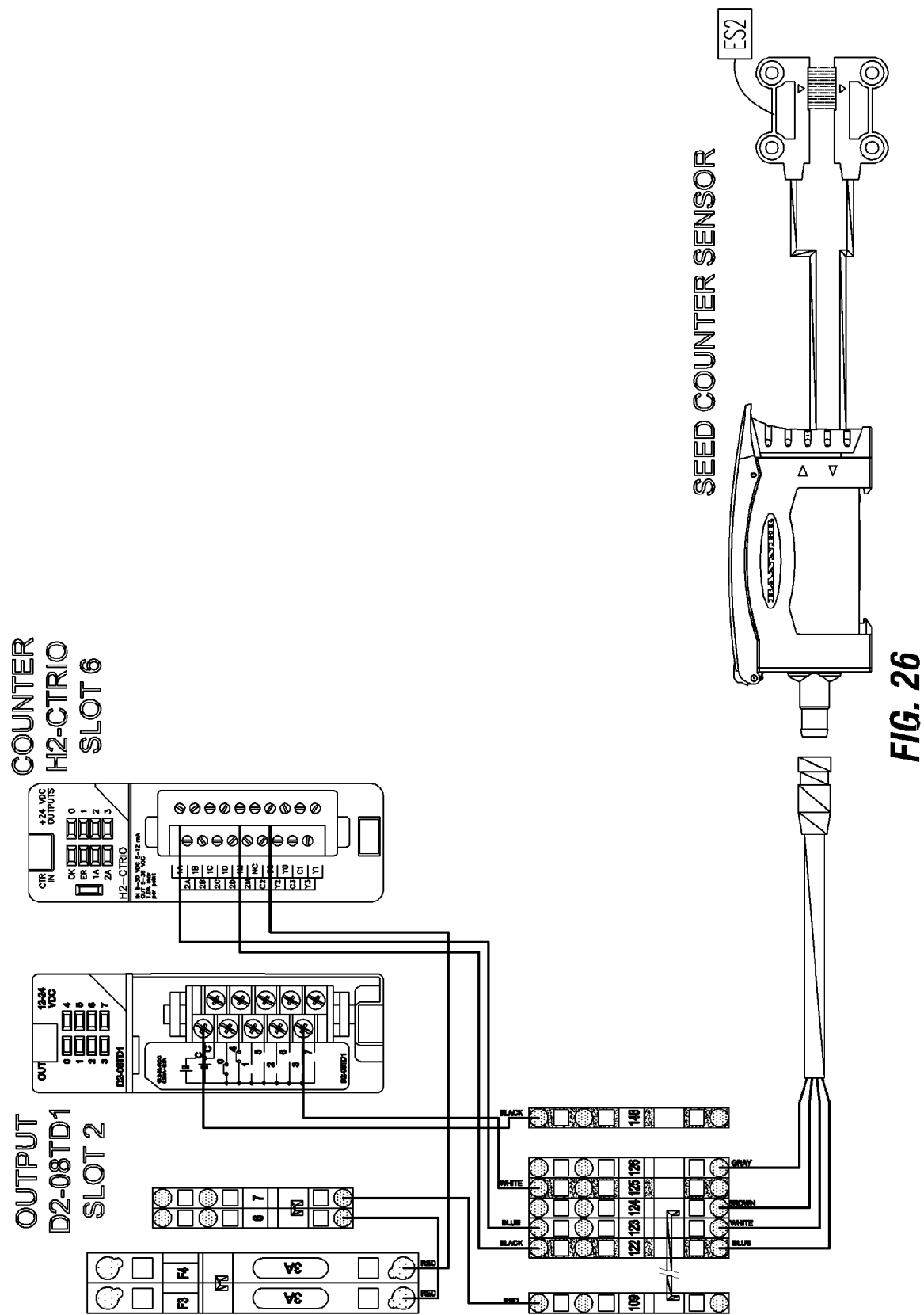

FIG. 26 is an electrical schematic of the signal path for a seed counter sensor of the seed counter according to an exemplary embodiment of the present invention.

Figure 27:
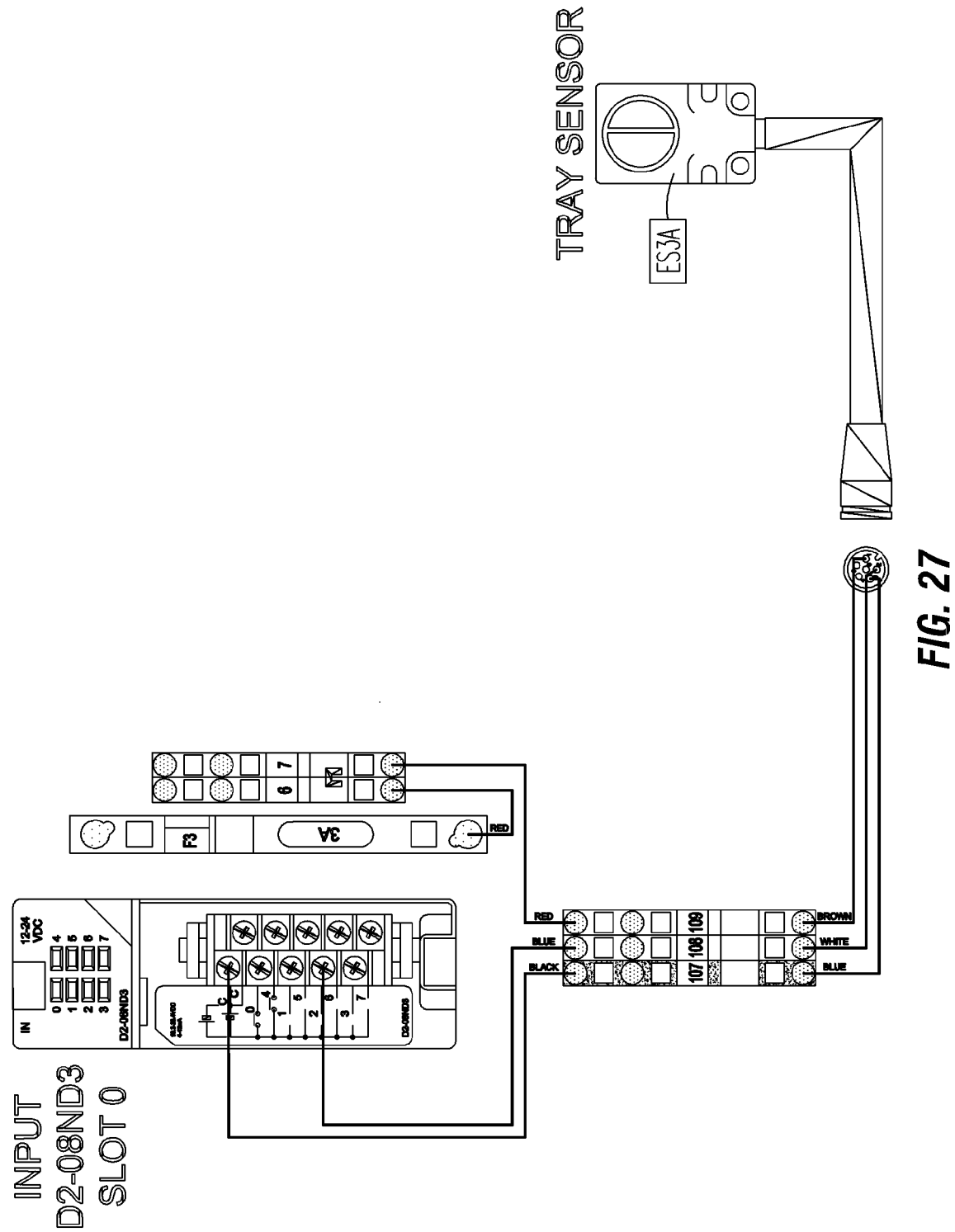

FIG. 27 is an electrical schematic of the signal path for a tray sensor of the seed packager according to an exemplary embodiment of the present invention.

Figure 28:
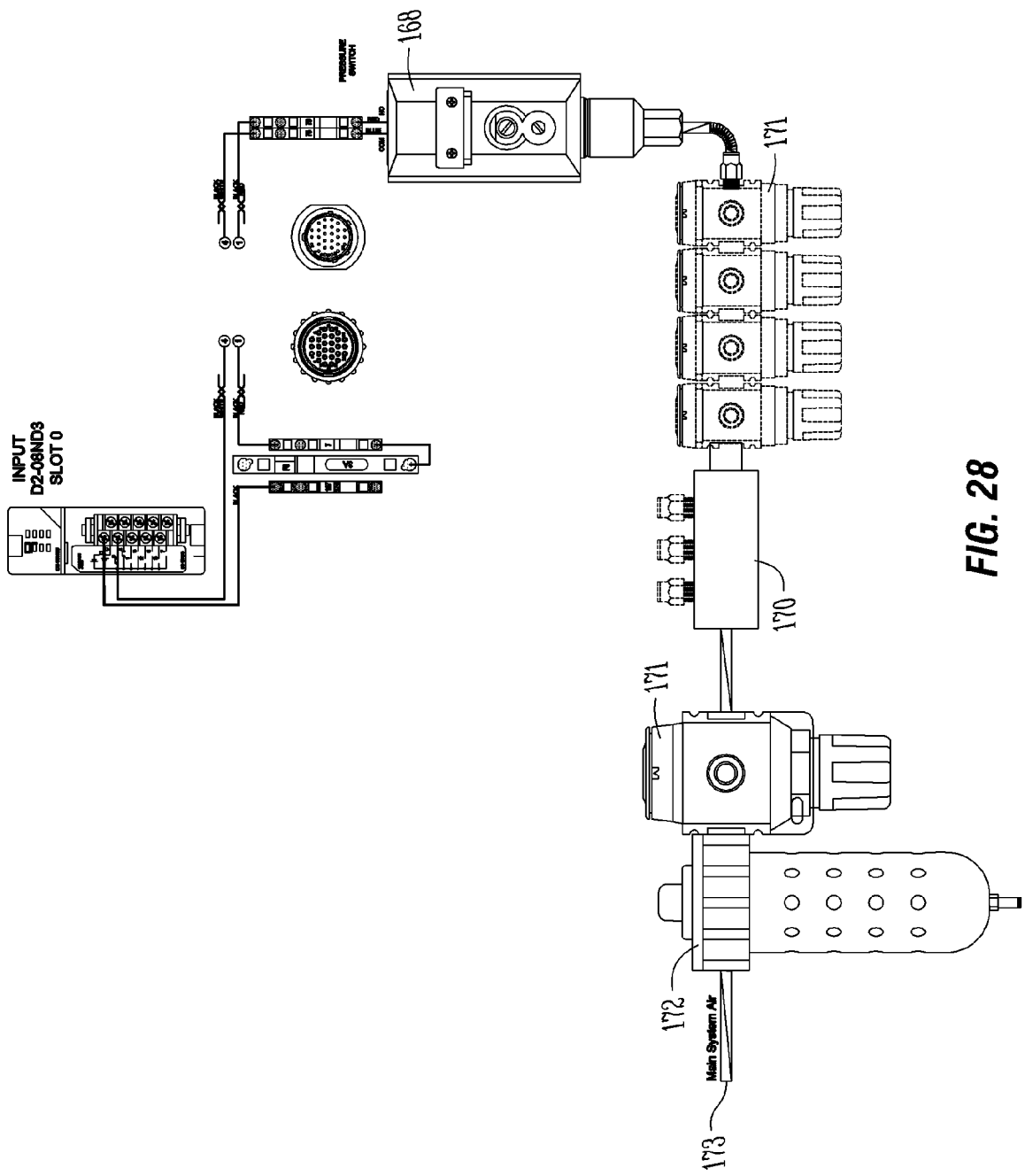

FIG. 28 is a schematic of electrical and pneumatic distribution for the air pressure sensor signal path according to an exemplary embodiment of the present invention.

Figure 29:
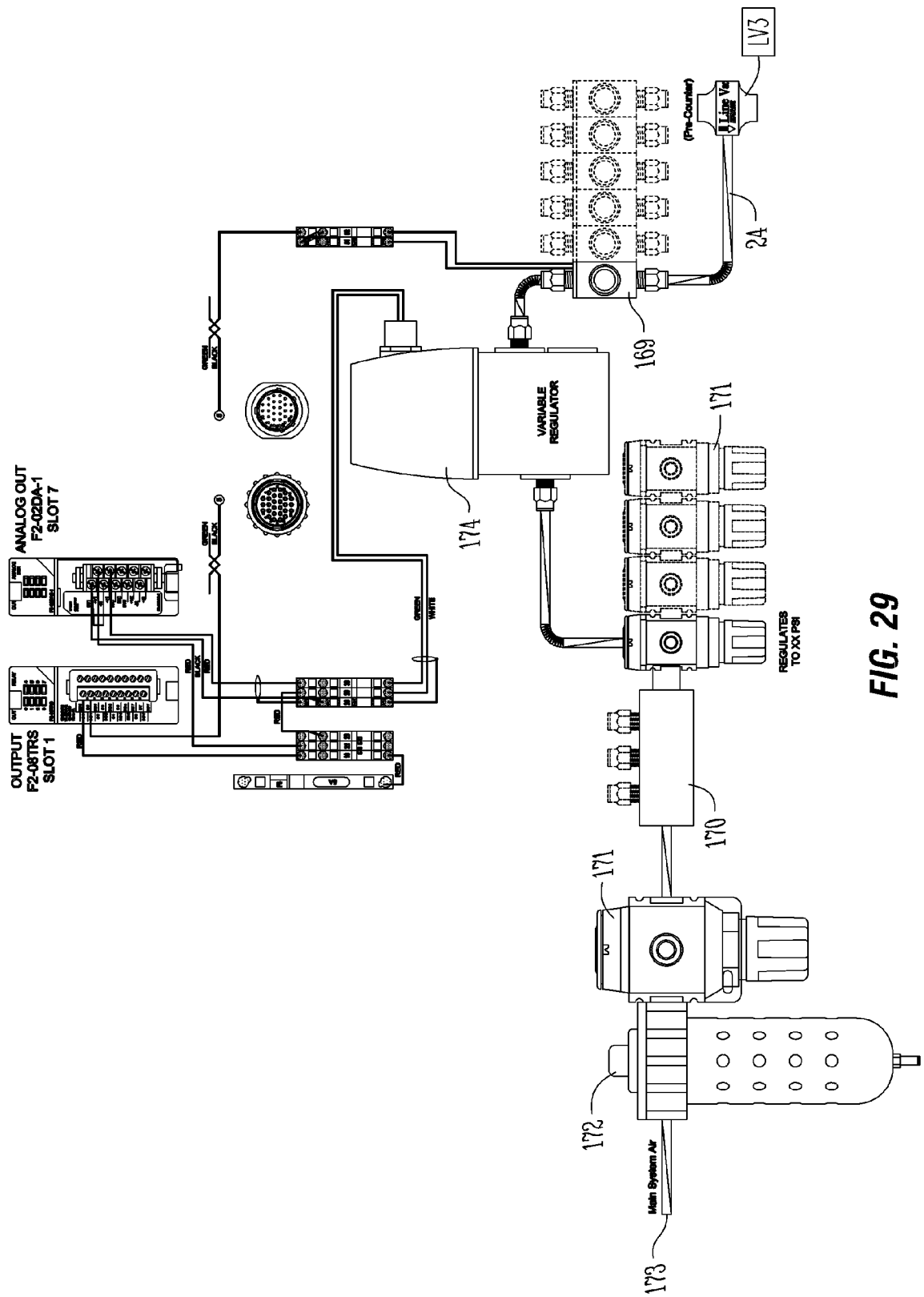

FIG. 29 is a schematic of the electrical and pneumatic distribution for a line vacuum positioned before the seed counter according to an exemplary embodiment of the present invention.

Figure 30:
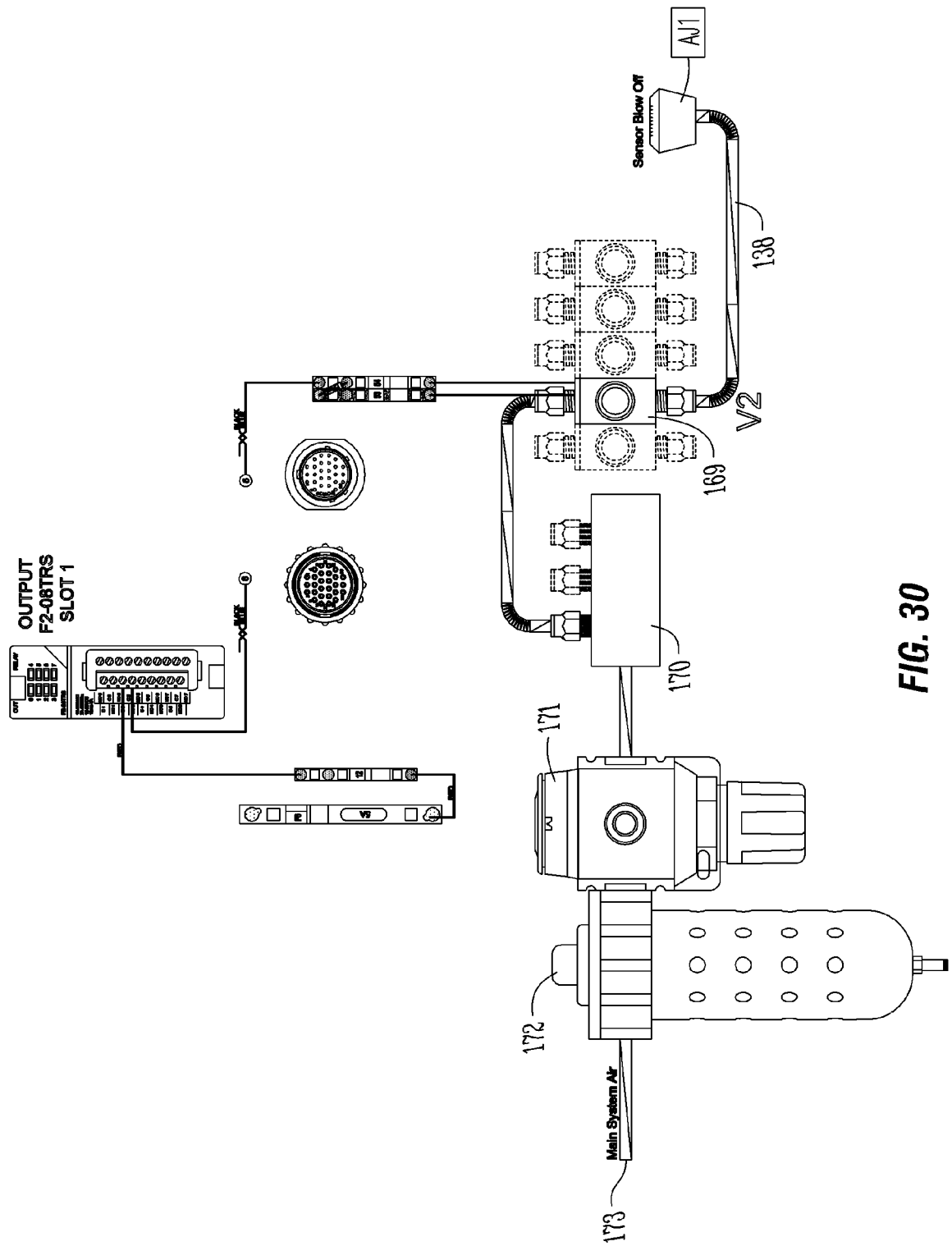

FIG. 30 is a schematic of the electrical and pneumatic distribution for a sensor blow off of the system according to an exemplary embodiment of the present invention.

Figure 31:
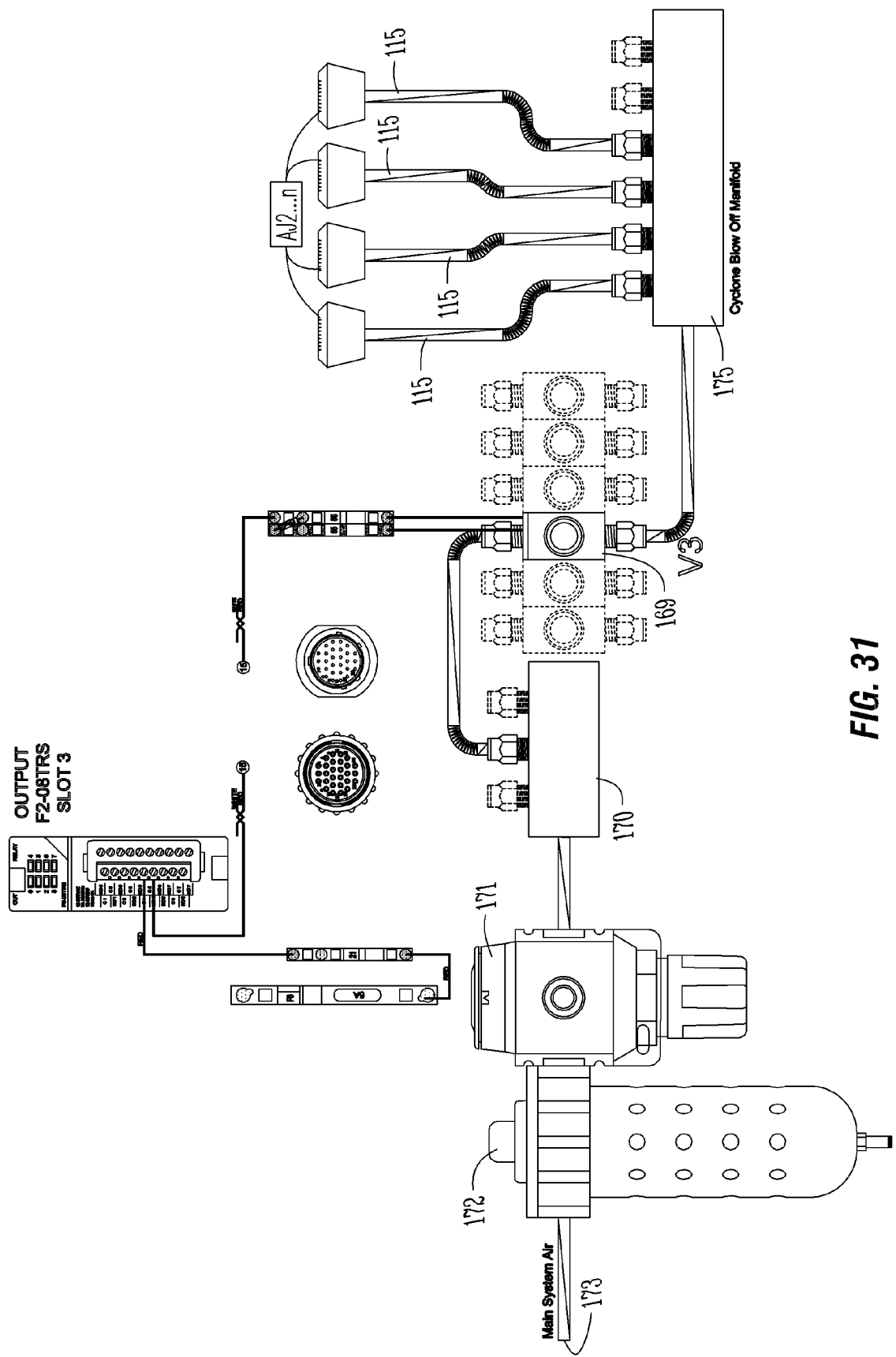

FIG. 31 is a schematic of the electrical and pneumatic distribution for aspirators of the spiral separator according to an exemplary embodiment of the present invention.

Figure 32:
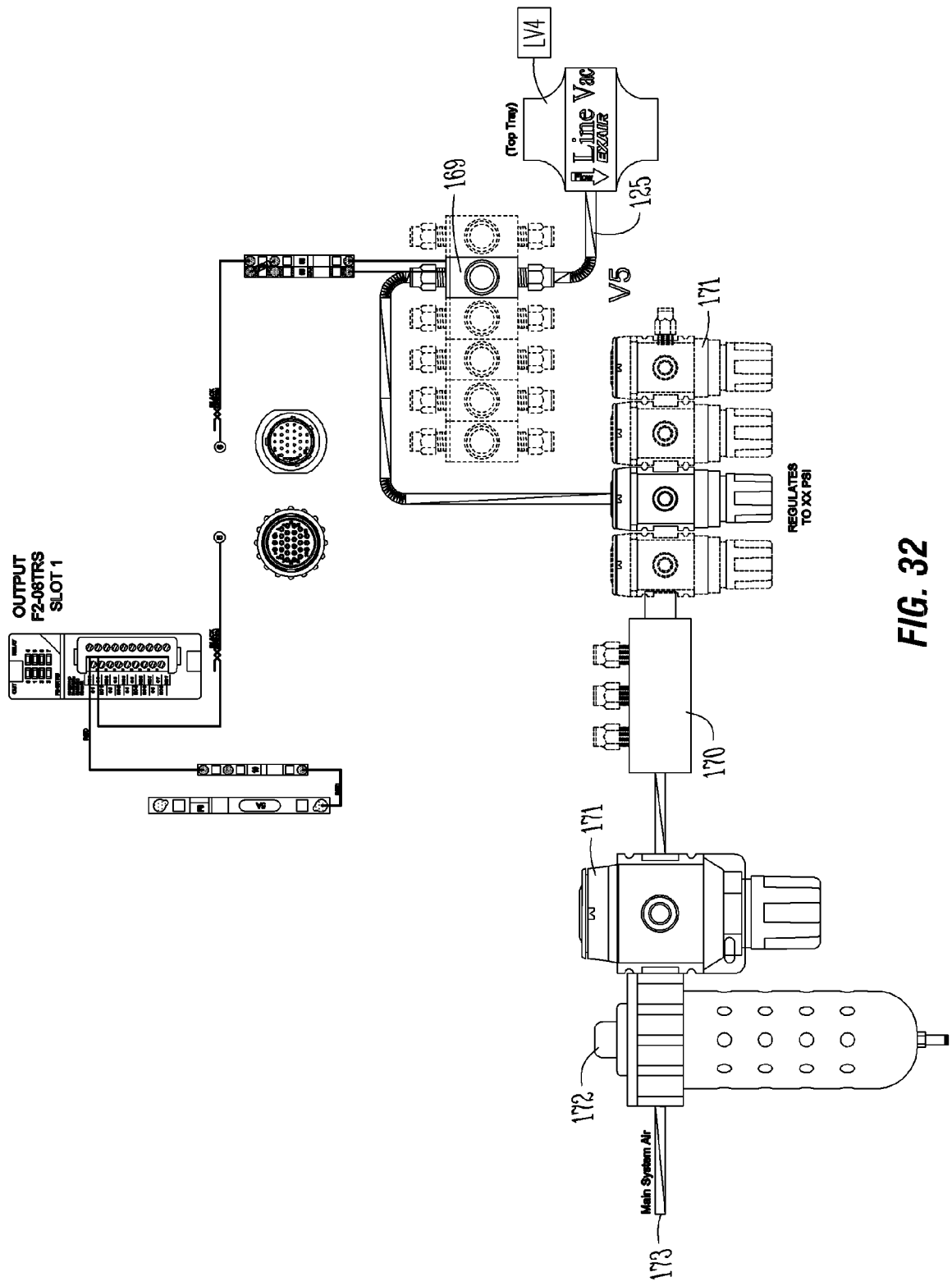

FIG. 32 is a schematic of the electrical and pneumatic distribution for a line vacuum before the seed packager according to an exemplary embodiment of the present invention.

Figure 33:
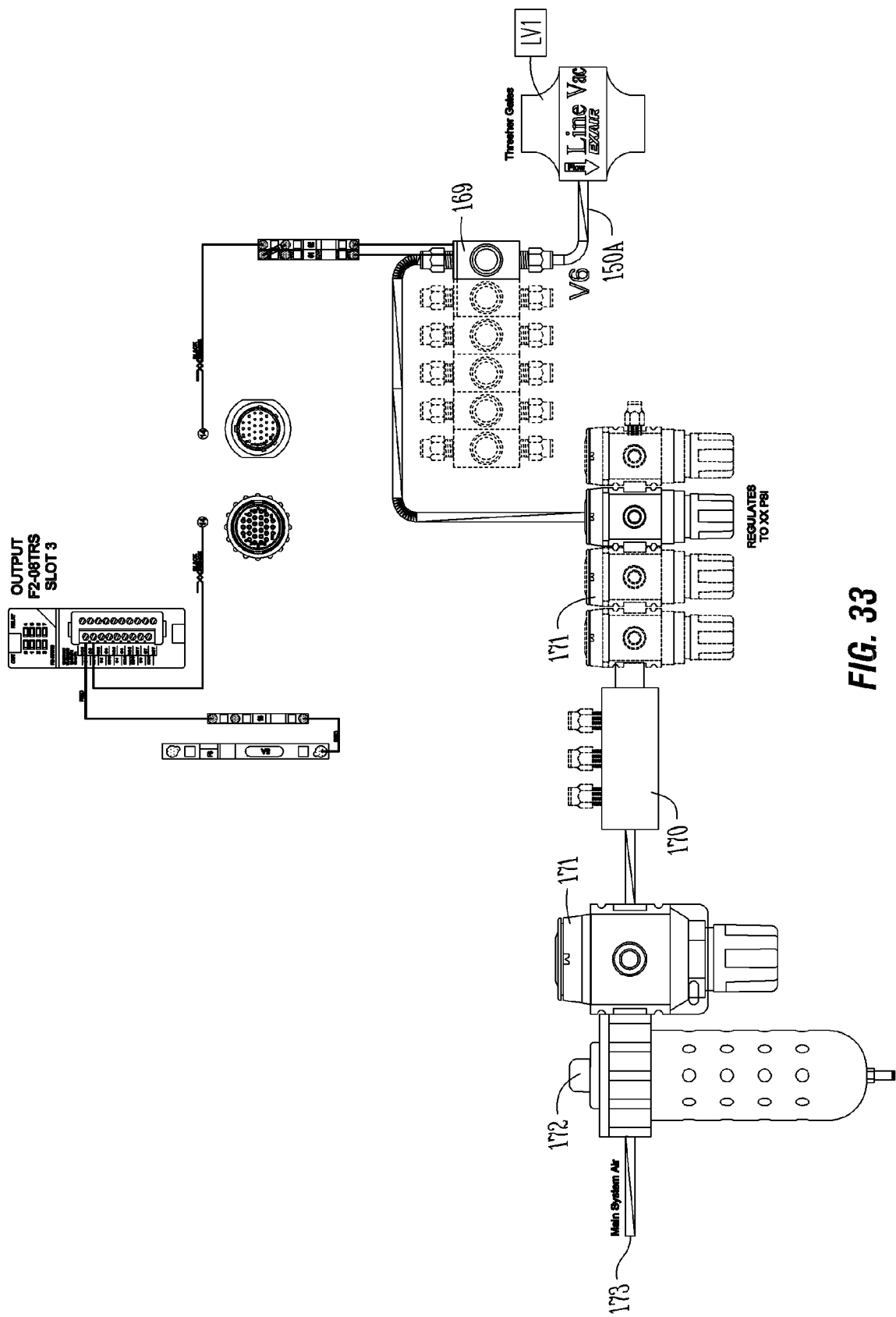

FIG. 33 is a schematic of the electrical and pneumatic distribution for a line vacuum between the thresher and the spiral separator according to an exemplary embodiment of the present invention.

Figure 34:
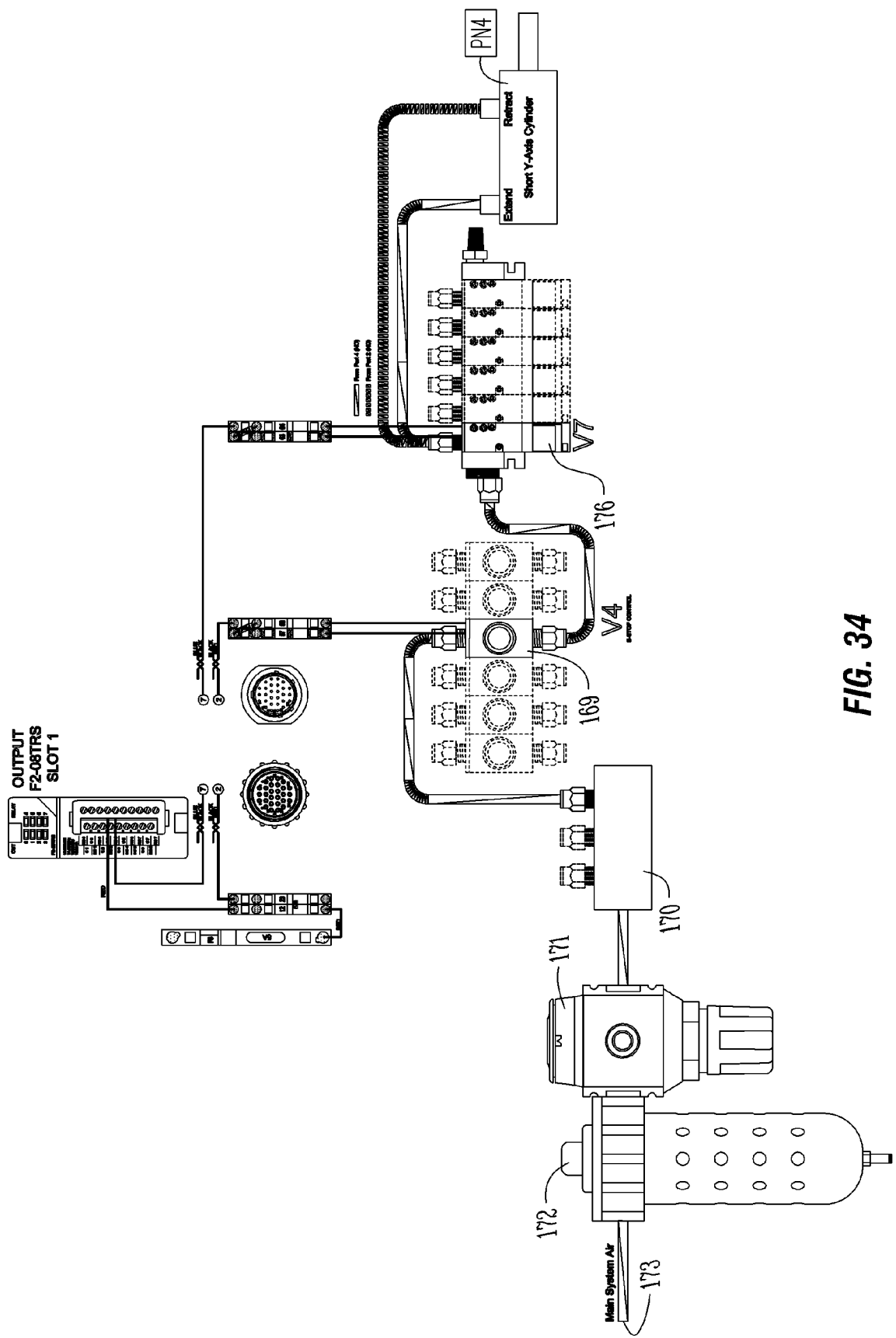

FIG. 34 is a schematic of the electrical and pneumatic distribution for an air cylinder controlling a switching point in the conveyance path between the seed counter and seed packager according to an exemplary embodiment of the present invention.

Figure 35:
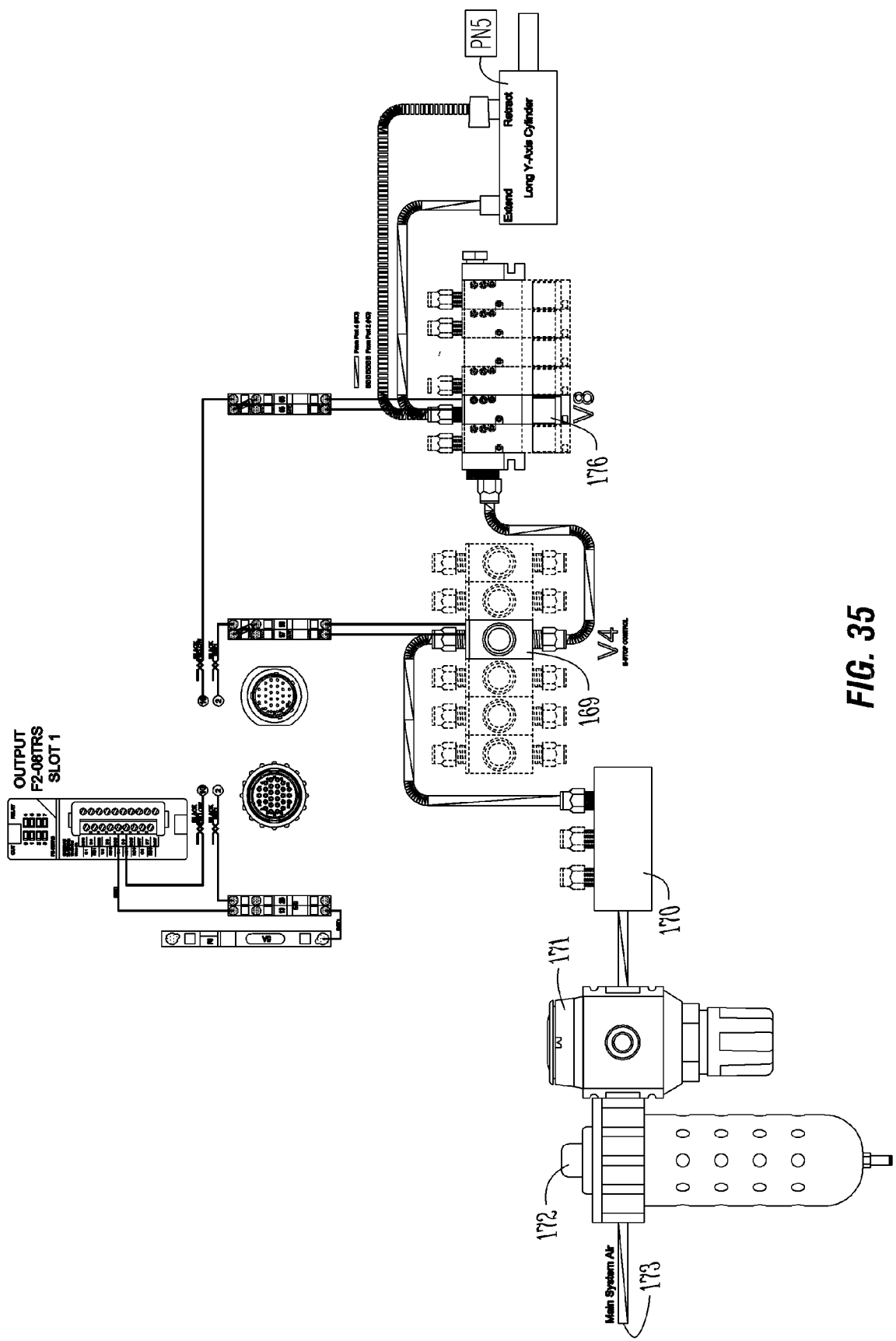

FIG. 35 is a schematic of the electrical and pneumatic distribution for an air cylinder at the seed packager according to an exemplary embodiment of the present invention.

Figure 36:
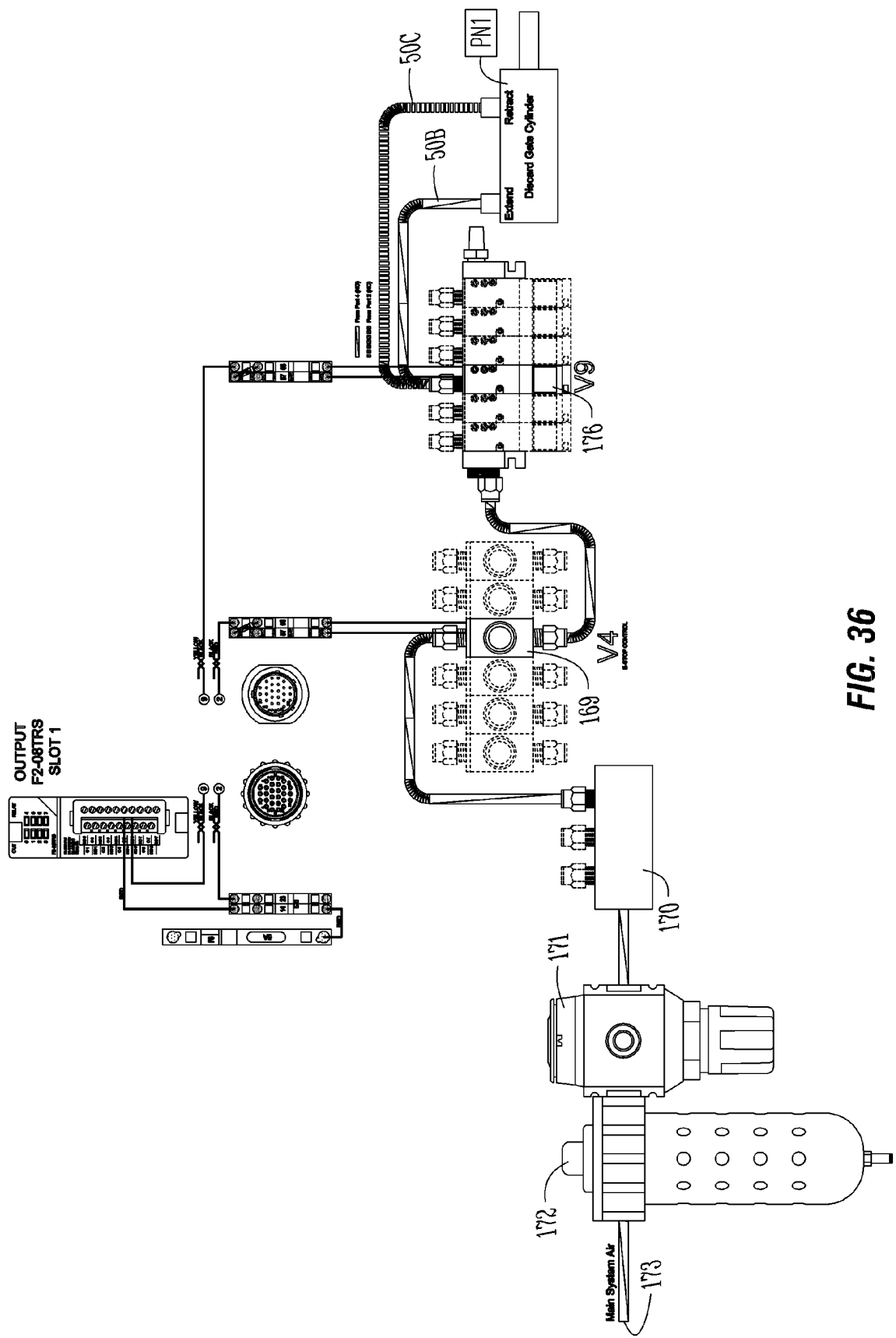

FIG. 36 is a schematic of the electrical and pneumatic distribution for an air cylinder at the outlet of the thresher according to an exemplary embodiment of the present invention.

Figure 37:
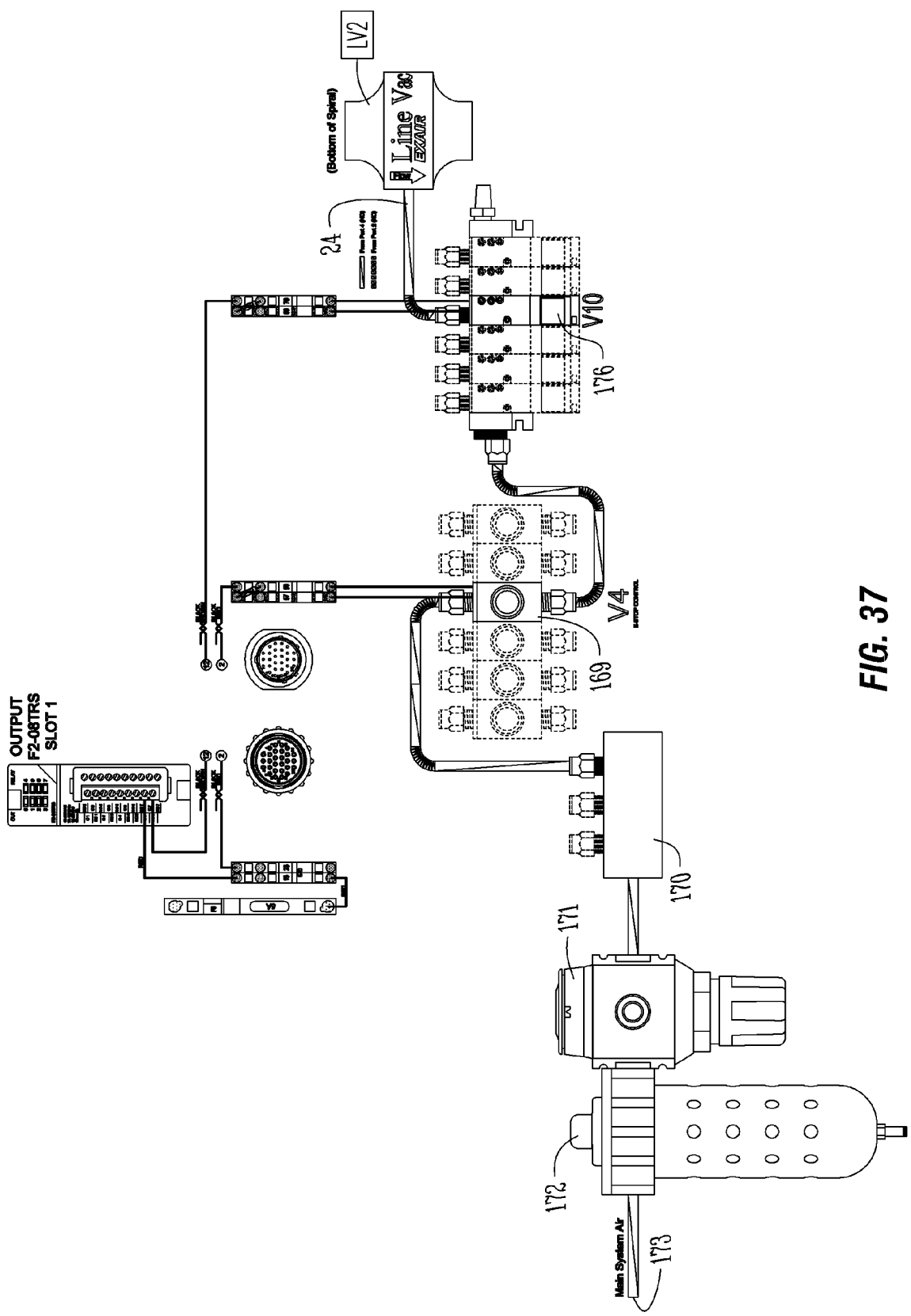

FIG. 37 is a schematic of the electrical and pneumatic distribution for a line vacuum at the output of the spiral separator according to an exemplary embodiment of the present invention.

Figure 38:
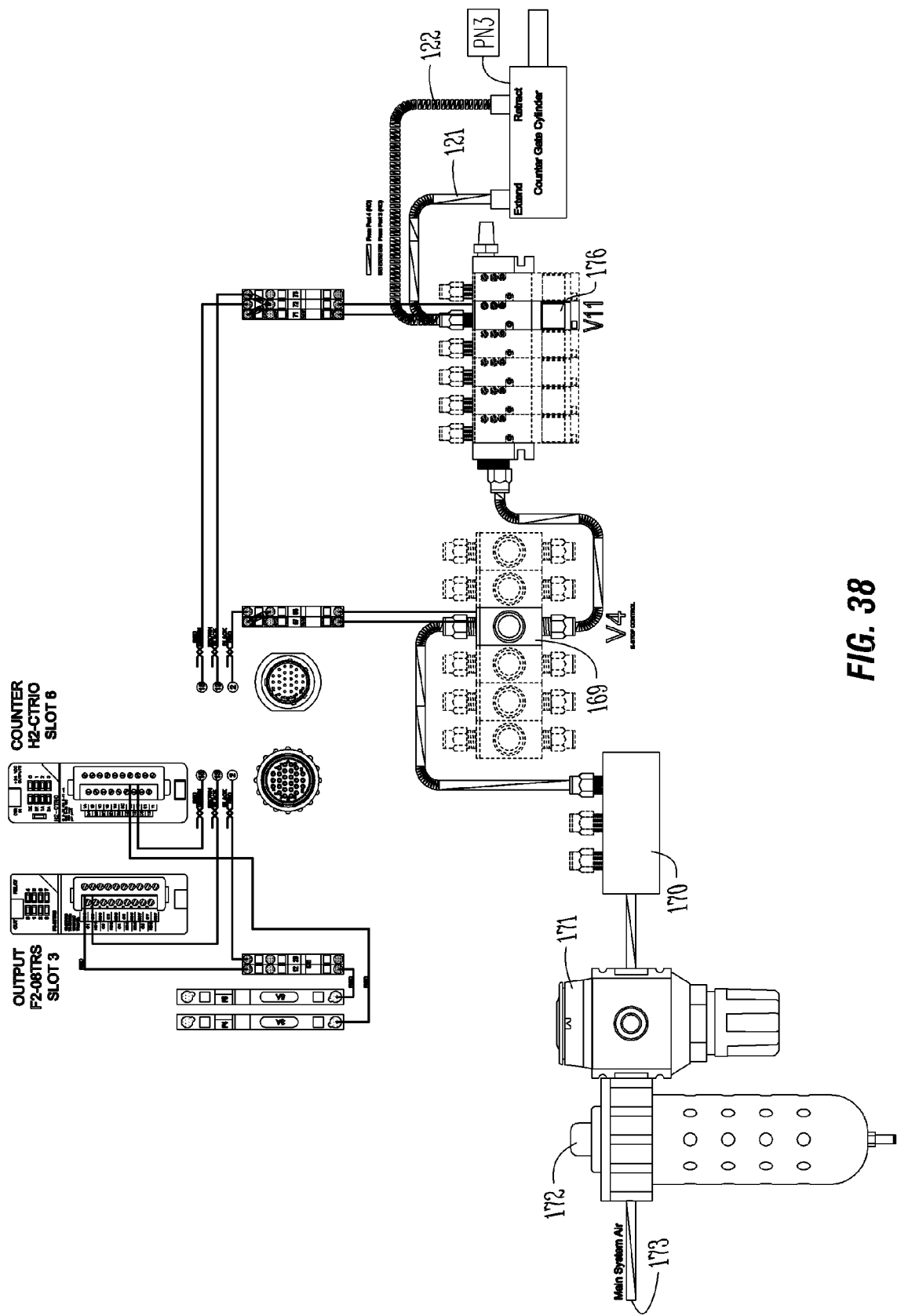

FIG. 38 is a schematic of the electrical and pneumatic distribution for an air cylinder at the seed counter according to an exemplary embodiment of the present invention.

Figure 39:
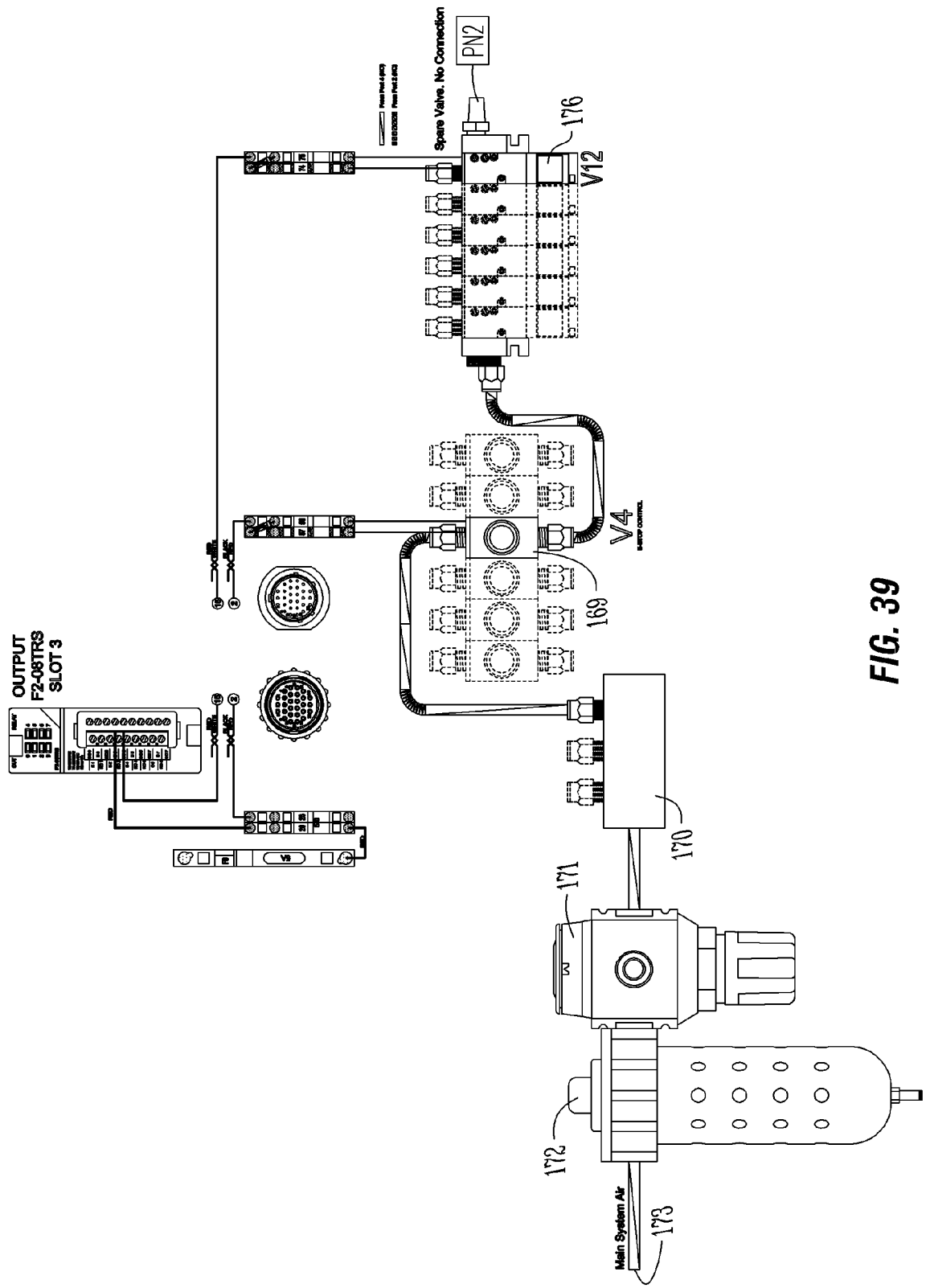

FIG. 39 is a schematic of the electrical and pneumatic distribution for adding on a pneumatic component to the system according to an exemplary embodiment of the present invention.

Figure 40:
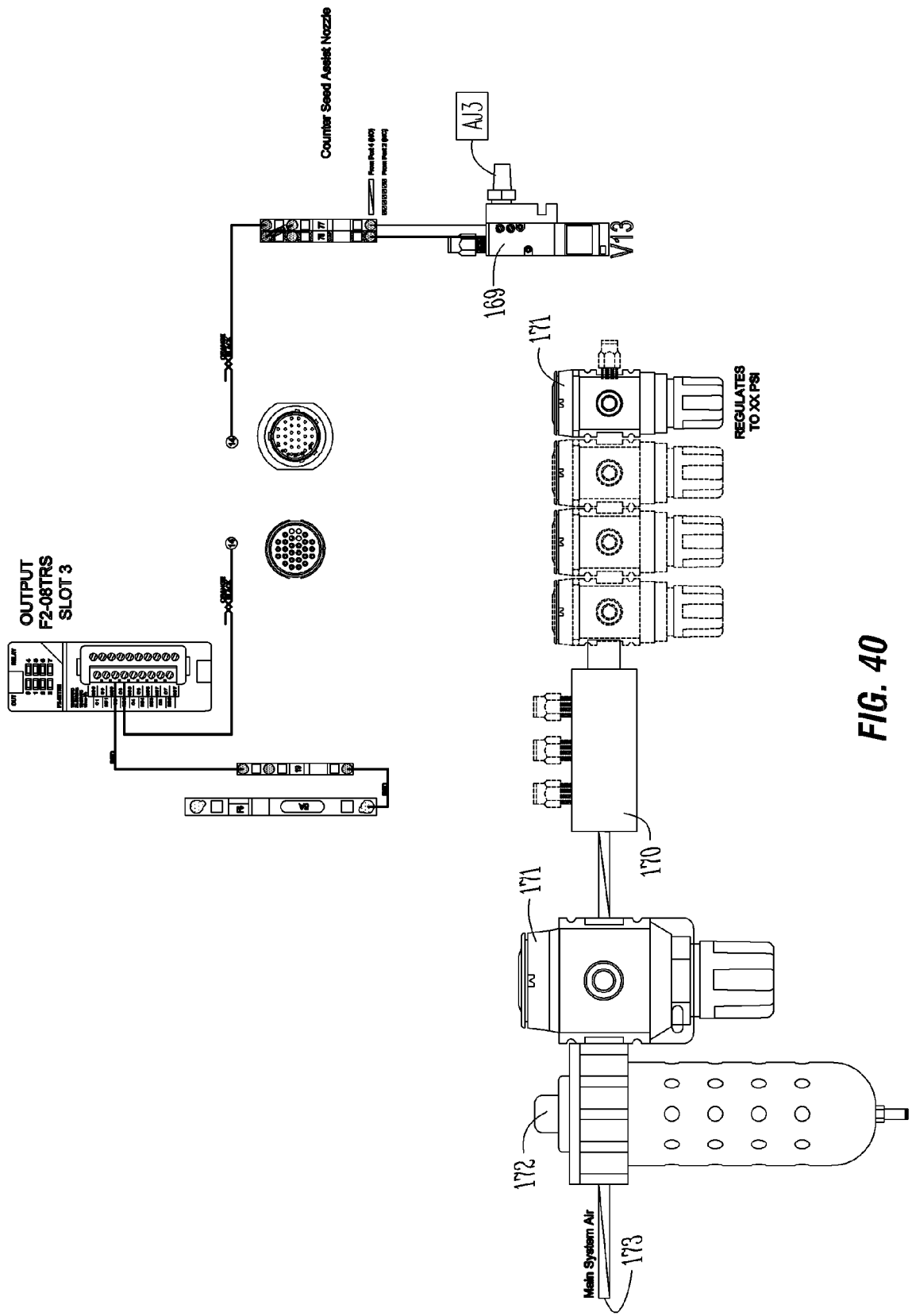

FIG. 40 is a schematic of the electrical and pneumatic distribution for an assist nozzle at the seed counter according to the exemplary embodiment of the present invention.

Figure 41:
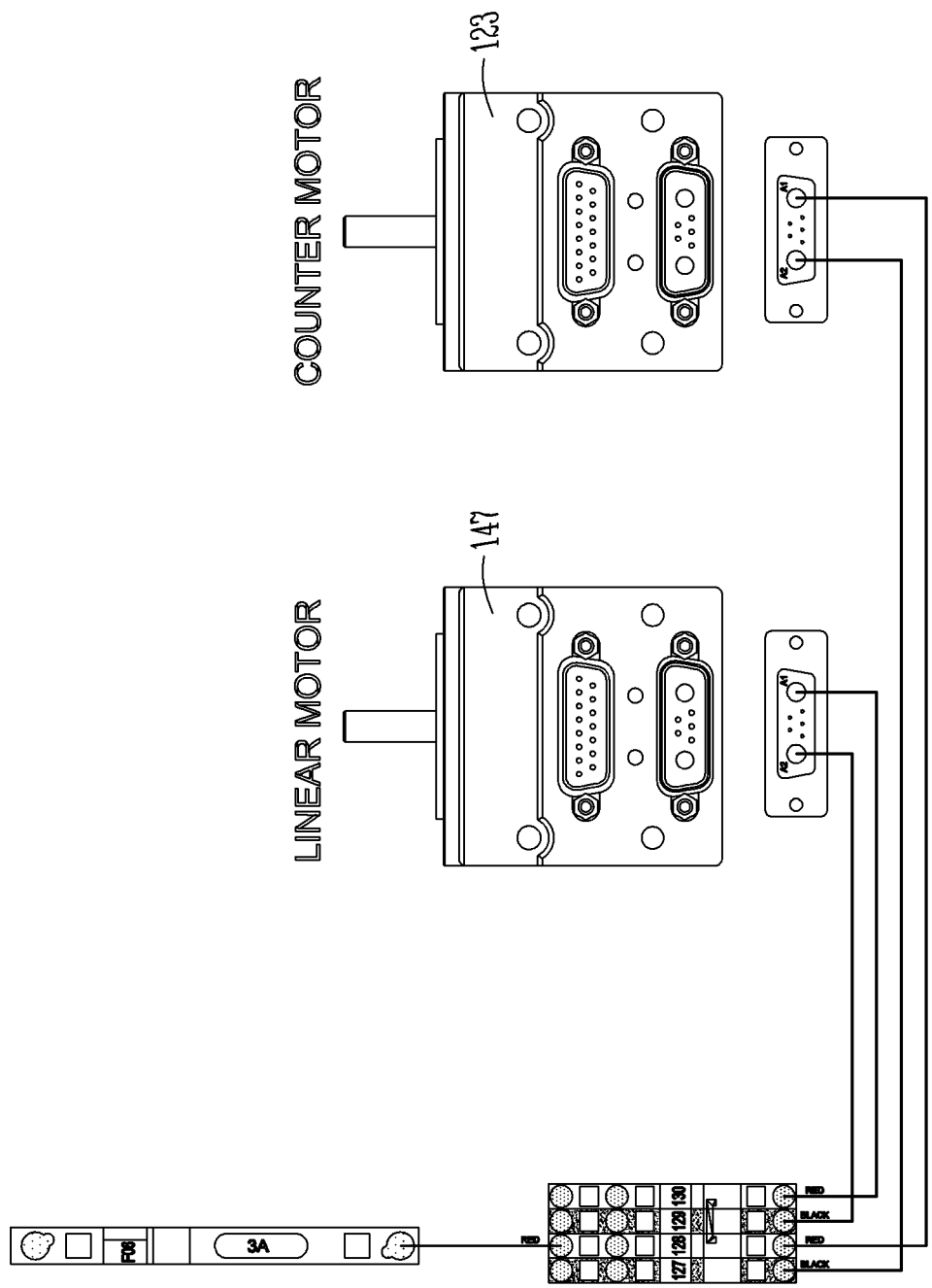

FIG. 41 is an electrical schematic of power distribution to motors of the seed counter and packager according to an exemplary embodiment of the present invention.

Figure 42:
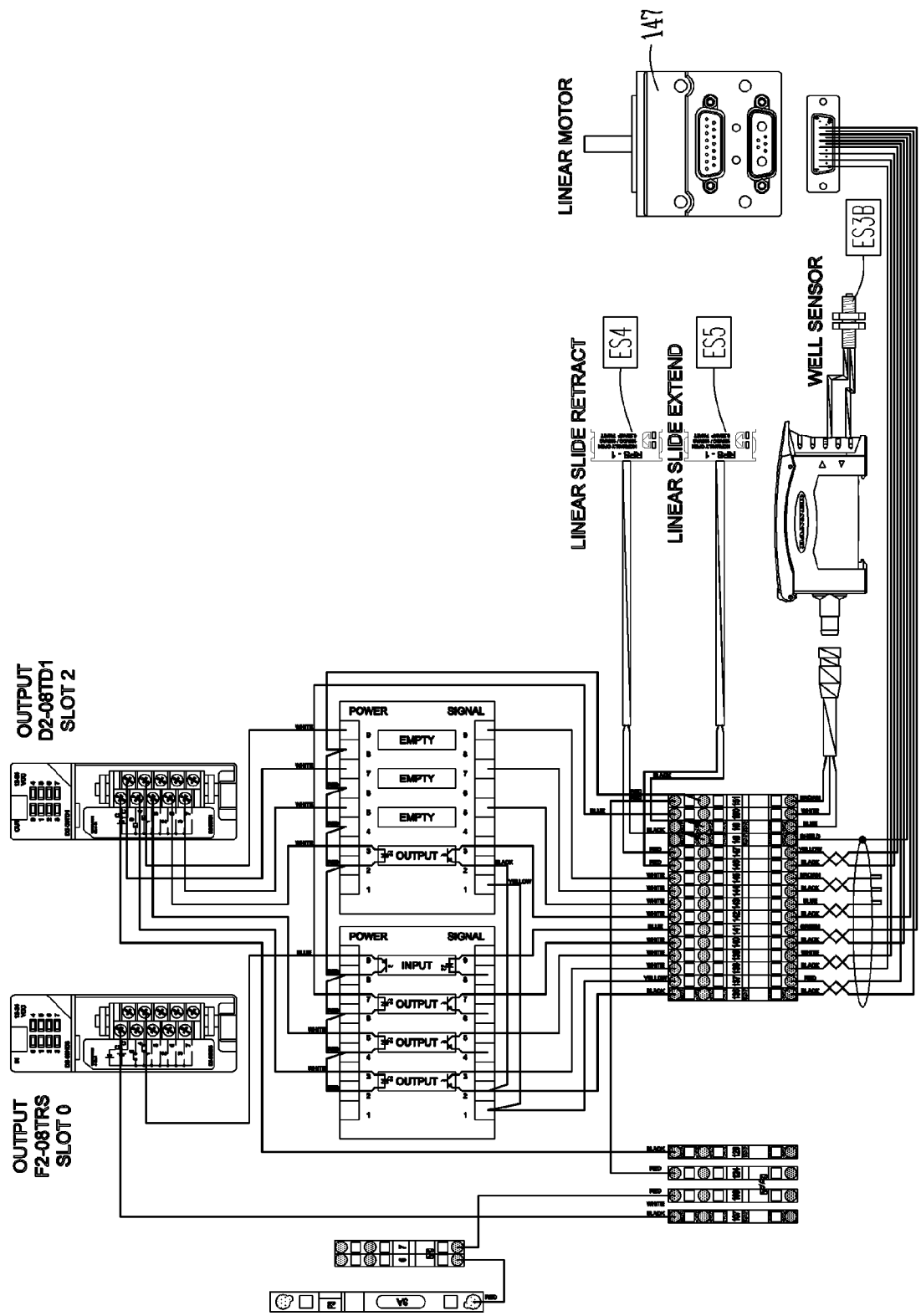

FIG. 42 is a schematic of the signal path overview for the linear motor, linear slide and well sensor of the seed packager according to an exemplary embodiment of the present invention.

Figure 43:
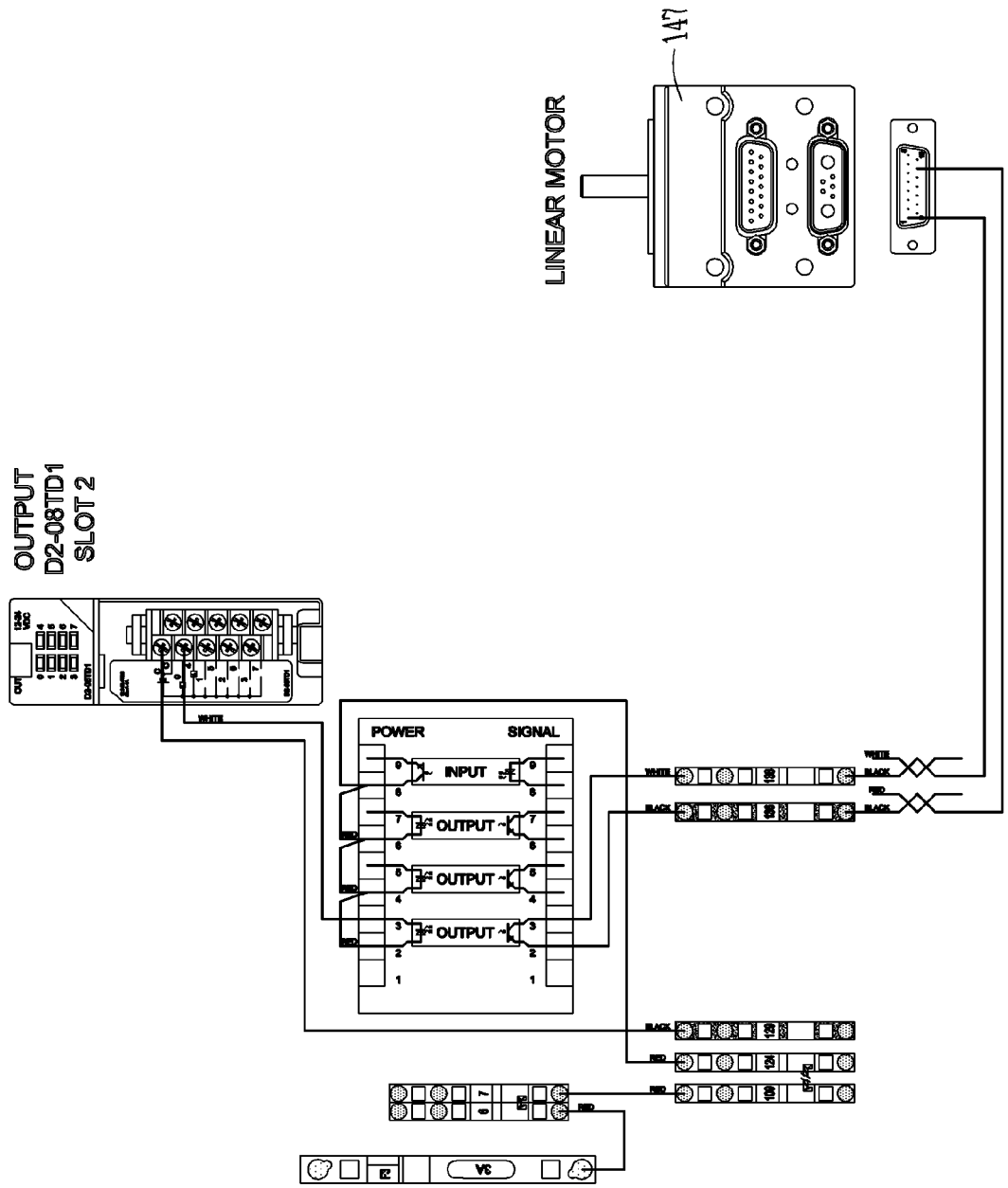

FIG. 43 is another schematic of the signal path for the linear motor shown in FIG. 42.

Figure 44:
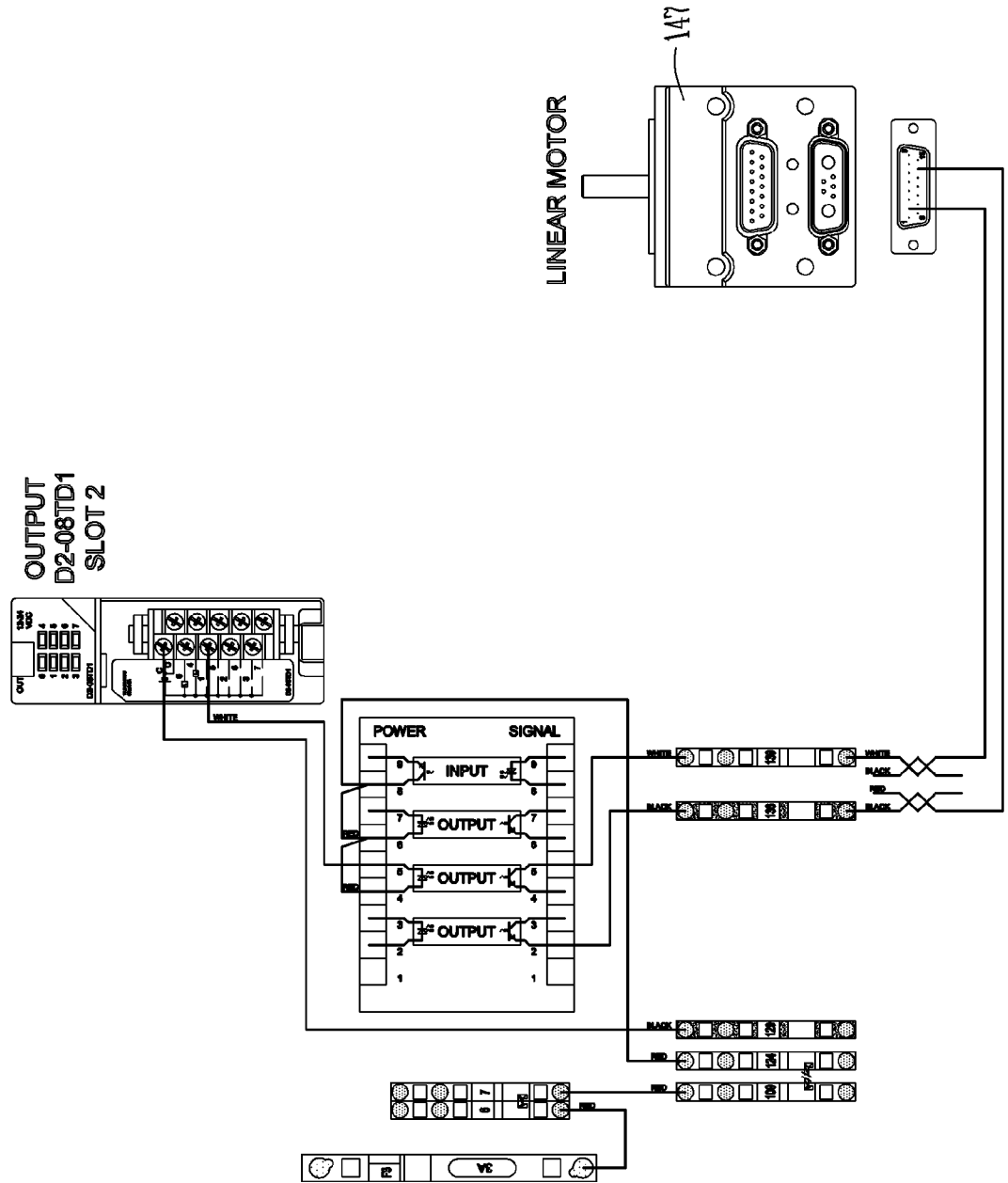

FIG. 44 is another schematic of the signal path for the linear motor shown in FIG. 42.

Figure 45:
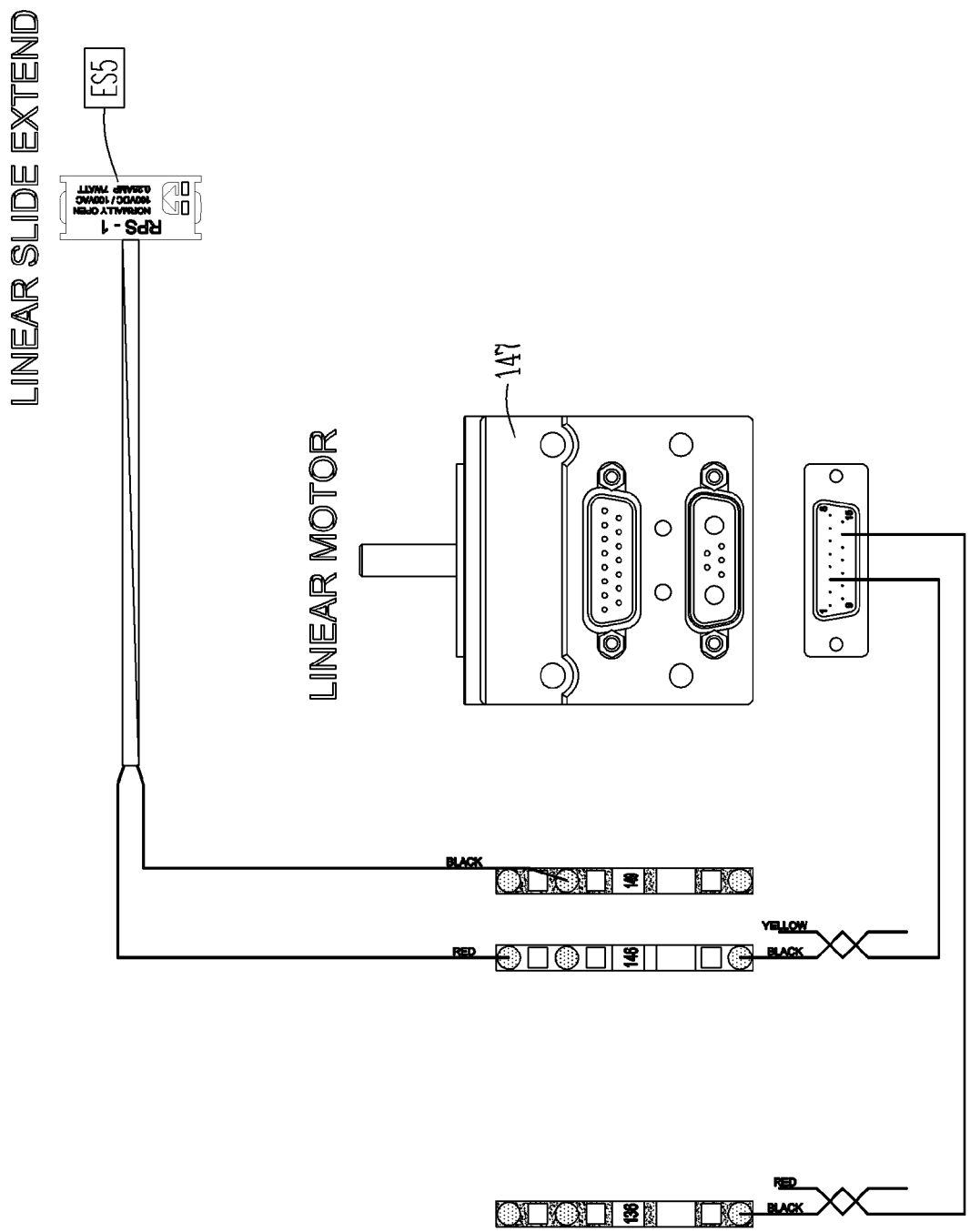

FIG. 45 is a schematic of the signal path for a linear slide extend sensor associated with control of the linear motor shown in FIG. 42.

Figure 46:
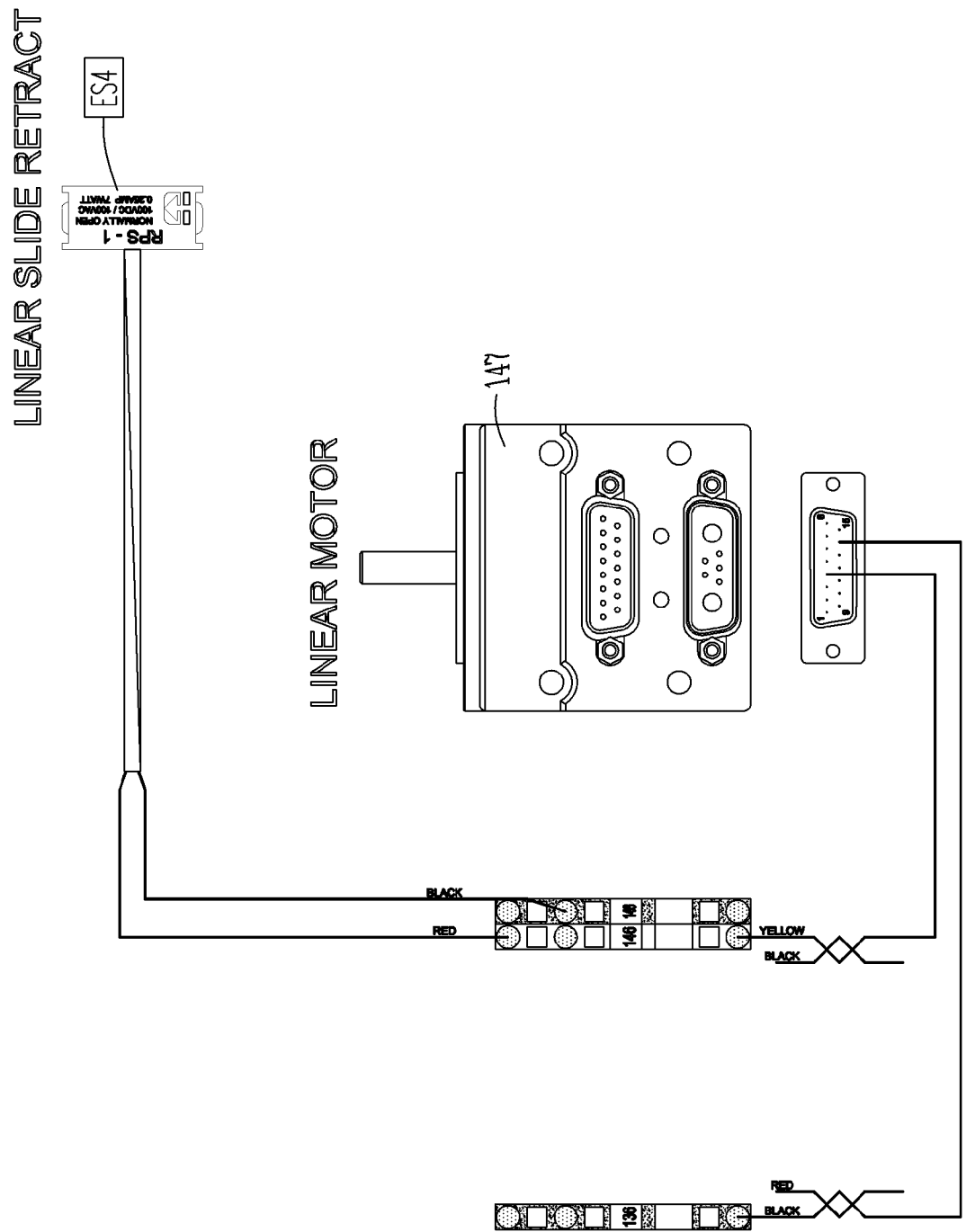

FIG. 46 is a schematic of the signal path for a linear slide retract sensor associated with control of the linear motor shown in FIG. 42.

Figure 47:
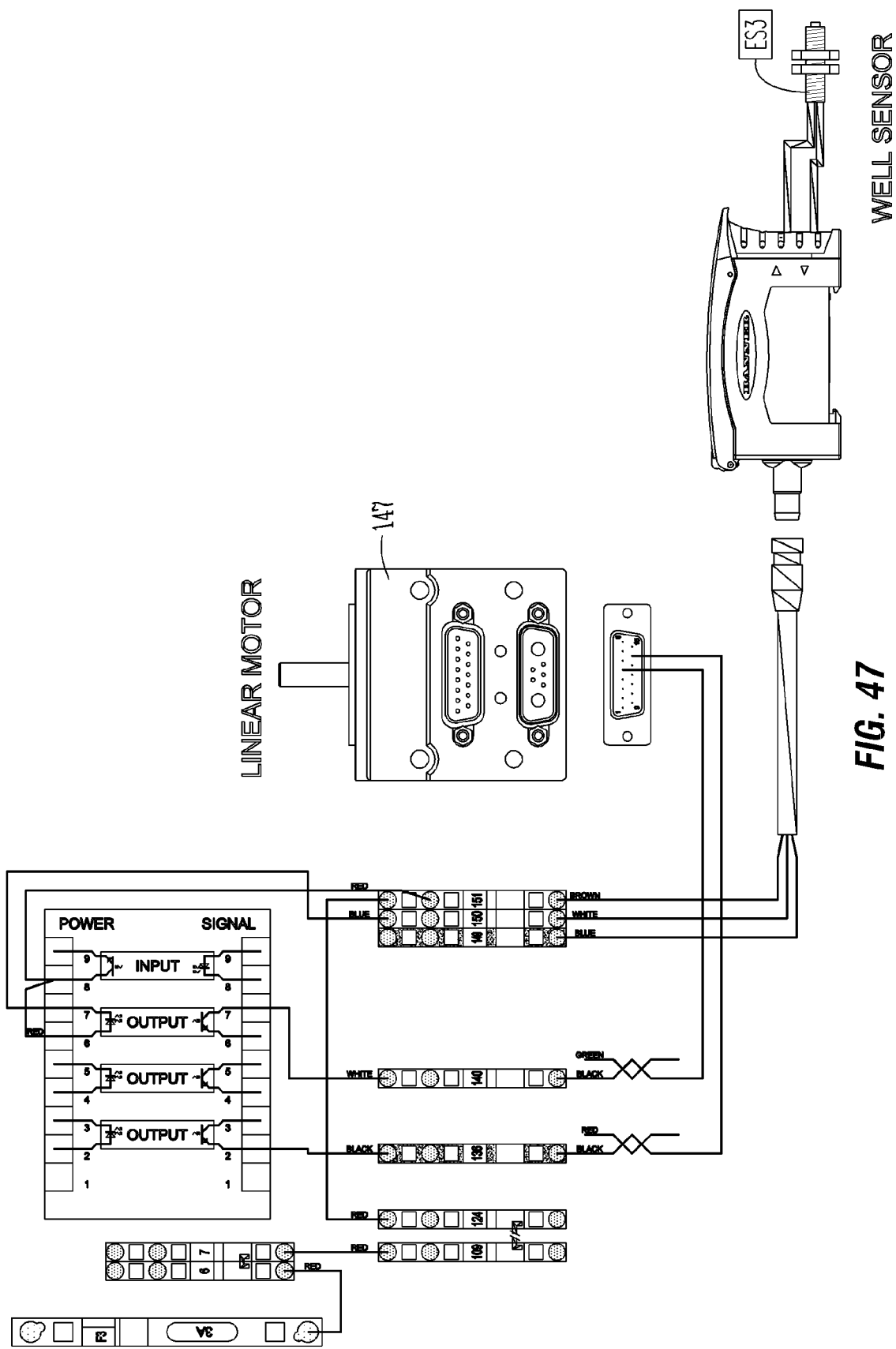

FIG. 47 is a schematic of the signal path for a well sensor associated with the seed packager according to an exemplary embodiment of the present invention.

Figure 48:
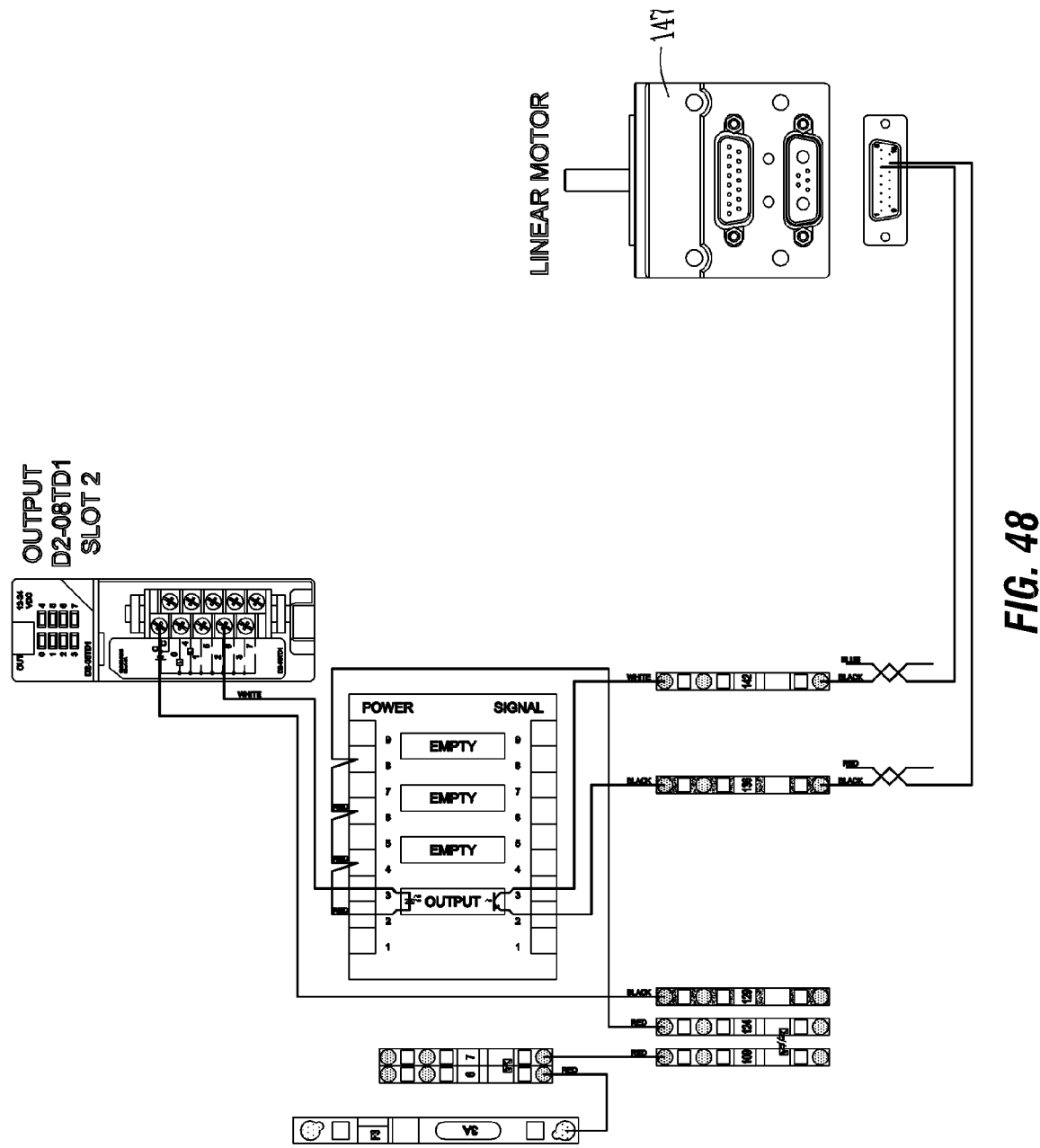

FIG. 48 is another schematic of the signal path for the linear motor shown in FIG. 42.

Figure 49:
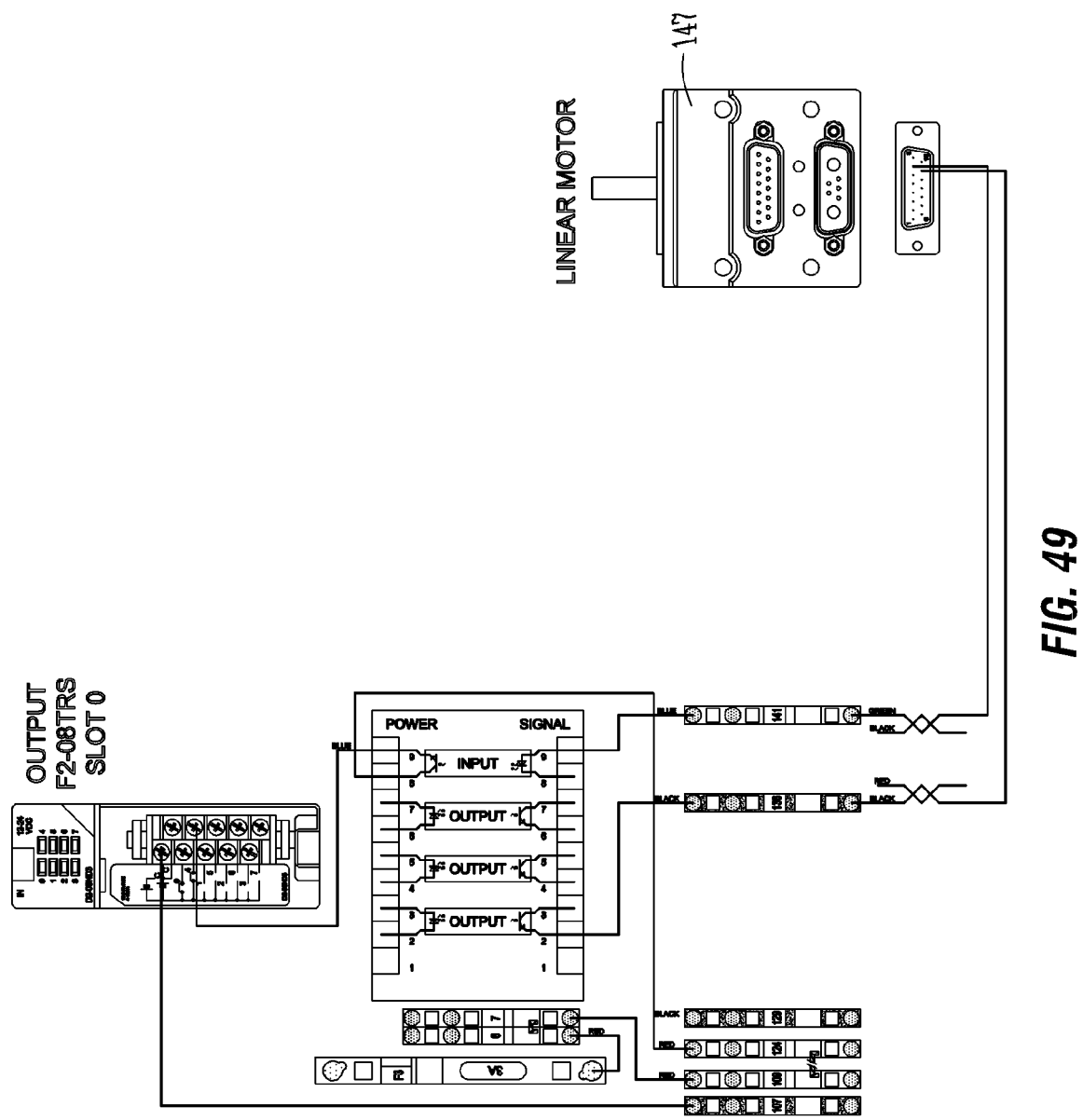

FIG. 49 is another schematic of the signal path for the linear motor shown in FIG. 42.

Figure 50:
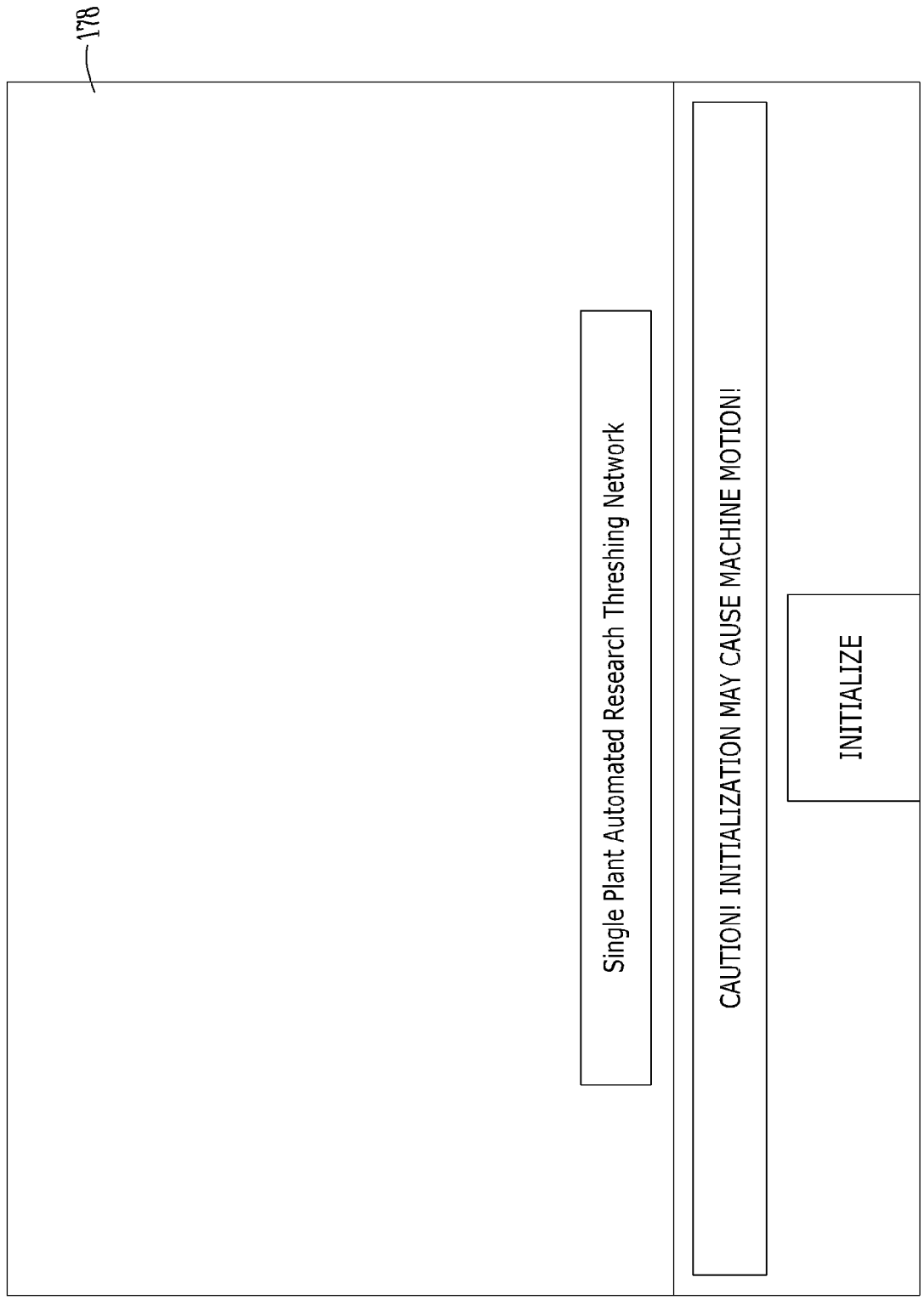

FIG. 50 is a startup screen of the graphical user interface (GUI) presented to an operator of a system according to FIG. 1 permitting a user to initialize the system.

Figure 51A:
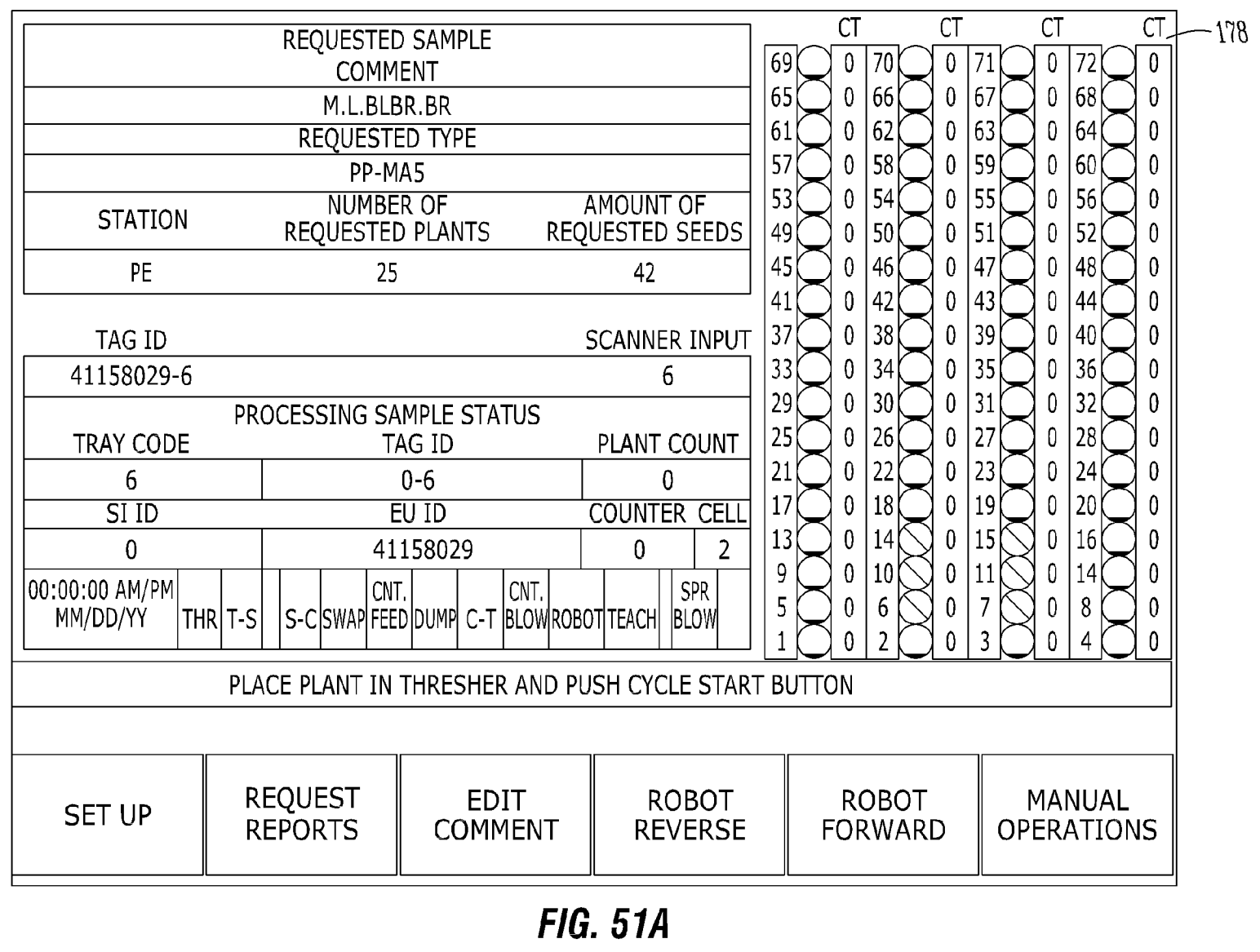

FIG. 51A is a main screen GUI of system settings, operating parameters and controls along with a real-time display of empty and filled wells of a seed tray of the system shown in FIG. 1.

Figure 51B:
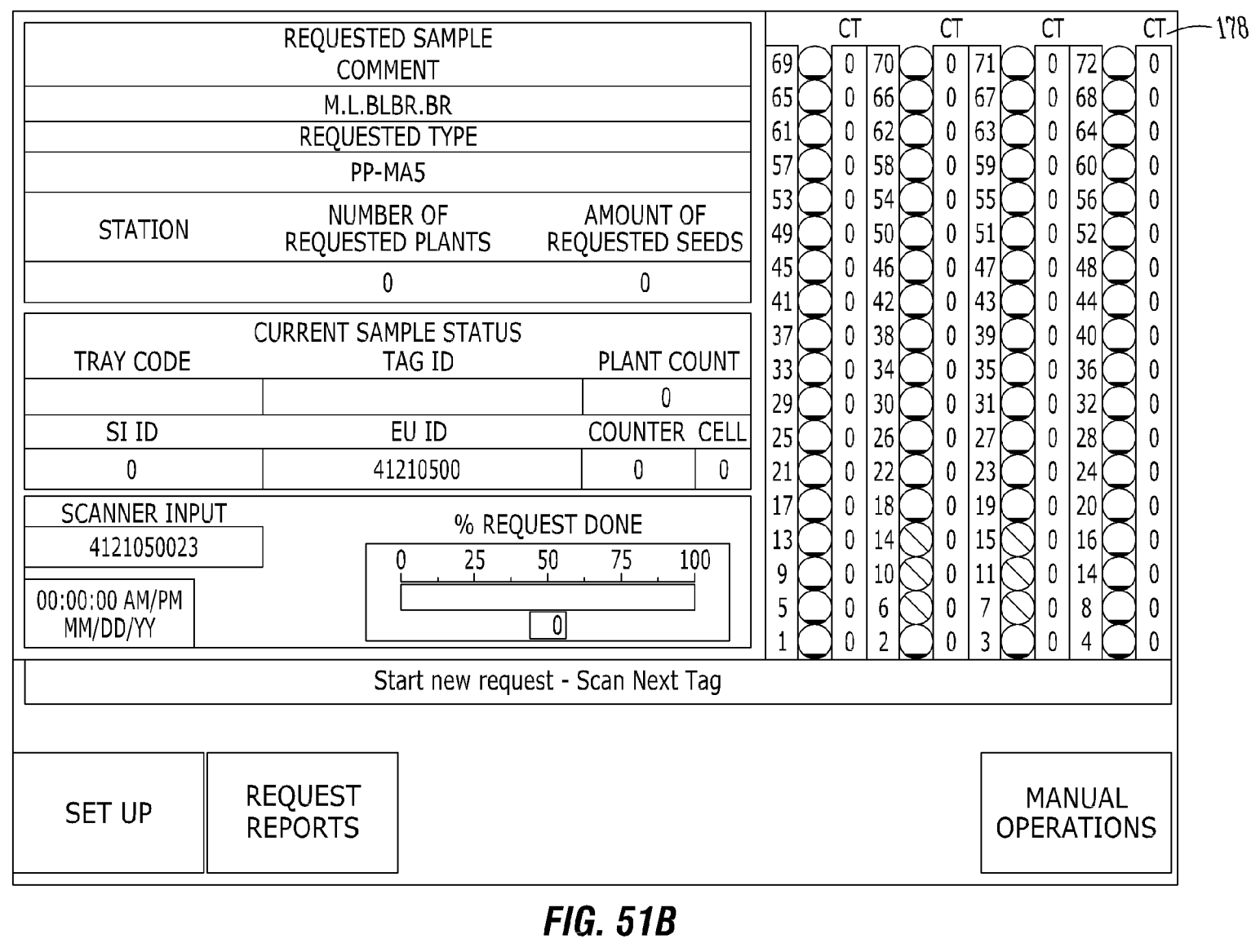

FIG. 51B is another main screen GUI of system settings, operating parameters and controls shown in FIG. 51A.

FIG. 52 is an edit command screen GUI for data entry for the system.

Figure 53:
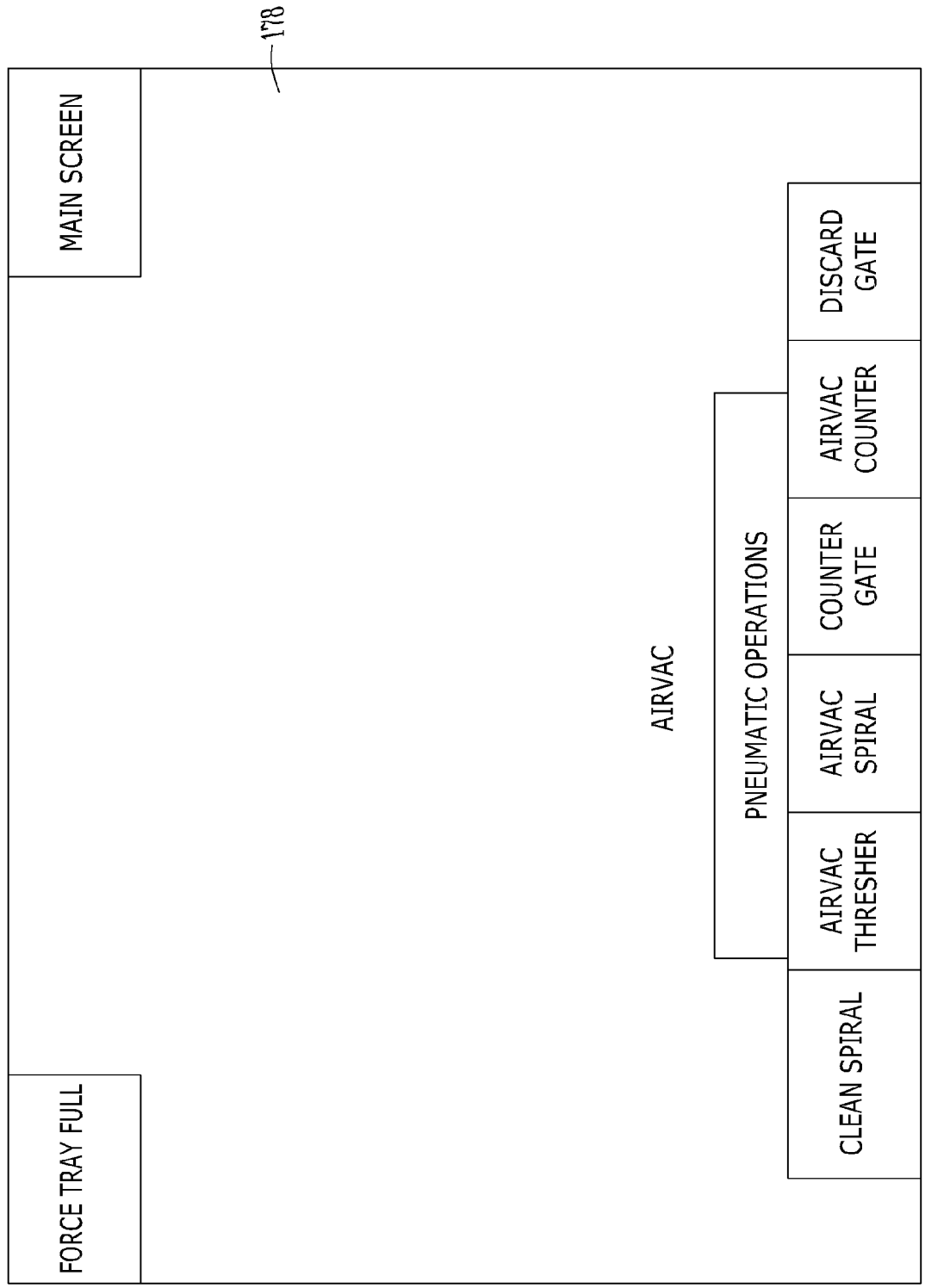

FIG. 53 is a manual operations GUI for manually controlling and operating stations or subsystems of the system shown in FIG. 1.

Figure 54A:
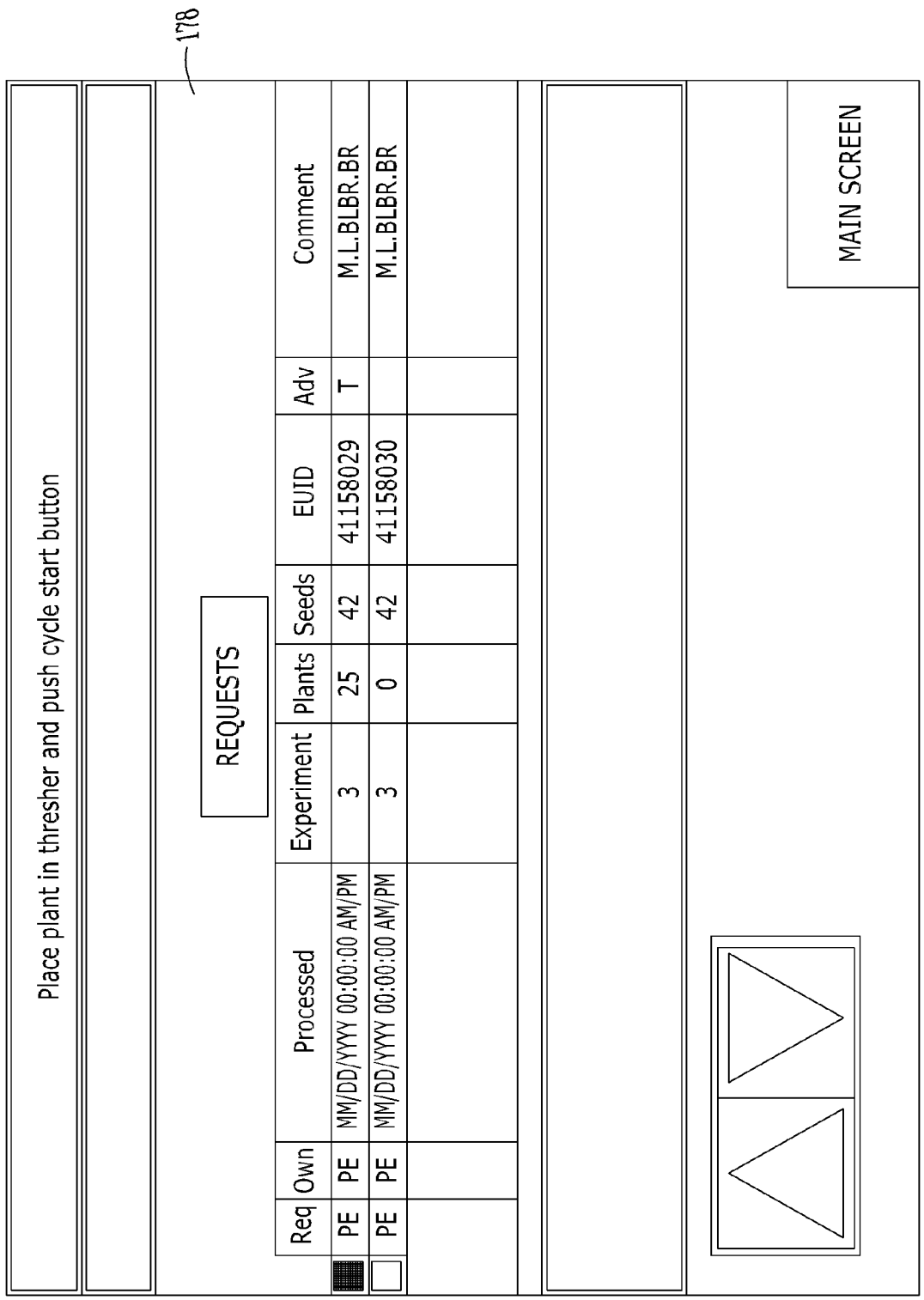

FIG. 54A is a seed request screen GUI of processed seed requests.

Figure 54B:
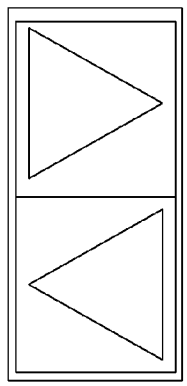

FIG. 54B is another seed request screen GUI of processed seed requests.

Figure 55A:
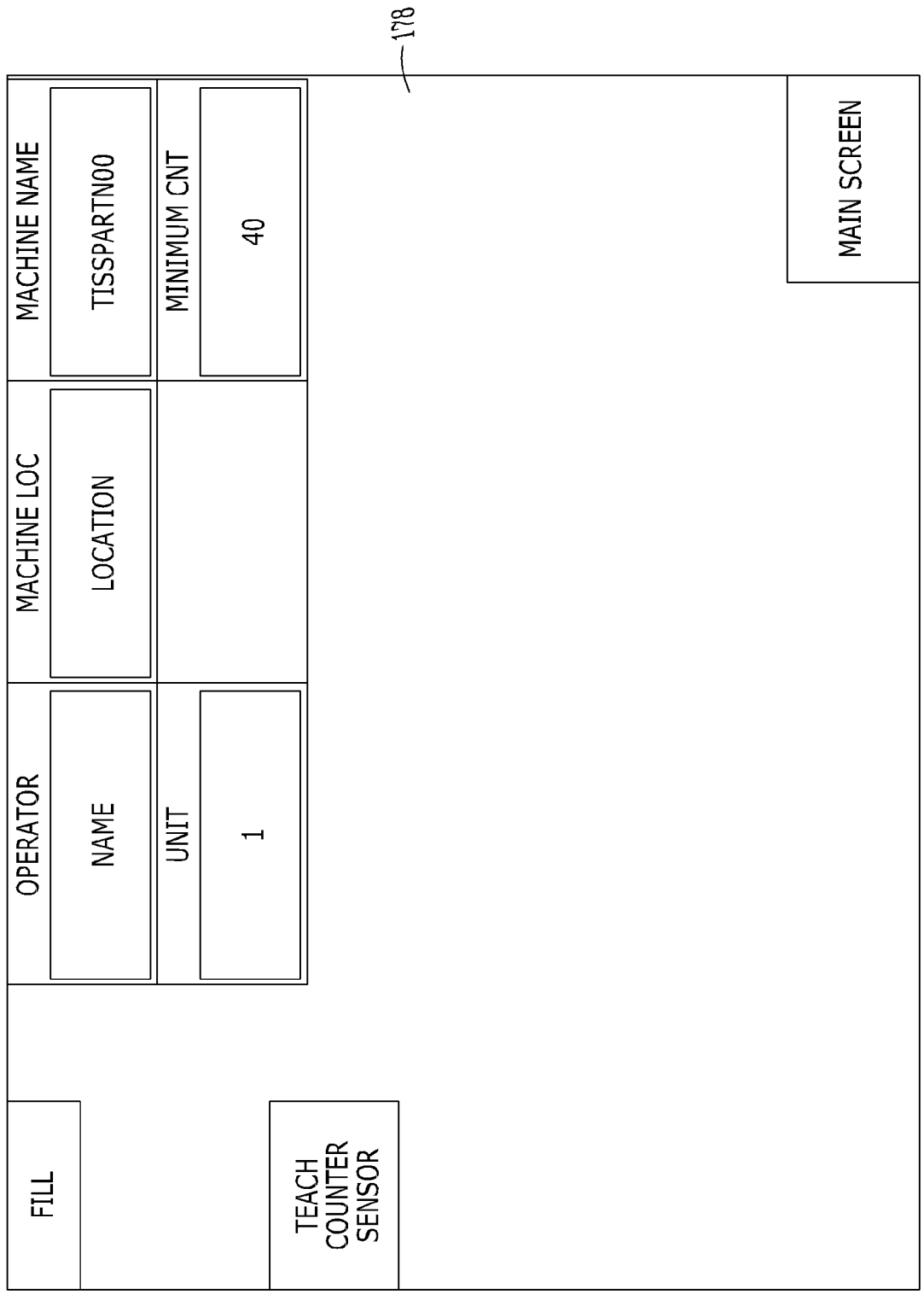

FIG. 55A is a set-up screen GUI of processing operating parameters and information associated with each job.

Figure 55B:
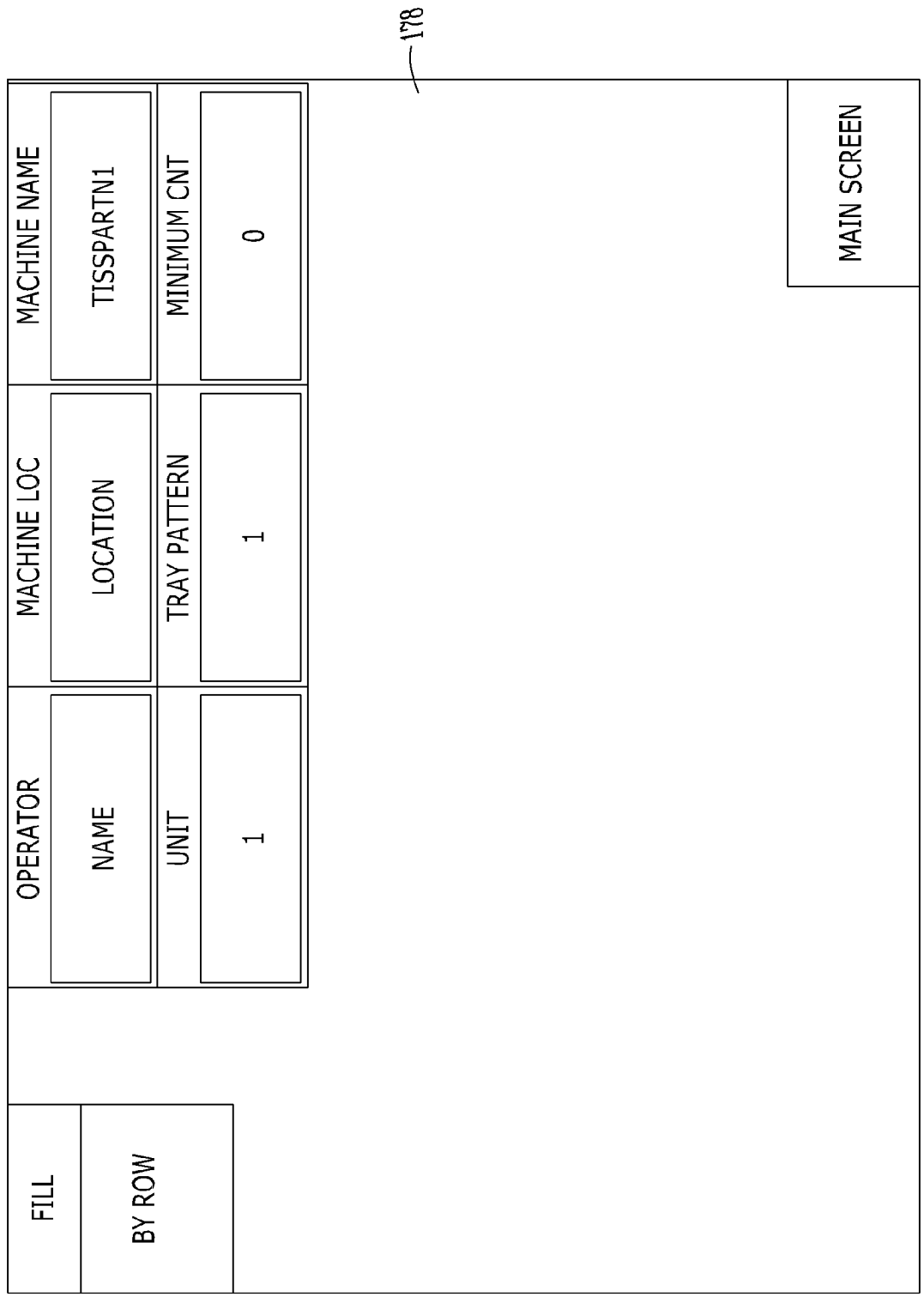

FIG. 55B is another set-up screen GUI of processing parameters and information associated with the system.

IV. DETAILED DESCRIPTION

A. Overview

For a better understanding of the invention, an embodiment will now be described in detail. Frequent reference will be taken to the drawings. Reference numerals and letters will be used in the drawings to indicate certain parts and locations in the drawings. The same reference numerals or letters will indicate the same parts or locations throughout the drawings unless otherwise indicated.

B. General Environment

The embodiment will be discussed in the general environment of processing soybean seed for breeding purposes. The embodiment would preferably be housed in a suitable building, in a controlled environment, preferably shielded from outside environmental conditions.

C. Overall System Apparatus and Information Structure

FIG. 1 diagrammatically illustrates a soybean seed processing system 10. A controller 12 is operatively connected to a computer 14. Alternatively, system 10 could be configured to operate solely under the direction of controller. Together controller 12 and computer 14 operate with system 10 to provide an automated conveyance line for receiving soybean plants, plant parts (e.g., pods), and/or seed, which include or have associated with them a removable machine readable identifier, such as tag 18, sometimes called a harvest tag, (here bar coded), and perform a variety of functions to process seed from the soybean plant to the point where the seed is counted and placed into a container, such as a multi-well seed tray 20A, envelope 20B or bag 20C bearing machine readable labels 22 in condition for further use, e.g., for continued use in soybean breeding programs. Multiple container types are suitable for use in combination with the packaging system of the present invention, such as for example, a single-well tray, a multi-well tray, a compartmentalized carrier, or a flexible wall carrier. Other identifiers in addition to a machine readable identifier are contemplated herein. Other identifiers for identifying the container or plant include such identifiers as a tag, a label, an RFID tag, or any like identifying means.

Soybean samples from particular field plots are harvested. Bar codes are generated by known methods with identifying information about each harvested plant. Identification information, such as a bar code, can be associated with any part of the plant, such as for example the plant, a part of the plant or a collected seed batch separated from the plant. Identification information can be read and entered automatically from scanning or read and entered manually by a keypad. The identifying information is correlated to a data store or database format that can be used in maintaining an overall seed inventory and control system for a plant breeding program.

Instead of individual, manual handling and conveyance of each sample to process it for further use, system 10 automatically processes each seed request.

But additionally, in parallel, system 10 validates each sample by matching identity of previously harvested seed with seed delivery requests, keeps track of each seed request, and can gather additional information about the seed and/or seed request. This additional information can be used to update the data store/database 15 with information relating to filling the seed request or the seed associated with the request, and can be transferred and used by other information handling and processing systems.

As a result, the objects of the present invention are achieved. Seed requests are processed in less time, with less chance for error, while automatically tracking and gaining additional information and knowledge about seed used to fill the seed request.

FIG. 1 illustrates diagrammatically an example of system 10, including various subsystems and/or processing stations in a continuous processing line. The subsystems/stations can vary in number and function.

Controller 12, which may be a programmable controller such as a programmable logic controller (PLC) (see also FIG. 19), is in electrical communication with a number of actuators, sensors, and computer 14 via a network, such as an Ethernet network, (indicated diagrammatically by reference number 46). Controller 12 includes a display 13 and a touch screen for data entry or operation of system 10 as shown generally in FIGS. 50-55B. A keyboard could also be used for data or command entries into computer 14 or controller 12. Controller 12, in combination with computer 14, controls much of the operation of system 10, and allows operator initialization and adjustment of certain parameters. Controller 12 may be configured to be in communication with one or more components, subsystems or networks of the present invention, such as for example, an identification system, a single seed counting system, a packaging system, a conveyance system, and at least one data store, separation system, sorting system, network, graphical user interface and/or computer.

System 10 is linked not only by the conveyance path 17, 116, and 117 between each subsystem/station, but also by a combination of electrical and pneumatic circuits (shown generally in FIGS. 16-49), which will be discussed in more detail later. Generally and for purposes of reference, system 10 uses pneumatic transport tubes to convey batches of seed from subsystem to subsystem. Electrically controlled line vacuums supply pressurized air to the pneumatic transport tubes for transporting seed between subsystems. The electrically controlled line vacuum actuators are referenced by LV1, LV2, etc. Pneumatic conveyance is not the only way to move seed samples, but is considered preferable, and perhaps the best presently known way for conveying seeds for a number of reasons. Among those reasons are that it is clean, conveys seed at reasonably high speed but with minimal trauma, is easy to install and plumb, has no moving parts for less complexity and more reliable and durable operation, is easier to fix and maintain, and is highly adaptable to different space and path requirements. With pneumatic conveyance, such as where air tubes are used, there is less concern that seed being conveyed will become lost, separated from the batch or be misplaced given the confined nature of the system. Relatively small diameter, flexible, clear tubing can be used for the conveyance paths.

Gates and doors are operated by electrically controlled pneumatic actuators (solenoid operated) referenced by PN1, PN2, etc. The actuators have two-way ported cylinders; they are actuatable to one of two states by placing higher pressure on one side of the cylinder ram and creating lower pressure on the other side relative to one state or the other. Many of these actuators hold gates or doors in a normally closed state or first position, but when actuated, move a gate or door to an open state or a second position to create or change the pathway for seeds to pass.

By referring generally to FIGS. 1, 9-11C and 14B, it can be appreciated that controller 12 controls the actuators as follows. Controller 12 communicates with solenoids associated with each actuator by sending an electrical signal which energizes the solenoid. The solenoid energizes its actuator supplying compressed air to a pneumatic cylinder (two-way) that has two states. The compressed air pushes the ram of the air cylinder. This mechanical force is then usable to open and close doors or gates, or open and close pathways for compressed air.

The electrically controlled actuators, motors, moving or counting systems can have electrical sensors associated with them which inform controller 12 of the state of the actuator, motor, moving or counting systems. Thus, controller 12 can monitor whether a gate or door is open or closed whether a part or component has moved far enough or too far, if the count is correct for any quantified metrics, or if a necessary component or piece is properly positioned to proceed with one or more of the operations associated with system 10. These sensors are referenced by ES1, ES2, etc.

Computer 14 and controller 12 can include a display 13 and a data entry interface, e.g. touch screen or keyboard. Computer 14 could reprogram controller 12, or controller could be directly reprogrammed. An operator could therefore quickly change such things as the timing of operation of the various controller-controlled components of system 10. Controller 12 would be programmed to send instructions at appropriate times to any of the electronically controllable components in system 10 using electronic controls, which are referenced in the figures by EC1, EC2, etc.

Software could time the operation of the various components so that they did not have to continuously operate, even though no seed was at any particular subsystem. On the other hand, software could control the components to allow more than one batch of seed to be in process, but at different subsystems of system 10 at the same time.

Bar code reader 11, as well as information from other subsystems shown, is interfaced with controller 12 which communicates with computer 14 for manipulation or storage of information via Ethernet network 46 or wireless communication of data or control signals.

The above-described combination provides intelligence to controller 12 and computer 14 for operation of system 10. System 10 is therefore not only highly automated and autonomous, it is flexible. Safeguards can be programmed into system 10. For example, sensors can inform controller 12 that a certain gate is ajar. The programming can stop processing until the gate is checked. Other checks, error alarms, and monitoring can be built into system 10, such as safety off switch shown in FIG. 8 or finger sensor shown in FIG. 24.

Of course, system 10 must be initialized prior to operation. This includes calibration. For example, thresher 28 and spiral separator 30 may be adjusted for providing different run/cycle times. Timing can be adjusted for different numbers of seed per batch. For example, programming can wait for a pre-set time period for a function in one of the subsystems to be complete before activating another. This time period may need to be extended for larger batches of seed or shortened for smaller batches.

The first station of system 10 (shown generally in FIGS. 6-7E) is thresher 28 (e.g. Model Number: BT-14 from Almaco, Nevada, Iowa) (see FIG. 1). As is well known in the art and commercially available, thresher 28 shown in FIG. 8 receives single plants and/or pods of soybean as input and mechanically separates the seed from the unwanted plant parts. Seed 19C already separated from unwanted plant parts could be input into thresher 28 at collection chute 29. Alternatively, seed 19C could be dumped directly into collection chute 39 at the backend of thresher 28. In one embodiment of the present invention, soybean plants 19A are brought to thresher 28. A bar code reader or scanner 11 is used to read the tag 18 associated with soybean plant 19A to validate the information that has been encoded in a bar code on tag 18. This validation process, made possible by the pre-existing knowledge base in a data base, essentially authorizes the process of that batch of seed through the processing line by matching identity of previously harvested seed with a matching seed delivery request. System 10 does not necessarily require thresher 28. In the case where seed, already separated from any plant parts, such as seed 19C in envelope 16B, is presented at system 10, system 10 would not necessarily require thresher 28.

A pneumatic conveyance system moves the seed from the output (collection chute 29) of thresher 28 to the next subsystem, here referred to generally as spiral separator 30 (e.g., Gravity Spiral Seed Cleaner, from H & T Sheet Metal Mfg., Inc., Humnoke, Ark.). It is well known in the art that debris, some damaged seed, and other unwanted material is separated from good seed or other unwanted plant parts by spiral separator 30. Spiral separator 30 could include additionally one or more aspiration points along the chute to remove unwanted plant parts from desired seed. Aspiration points could include low pressure air nozzles directed at the flow of seed within the spiral chutes. Aspirators or air nozzles are referenced in the figures using AJ1, AJ2, etc.

A conveyance system would move the batch of seed from the output (collection chute 29) of spiral separator 30 to the next subsystem, referred to generally here as counter 36. FIG. 1 illustrates an embodiment of counter 36, namely a single seed counting station/system. Counter 36 counts the number of desired seed (the seed count matching the number of seed requested in the seed request). In a preferred form, counter 36 counts a batch of seed by single seed quantification. For example, unlike mass quantification systems such as NIR or photo analysis, counter 36 individually handles and counts seed by singulation of each seed from other seed in the batch to match the number of seed being requested with the actual number of seed counted. Excess seed above the requested seed count is automatically discarded by counter 36. In a preferred aspect, the single seed counting system quantifies seed counts to match target seed counts in each seed request order by keeping all seed from a plant, keeping enough seed to meet the target count and discarding remaining seed from a plant, or discarding all seed from a plant. See request orders that cannot be filled may be handled by a default operation, user intervention, feedback from local or networked communications with a business logic processing system, and/or onboard intelligence associated with the counting system.

A conveyance system then moves the batch of quantified seed to the next subsystem, seed packager 37, where the batch of quantified seed is directed by an automated shuttle into the seed container, such as a specific well in a multi-well container, such as tray 20A.

Once one of the seed containers 20A, 20B, and 20C are loaded, computer 14 can generate labels 22 which can add derived or stored information to the label, here including a bar code. The computer 14 can also generate a label 45 for a box 44 holding seed containers 20A, 20B, and 20C. The bar code for box 44 could contain information about which container of seed samples are in the box, shipping information, and/or other information.

FIGS. 2A-D illustrate one specific methodology that can be utilized with system 10. This method could be implemented through appropriate software written in appropriate language for use by controller 12 and computer 14. It will be discussed in more detail later. Of course, variations can be used.

FIGS. 3A-B, 4 and 5A-B diagrammatically illustrate the information flow structure and parallel flow of information and product through system 10. Note how system 10 has in real time validated it is processing the right sample and immediately adds to the knowledge base regarding the seed request as it is processed for packaging and shipping.

The central database can run as an application on an enterprise-wide LAN. A database utility takes information and puts it into Microsoft EXCEL files (or comma separated values (CSV) files) into a local Microsoft ACCESS database files, copied from a remote server. A small application communicates with controller 12 and gives information back to controller 12 and lets it process. When through, system 10/controller 12 picks up and sends information, time/date (and sequence #), etc. to computer 14 which can generate a label.

D. Specific System Apparatus and Example of Processing

FIG. 6 gives an assembled view of stations 28, 30, 36, and 37 and the conveyance systems and mechanisms between them.

FIGS. 7A-14B illustrate stations 28, 30, 36, and 37, and associated components, in more detail.

FIG. 15-49 illustrates an electrical/control panel of cabinet 140 as well as the electrical and pneumatic circuits for system 10. These figures provide details of one way to pneumatically and electrically build and configure these sub-systems.

FIGS. 50-55B illustrate examples of graphic user interfaces (GUIs) such as could appear on display 13 of controller 12 or a display of computer 14 related to initialization, set-up and operation of system 10, and formatting of labels printed for filled seed requests and boxes for filled seed requests processed by system 10.

An exemplary specific seed request process, in accordance with the programming of FIGS. 2A-C, will now be described with respect to the specific apparatus shown in FIGS. 6-55B. Steps of the programming of FIGS. 2A-C will be called out while referencing each processing station and/or parts thereof with reference numbers.

The different stations/sub-systems and the devices and methods used at the stations in system 10 can vary. For example, one device may be able to adequately perform the functions accomplished by thresher 28 and separator 30 in FIG. 1. Some seed, such as seed 19C shown in FIG. 1, may not need to be threshed.

In the present embodiment, however, related to processing soybean seed delivery requests for soybean breeding, threshing, some type of cleaning and sorting, and packaging, along with at least singly counting seed for quantification purposes are preferred.

Below are more specific details regarding components/sub-systems that could be used in system 10 illustrated diagrammatically in FIG. 1.

1. Preliminary Steps/Bar Code Reader

System 10 is initialized. The operator sets parameters via keyboard or touch screen on display 13 associated with computer 14 for the particular seed request or order being processed. Different settings on thresher 28, separator 30 or counter 36 may be necessary for accuracy of the system. Such settings normally will have been calibrated by prior testing of system 10 with the same or similar type of seed.

Electrical power (AC and DC) is presented to the controls in control panel 162 (see FIG. 15) Likewise, pneumatic pressure is generated and distributed through air carrying, actuating and regulating components via pneumatic inputs and outlets illustrated at FIGS. 28-40 (here around 90 psi at 40 CFM minimum). The pneumatic system (shown generally in FIG. 28) includes a source of compressed air introduced at pneumatic air input 173. As is generally part of a pneumatic system, a lubricator 172 and one or more pressure regulators 171 are provided. One or more of the pressure regulators 171 may be a variable pressure regulator 174, such as shown in FIG. 29. The pneumatic system preferably includes one or more distribution manifolds 170, 175 (see FIG. 31) operating in combination with one or more pneumatic valves 169, 176 (see FIGS. 34-39). The system also may include one or more pressure switches 168.

Figure 2A:
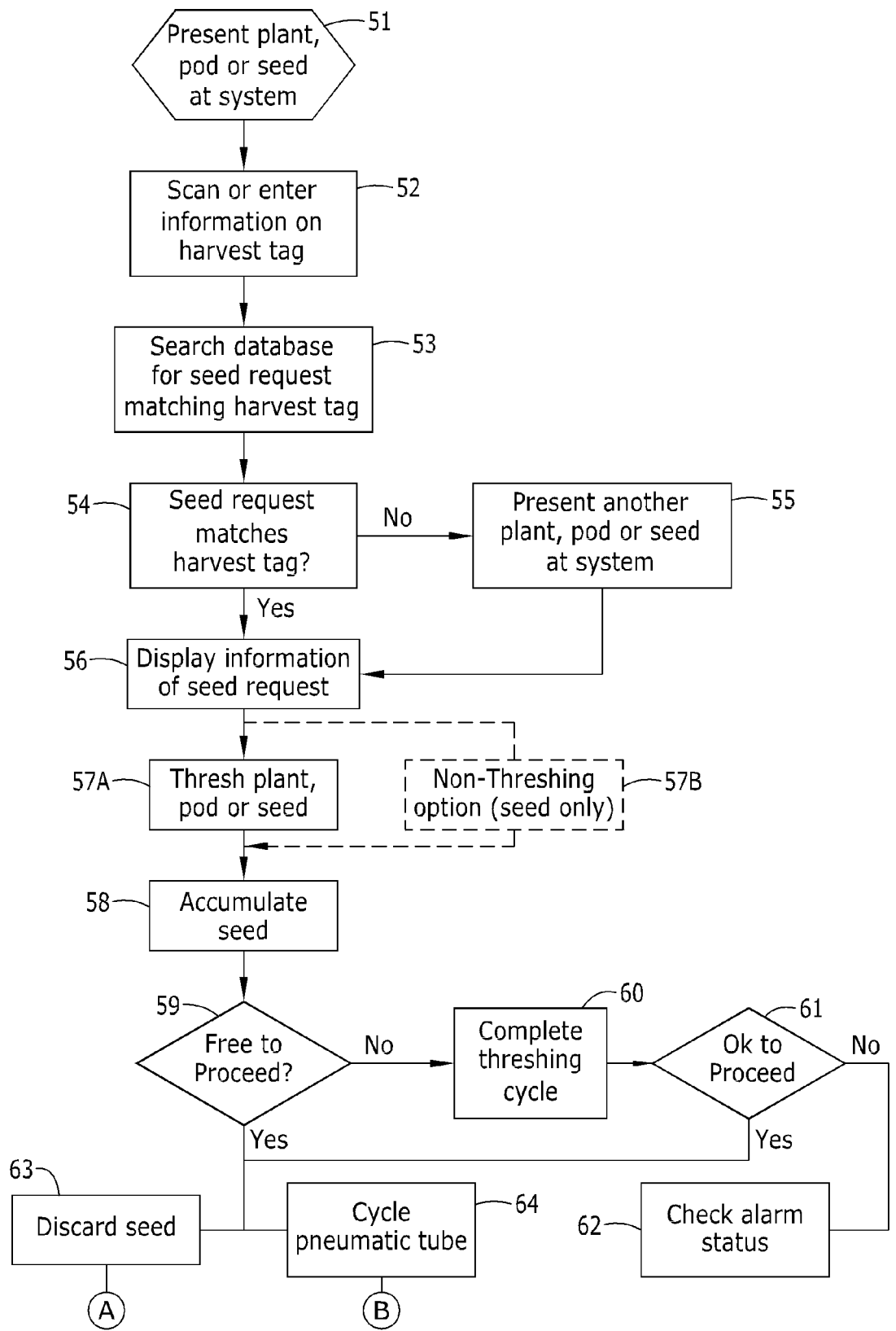
Figure 2B:
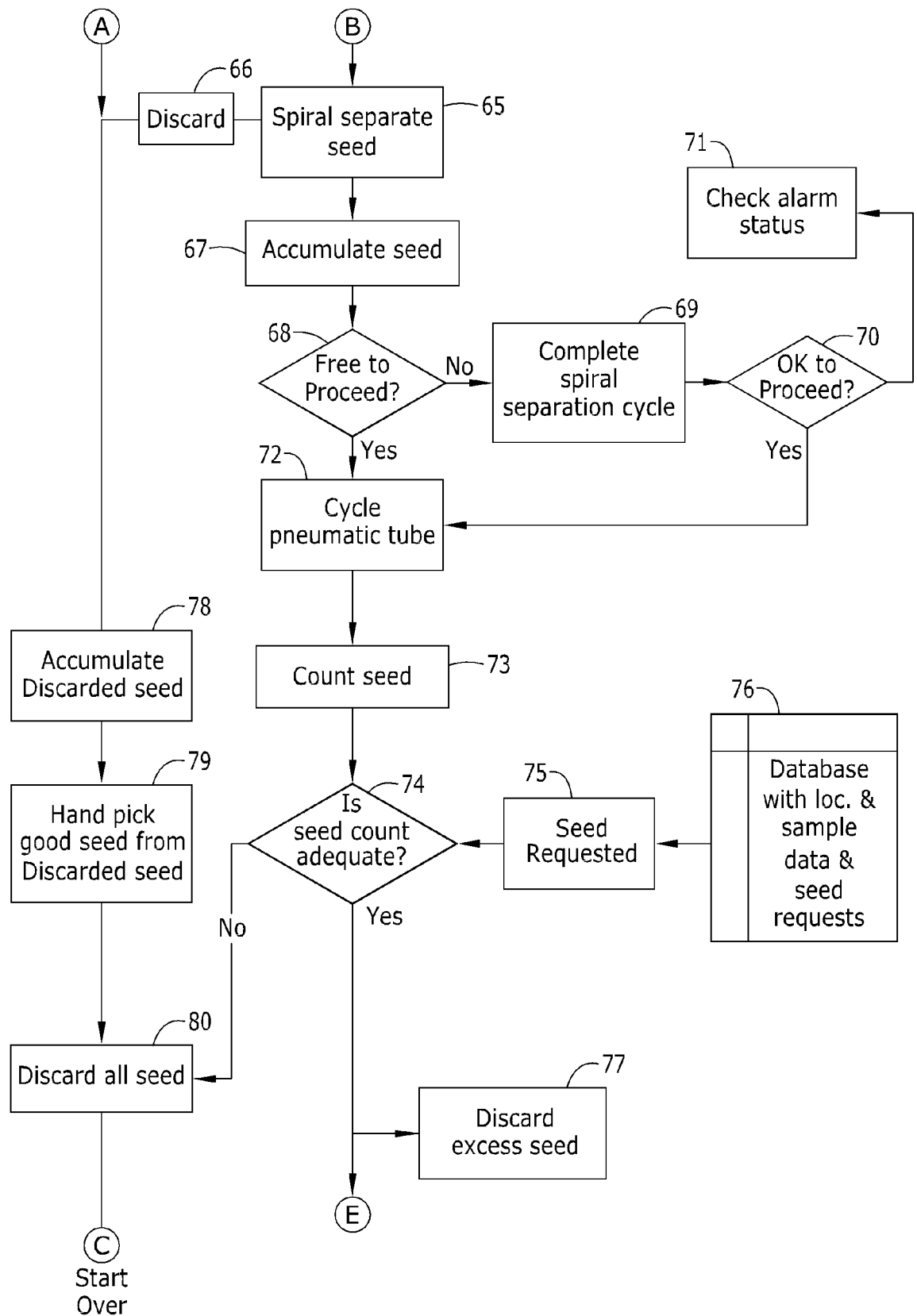
Figure 2C:
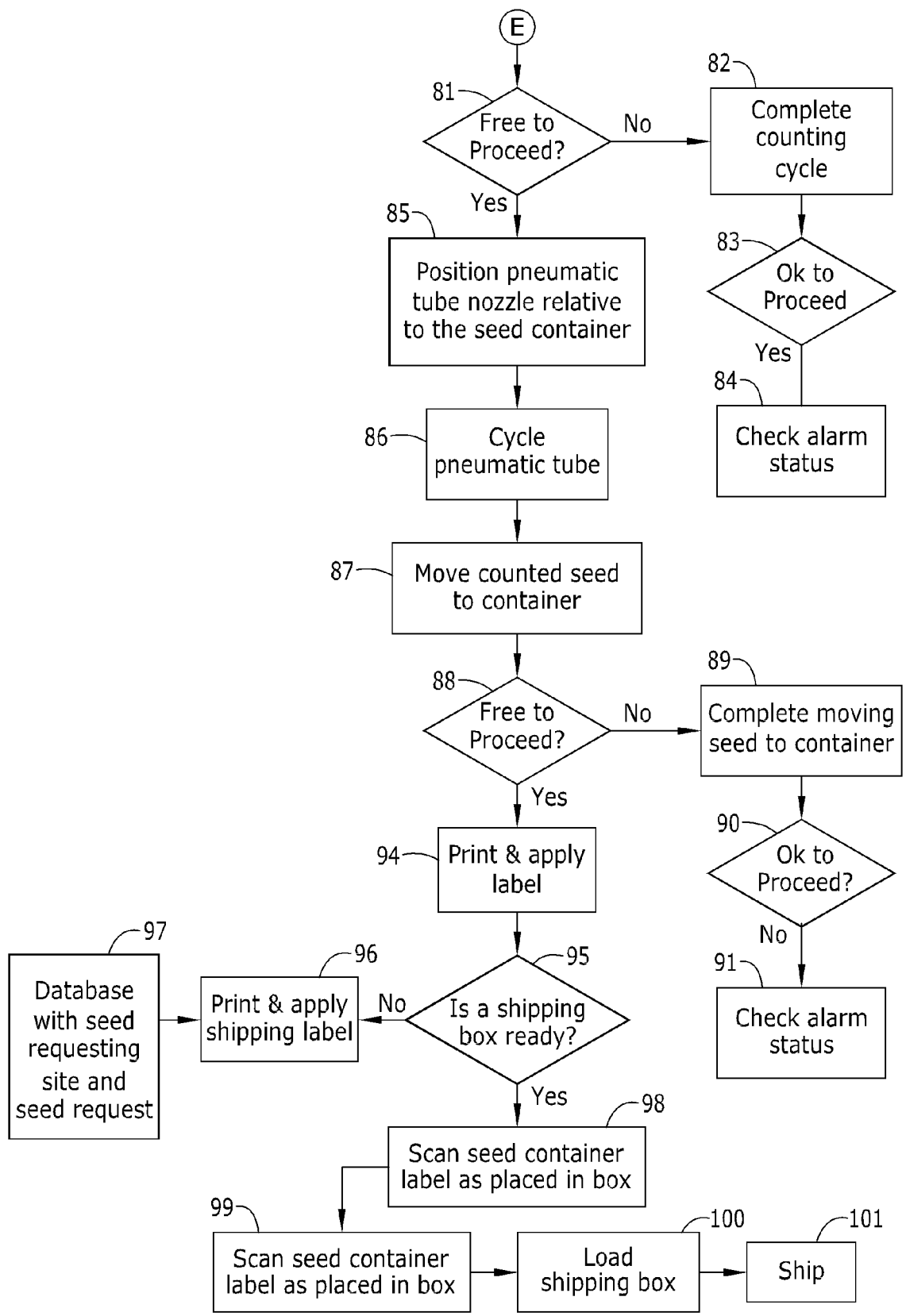

Soybean plants 19A can be bagged in bags or banded together, and each plant can be bar code labeled as previously described (see FIG. 2A, step 51). By scanning the bar code with scanner 11 (see also FIG. 23) or manually entering information from off of the harvest tag (step 52) using display 13, information regarding the nature of the soybean plant 19A and the essential facts for records can be obtained by system 10 to validate whether the criteria for the soybean plant 19A matches any one of the existing seed requests stored in computer 14 (steps 53-55). The information regarding the plant and seed request can be displayed to an operator (step 54), and a decision can be made whether to proceed with threshing it (step 57A). Information associated with a seed request order may include such information as seed type, seed count, package type, seed packing arrangement, number of plants to be processed and/or the seed order requesting location. Note that the soybean may be delivered in pods 19B or as seed 19C. In the case where the soybean plant is received at system 10 as seed 19C, the seed could be introduced directly into the separator 30 (step 57B) or processed with thresher 28.

If the soybean plant 19A does not match a seed request, the plant may be discarded, the plant may be processed through system 10 and seed discarded, the plant may be processed through system 10 and the seed kept for later use, or the plant may be put back into stock until orders for additional seed requests matching the plant are received at computer 14 via a network, server 179, central 47 or enterprise 48 database connected to computer 14 and/or controller 12. The soybean plant 19A not matching any particular seed request could be processed and the seed placed in envelopes 20B or bag(s) 20C, the database of computer 14 can be updated, a label can be updated (a new label can be created by label generator 42), and bag(s) 20 closed and loaded into a shipping container 44, which itself could have a label describing its contents, if desired. The filled envelopes and bags could be kept and recalled from storage until a seed request matching the criteria for the stored seed is received.

A bar code reader or scanner 11 (e.g. Honeywell Model 4820i, Honeywell International Inc., 101 Columbia Road, Morristown, N.J. 07962) is positioned to read a bar code from a pre-created bar coded tag 18 on soybean plant 19A, envelope 16A holding soybean pods 19B or envelope 16B holding seed 19C (see FIG. 23). The bar code on tag 18 could contain information such as indicated in Table 1.

TABLE 1

| Database field | Data |
|---|---|
| Field 1 | Data ID (for tracking & data linkage):_____ |
| Field 2 | Soybean Type:_____ |
| Field 3 | Genetic Information (Genotype):_____ |
| Field 4 | Test Plot Information:_____ |
| Field 5 | Harvesting Location:_____ |
| Field 6 | Seed Request Order No.:_____ |
| Field 7 | Container Fill Pattern:_____ |
| Field 8 | Seed Requesting Location:_____ |
| Field 9 | Seed Counts:_____ |
| Field 10 | (User Defined) _____ : _____ |

A bundle of soybean plants 19A (typically comprising 8 to 10 plants) can be manually separated and an identification tag 18 on one of the plants scanned to match the identity of the previously harvested plant 19A with a seed request or order existing in one or more of the databases associated with system 10. To assist in identifying or validating the previously harvested seed, a seed request order number linked to a data store may be used for recalling information associated with the seed, plant or plant part having the seed. Upon validation of a matching seed request order, the soybean plant 19A can be loaded into thresher 28.

It should be noted that bar code reader 24 can read information that identifies soybean plant 19A, and soybean pods 19B or soybean seed 19C in envelope or bag 16A-B. Computer 14 therefore can store and keep track of the relevant information about the soybean seed throughout the entire process. This information can be stored in a memory, text file, or a data store as well as in a database. The term "data base" is to be broadly construed to refer to any set of data regardless of its format, the type of application associated with the data (i.e. spreadsheet, database), the type of storage such as a data store used to store the data, etc. A local database 47 can be created in computer 14 with such identifying information. Local database 47 can be in contact with an enterprise or central database 48 associated with one or more computer networks.

Figure 3A:
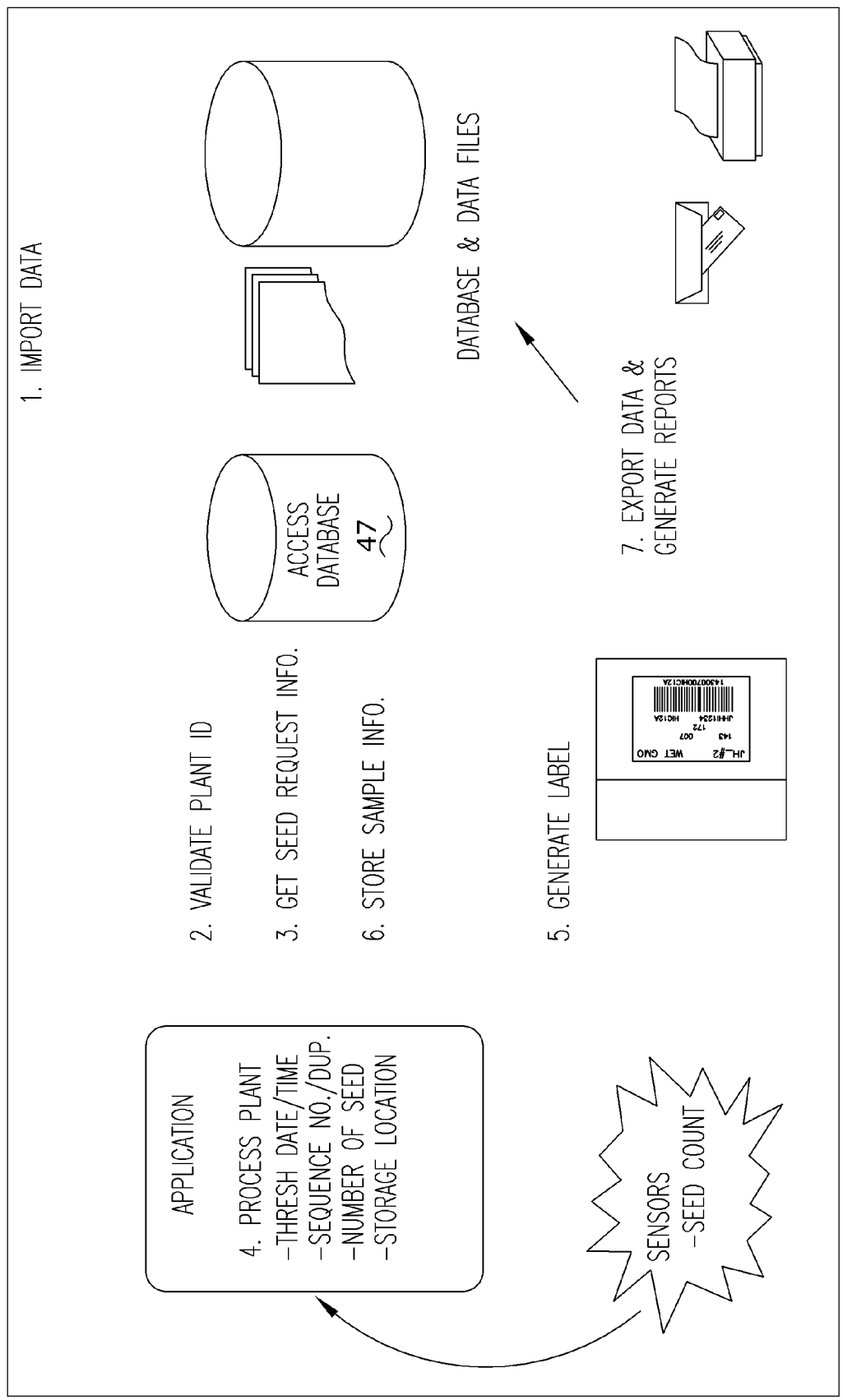
FIG. 3A is a process and information flow diagram according to an embodiment of the present invention.
Figure 3B:
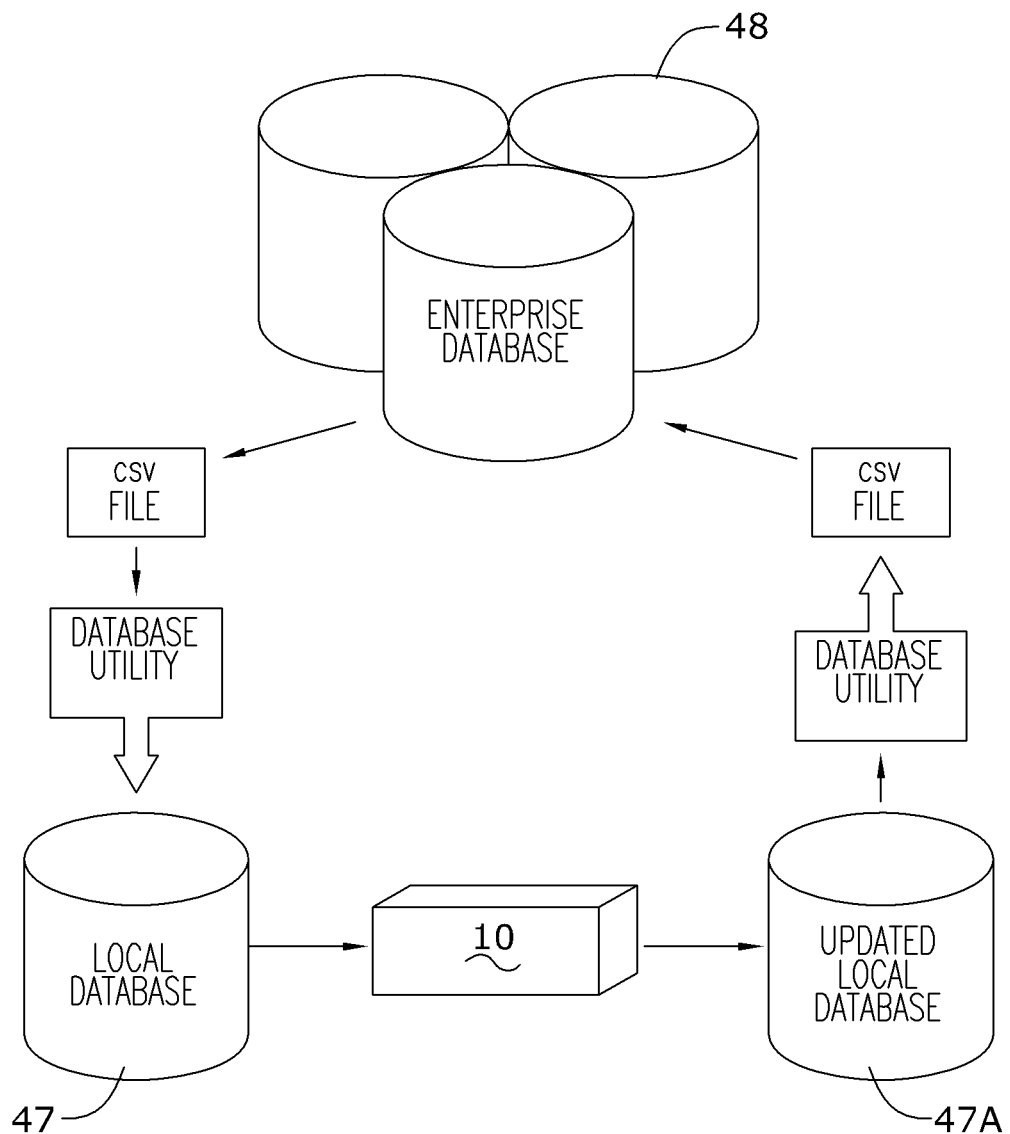
FIG. 3B is diagram illustrating the interaction of data according to an embodiment of the present invention.

The flow of information on an enterprise wide basis is best shown in FIG. 3B. Seed requests and other information such as, for example, a shipping location, the year of the seeds, the season of the seeds, the location of the seed plots, a test plot identification number, seed experiment information, whether a particular seed sample is genetically modified, and other user-defined information that may be stored in an enterprise wide database 48 is then used in a local database 47. A database conversion utility may be required, for example the enterprise wide database information may be converted in part to a file of comma separated values or another universal format. A database utility may be required to import the information from a universal format to the format of local database 47. The local database 47 may be a Microsoft Access database and the database utility may be a stand-alone Microsoft Visual Basic application. The seed processing system 10 then adds information to the local database 47 during seed processing, the updated local database 47A containing the additional information. Once the database 47A has been populated with information from the seed processing system 10, the database utility can then be used to extract the database to a comma separated value (csv) file for loading into the enterprise wide database 48.

Figure 4:
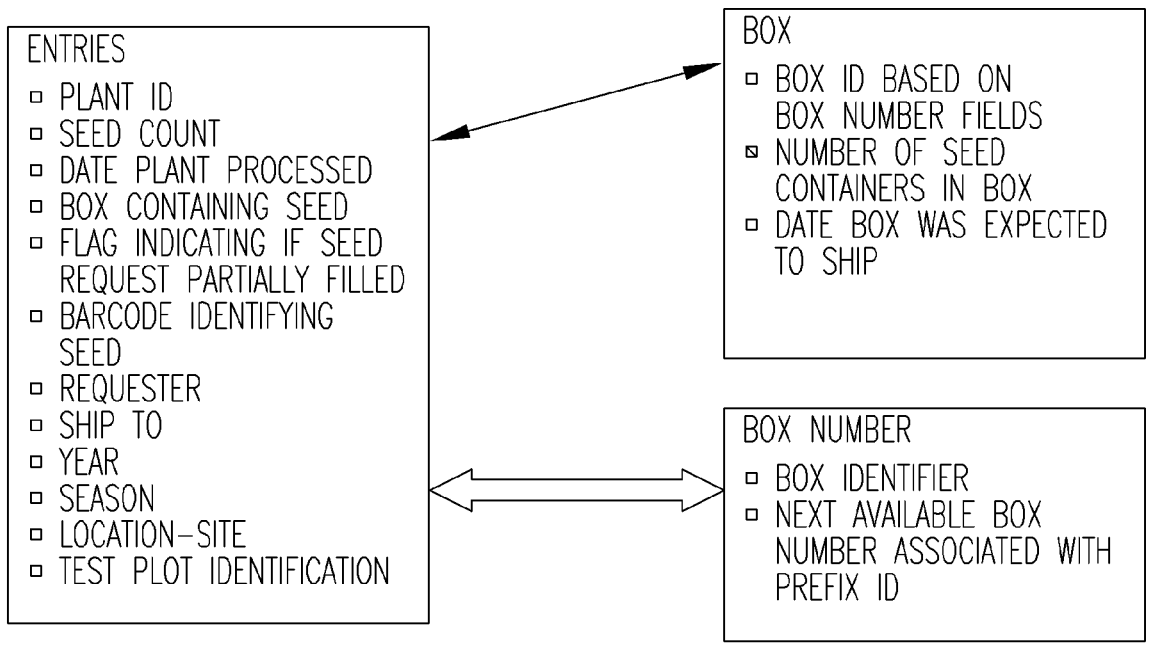
FIG. 4 is a diagram showing database tables of the local database according to an embodiment of the present invention.

The database utility creates and uses a Microsoft Access database. As best shown in FIG. 4, the database is made up of an Entries table, a Box table, and a Box Number table. The Entries table contains all of the sample data including the box the sample is stored in. The Box table contains all of the information for a box such as shipping weight and sample count. The Box Number table is used to build a new box entry in the Box table. The Box ID of the Box table is related to a data field in the Entries table. One field in the Entries table is related to the Box identifier of the Box Number table.

Also, when the harvest tag 18 is read by bar code reader 24, identifying information on the bar code is immediately evaluated to ensure the soybean plant is authorized to be processed by system 10. This step, called validation, means that the ID of plant 19C (from label 18) is checked against local database 47, which has downloaded from central database 48 a list of seed requests or orders. For example, the central database can have a complete listing of all soybean breeding experiments on-going around the world. The initial validation essentially asks whether the sample ID from tag 18 "exists", so to speak, in any of the seed requests or orders in the central database.

If the ID (identification) matches with a seed request or order in the system 10, system 10 is authorized to process plant 19C. If it does not match an existing seed request or order, an error is detected. The operator can be notified on display 13 and controller 12 does not cycle system 10.

PC 14 makes another initial decision based on information scanned in from harvest tag 18. It asks whether the plant will run on system 10. In other words, it checks whether the settings and operational parameters for each of the stations or subsystems of system 10 are set to handle the type or nature of the sample identified on label 18. For example, if the sample is presented at the thresher 28 in pods 19B or as seed 19C the system 10 may automatically alter the operating parameters for the thresher 28 and/or provide an error or alert to the operator via display 13. Thus, system 10 automatically assists in its correct and efficient operation.

2. Computer and Controller

Computer 14 is a PC-based processor with an associated display 15 and could be mounted in a stand or table at or near any one of the stations or subsystems of system 10. Operator controls and the display allow the operator to monitor certain aspects of the operation of system 10, as well as enter data or instructions.

Controller 12 is a programmable intelligent digital device (DirectLogic 205 (Micro Modular PLC) from Automationdirect.com, 3505 Hutchinson Road, Cumming, Ga. 30040) (see also FIG. 19). It could be a programmable logic controller or other PC optimizer for data acquisition for process control. Controller 12 has an integrated display/touch screen user interface 13 (e.g., FIGS. 50-55B). Controller 12 handles input and output from and to the actuators, controls and sensors of system 10 via I/O bases (see FIGS. 21-22) that communicate over an Ethernet connection. An Ethernet controller is placed in the passive back plane of controller 12, permitting signals to be sent to and received by other I/O's associated with controller 12. Input/output drivers energize relays in the back plane that open or close solenoids for the pneumatic actuators. PC 14 runs a Microsoft Visual Basic (VB) application. PC 14 communicates to controller 12 using TCP/IP (see also FIGS. 21-22). PC 14 polls controller 12 for correct status of I/O lines, essentially by one-way polling (approx. once every 50-100 milliseconds), and then writes back a new status as needed. Controller 12 is programmable.

The apparatus of system 10 allows an automatic, continuous, real time processing of seed 25, including tracking of a batch of seed that needs to be kept together, or at least precisely identified prior to, during, and after the processing.

System 10 assigns an ID string to each sample. PC 14/controller 12 pushes this string through station to station of system 10 to track each sample. In this embodiment, several seed requests can be processed simultaneously by system 10, but the invention is not confined to this. For soybean seed, each sample takes less than one minute to process through system 10. By tracking, system 10 knows where each sample is in system 10 at any given time, and thus knows when it is at seed packager 37 so that it generates the correct identification label 42 for the package for each container 20A, even though multiple samples may be proceeding through system 10 at once.

By referring to the GUI's of FIGS. 50-55B, it can be seen what types of initialization, set-ups and operations that are possible with system 10. FIGS. 50-55B show graphical user interfaces of controller 12 or computer 14. FIG. 50 shows the graphical user interface provided by the startup screen which can be accessed from the main screen illustrated in FIG. 55A-B. The startup screen allows initialization of system 10 whereas the setup screen (see FIG. 55A-B) allows the user to verify and edit, if necessary, the setup parameters of system 10. After the user has reviewed and if needed, edited the setup screen, the user may view the seed request(s) screen illustrated in FIG. 54A-B. The seed request(s) screen shows the current seed request(s) operations having been processed, currently in process and queued for processing. The seed request(s) screen is accessible from the main screen (FIGS. 51A-B). System 10 provides a manual operations screen (FIG. 53). Using the manual operations screen the user may manually operate any of the subsystems or related processes for processing a seed request. The manual operations screen is also accessible from the main screen (see FIG. 51A-B). In any of the aforementioned screens, the user is permitted to enter and edit data via edit comment screen shown in FIG. 52 providing operational commands, numeric and alphanumeric characters. FIG. 51A-B illustrates the main screen of system 10. Any one of the aforementioned screens may be accessed from the main screen. The main screen provides a real-time graphic of the filling of the individual wells in the case where seed container is a multi-well/cell container 20A, such as illustrated in FIG. 1. For example, with the particular seed request illustrated on the main screen, 25 plants have been requested with 42 seed being requested from each plant. The system is currently processing a set of 42 seed that will be deposited by seed packager 37 into cell 2 of the 72 cell seed container. The remaining 24 requested plants will be processed and the seed from each plant deposited into the desired cell in the seed container. When the seed request is complete a label can be printed to apply to the seed container, or a label already existing on the container may be pre-scanned prior to starting the seed request. Examples of the types of operator over-rides are given in the manual operations screen of FIG. 53.

Before processing the soybean plant 19A, soybean pod 19B or soybean seed 19C using system 10, the plant, pod or seed presented at the system (step 51) is validated against the seed request stored in the local database 47, central database 48 or data stores associated with system 10. Soybean plant 19A, soybean pod 19B, or soybean seed 19C presented at system 10 preferably have associated with them or have been tagged with a harvest tag 18. Tag 18 is scanned, preferably using a conventional barcode scanner (see FIG. 23) or reader 24 or information provided by tag 18 may be manually entered into system 10 (step 52). Tag 18 associated with soybean plant 19A, soybeans 19B, or soybean seed 19C is validated against seed requests stored within system 10 (step 53). If there is a seed request matching the label 18 on soybean plant 19A, soybean pod 19B or soybeans 19C presented at system 10 (step 54), the accompanying seed request information is displayed for the particular soybean plant, pod or beans presented at system 10 for the operator to view (step 56) as shown in FIGS. 54A-B. In the case where there is not a matching seed request identified, the operator can discard the soybean plant, pod or seed presented at the system 10, identifying another soybean 19A, soybean pod 19B or seed 19C and present at the system for scanning tag 18 (step 55) to search the system's databases to identify a seed request or order for the particular seed presented. It should be noted that in most cases, soybean plants will be selected and presented at the machine for scanning tag 18. However, the present invention contemplates that both soybean pods 19B and soybeans 19C could be presented at the system for scanning a tag associated with each in the case where the seed and pods have been separated from the plant. Anytime a label is scanned or entered into the system 10, the system will attempt to identify a seed delivery request matching the particular soybean plant that was selected and scanned into the system.

3. Automated Processing Stations a. Thresher

If soybean plant 19A is desired (and validated) to be thrashed and processed further, the steps in the flowchart illustrated in FIGS. 2A-2D after step 56 could be followed. If a seed delivery request is identified matching the soybean plant 19A presented at system 10, the operator is instructed to insert the plant 19A into thresher 28 (step 57A). If, instead of soybean plant 19A or soybean pod 19B being presented at system 10, soybean seeds 19C are presented at system 10 the threshing step may be skipped entirely and soybean seed 19C poured directly into spiral separator 30 (step 57B). Thus, in the case where the seed has already been separated from all the plant parts and no threshing is required, soybeans 19C may be moved directly into spiral separator 30. However, in most instances soybean plants or pods will be presented at the system 10 which will require threshing to separate the soybean seed from any unwanted plant parts.

Thresher 28 (e.g., Model No: BT-14 by ALMACO, Nevada, Iowa) functions to thresh soybean plant 19A or pods 19B. A variety of threshers are commercially available, such as the ALMACO thresher referenced previously. Once soybean plant 19A is validated (after tag 18 is scanned and computer 14 validates), the soybean plant 19A is loaded into a feed chute associated with thresher 28. Thresher 28 is turned on or initiated and runs by providing power to thresher 28 conveyor motors as illustrated in FIGS. 16-17 from power supply 165 shown in FIG. 18. One or more electronic stops, operating alone or in combination with electronic stop relays 166, may be used to control distribution of electrical power, including the appropriate voltages and amperages to the various electrically operated stations or subsystems of system 10 (FIGS. 18 & 20). Thresher 28 is controlled by an electronic control (EC1) in communication with controller 12 via a network, such as an Ethernet network, (indicated diagrammatically by reference number 46). Thresher 28 may also include one or more safety sensors (ES1), such as finger sensor 167 shown in FIG. 24 or plant sensor shown in FIG. 25, for ensuring safe operation of thresher 28. The finger sensor may be positioned or mounted at or near the input of feed chute 26 where soybean plants or pods are feed into thresher 28.

Soybean plant 19A is manually fed into feed chute 26 at the input of thresher 28. Thresher 28 utilizes a rasping motion produced by two belts running in opposing directions at different speeds. Using the functionality of thresher 28, the soybeans are separated from unwanted plant parts. Non-seed or unwanted plant parts (e.g., leaves, pod, stalk, etc.) can be discharged via a conveyor or discharge chute to be discarded or otherwise used. The soybean seed 25 separated from unwanted seed parts are collected within a collection chute 39 at the output of thresher 28 and accumulated at the termination point of collection chute 39 (step 58). Computer 14 determines if the system is free to proceed (step 59). If the threshing cycle (step 60) is complete the system is okay to proceed (step 61). If the system is not free to proceed the operator is instructed to check alarm status (step 62) of system 10 provided to operator on display 13. The operator then may troubleshoot thresher 28 to ascertain the reason for the alarm. At this point, the operator may inspect the seed at the collection point where the seed is accumulated in collection chute 39 of thresher 28 to decide if the seed should be discarded (step 63). A gate 43 at the end of collection chute 39 as shown generally in FIGS. 7B & 10 may be opened by electrical instruction from controller 12 (see FIG. 19) provided to an electrically controlled pneumatic actuator (PN1). The pneumatic actuator (PN1) is in communication with pneumatic valve 176 shown in FIG. 36 via pneumatic supply lines 50B-C. Depending upon the position of pneumatic valve 176, gate 43 may be operated to an open or closed position. Upon actuation of gate 43, seed accumulated in collection chute 39 may be discarded or otherwise used. If it is desired that seed be kept, line vac (LV1) (e.g., Model 6063, from ExAir, Cincinnati, Ohio) is activated by controller 12. Line vac (LV1) (shown in FIG. 1 and FIGS. 7B & 10 is driven by solenoid controlled compressed air and causes the threshed soybean seed to be pulled from the collection chute 39 into air tube 29 which in-turn is then conveyed to cyclone/diffuser 113 at the top of spiral separator 30 (step 64). Conveyance path 17 shown in FIG. 10 illustrates air tube 29 for communicating seed from thresher 28 to spiral separator 30. As previously indicated, line vac (LV1) is positioned at or near inlet 27 of air tube 29 used for communicating seed to outlet 31 at the top of separator 30 into cyclone 113. The inlet 27 of air tube 29 is positioned near the bottom of collection chute 39 where seeds from thresher collect when gate 43 is closed. Line vac (LV1) is in communication with pneumatic supply lines 50A connected to pneumatic valve 169 (shown in FIG. 33) operated by controller 12.

Preferably, air tubes in system 10 are clear PVC food grade tubing, some with reinforcing spiral to maintain roundness (sizes approximately 1⅓ inch I.D., 1½ inch I.D., available from McMaster-Carr of Illinois). Such tubing is flexible and makes it easy to install and allows the operator to visually inspect the lines during operation and for troubleshooting system 10. Tubing may also be braided sleeving. For example, in the case where it's desirable to bleed-off air pressure from tubing, braided sleeving may be used to connect various components of system 10. An aspirator, such as an air jet (AJ1) may optionally be placed at the outlet of thresher 28 or integrated into thresher 28 to help aspirate the seed as it leaves thresher 28. In one embodiment, air jet (AJ1) may be configured as a sensor blow off (see FIG. 30) to remove debris from plant sensor shown in FIG. 25. Air jet (AJ1) could also be positioned at thresher 28 to assist in removing dirt, debris, or otherwise assist in separating non-seed or unwanted plant parts from soybean seed 25.

b. Spiral separator

Upon conveyance of seed 25 through air tube 39 into spiral separator 30 (step 65) seed 25 begins its decent down the spiraled flutes 108 to collection chute 109 at the end of spiraled flutes 108. Spiral separator 30 (e.g., Gravity Spiral Seed Cleaner, from H & T Sheet Metal Mfg., Inc., Humnoke, Ark.), as best illustrated in FIG. 9, separates unwanted seed and dispenses the unwanted seed through the center of spiraled flutes 108 into a discarded seed collection point 107. The non-round seed descending through separator 30 does not gain sufficient momentum traveling down the spiraled flutes 108 of spiral separator 30 such that the seed never makes it to collection chute 109 before being captured and communicated through the center of the spiraled flutes 108 into the unwanted seed collection point 107. Spiral separator 30 is of the type that is commercially available and known in the art to provide the aforementioned functions. The present invention contemplates that seed 25 passing through spiral separator 30 may be aspirated throughout the process to remove residual material, such as non-seed material passed through air tube 39 from thresher 28. For example, spiral separator 30 may include one or more air jets (AJ2 . . . n) that blow across seed 25 descending through spiral separator 30. In the preferred form, the air jets (AJ2 . . . n) are positioned along the outer side walls of spiraled flutes 108 and directed at an angle toward spiraled flutes 108 such that debris or non-seed material is separated from seed passing along the spiraled flutes to collection chute 109 where seed 25 is accumulated (step 67). The air jets (AJ2 . . . n) are preferably in pneumatic communication and receive charges of air from manifold 175 shown in FIG. 31. The air jets (AJ2 . . . n) may also be cycled by controller 12 to clean out and remove any unwanted debris left in the spiraled flutes 108 between each cycle. Optionally, separator 30 may include a pneumatically actuator 111 (PN2) (similar to PN1) for operating a gate 112 at the bottom of collection chute 109 for discarding seed (step 66). The pneumatic actuator 111 (PN2) is preferably in pneumatic communication via pneumatic supply line 110 with a pneumatic system of the present invention, such as pneumatic valve 176 (shown in FIG. 39). Thus, using one or more of the pneumatic auxiliary valves (such as valve 176 shown in FIG. 39) any one or more pneumatic actuators may be added to system 10. Seed collected in the collection chute 109 may be discarded through gate 112 or moved through inlet 34 of air tube 33 for continued communication onto the seed counter 36. Alternatively, controller whether automatically or by manual instruction from manual operations screen of GUI 178 illustrated on display 13 shown in FIG. 53 operates pneumatic actuator 111 (PN2) to open gate 112 to release seed from system 10. Upon actuation of gate 112, seed accumulated in collection chute 109 may be discarded or otherwise used. At the completion of the cycle for the spiral separator 30, system 10 determines if the spiral separator cycle is complete (step 69), and if not, alerts the operator with an alarm (step 71). If it is desired that seed be kept and system 10 is okay to proceed (step 70), line vacs (LV2 & LV3) (e.g., Model 6063, from ExAir, Cincinnati, Ohio) are activated by controller 12 (step 72). Line vacs (LV2 & LV3) (best illustrated in FIG. 12 showing conveyance path 116) are controlled by pneumatic valves 176 shown in FIGS. 29 & 37) by receiving compressed air communicated via pneumatic supply lines 24, 182, which causes the soybean seed to be pulled from the collection chute 109 into air tube 33, which in-turn is conveyed to cyclone/diffuser 136 at the top of spiral separator before counter 36 (step 72). The seed continues through air tube 33 from cyclone/diffuser 136 into inlet 119 of seed counter 36.

c. Counter

Upon cycling line vacs (LV2 & LV3) (see also FIGS. 29 & 37) seed within air tube 33 is communicated from collection chute 109 into inlet 34 of air tube 33 (step 72). As best illustrated in FIG. 12 showing conveyance path 116, seed communicated through air tube 33 passes through cyclone or diffuser 136 and continues on through air tube 33 and exits air tube 33 at the outlet 119 into seed counter 36. Line vacs (LV2 & LV3) are in pneumatic communication with the pneumatic system via pneumatic supply lines 24, 182 as shown in FIGS. 12, 29 and 37. Operation of line vacs (LV2 & LV3) are controlled by pneumatic valves 169 receiving instructions from controller 12. If by observation or indication from a sensor it is determined that some seed still resides within air tube 33, system 10 by manual or automatic instruction may cycle line vacs (LV2 & LV3) again to move any remaining seed or debris through air tube 33 from spiral separator 30 into seed counter 36.

Seed counter 36 is shown specifically in FIGS. 11A-E and is configured to provide single seed handling and quantification to ensure that the number of seed requested (step 75) in the seed request or order (step 76) matches the number of seed counted (steps 73). The present invention could include for a seed counter any commercially available counter. Preferably, the seed counter is of the type shown and described in FIGS. 11A-E. As best illustrated in FIG. 11C, seed passes through the outlet 119 of seed tube 33 into housing 118 of seed counter 36 covered at least partially by a screen 130. Seed counter 36 is mounted preferably to seed packager 37 so that housing 118 is at an angle whereby seed collected within housing 118 is urged by gravity toward seed disk 126. Seed disk 126 is an annular disk of minimal thickness (i.e., adequate thickness to provide sufficient depth for forming a cavity for carrying a seed) having seed apertures 127 disposed about a radius nearly coincident with the outer peripheral edge of seed disk 126. Seed disk 126 is attached to shaft 129 connected to motor 123. Counter motor 123 is in electronic communication via (EC2) with controller 12 as illustrated in FIG. 41. Instructions from controller 12 received via electronic control (EC2) actuates motor 123, which in-turn causes shaft 129 to rotate, which in-turn imparts rotation to seed disk 126. As seed disk 126 is rotated, a single soybean seed is captured, singulated from other seed in the batch/set, handled by aperture 127 in seed disk 126 and passed through dispensing aperture 133 in gate 131 into seed receiving port 128 when the gate is in the position shown in FIG. 11E. Each soybean seed released from aperture 127 through dispensing aperture 133 into seed receiving port 128 is counted by a seed counter sensor (ES2) in electronic communication with controller 12 as illustrated in FIG. 26. Seed counter sensor (ES2) is preferably a photosynthetic radiation device, such as an on/off type device to account for debris within housing 118. In one embodiment, sensor (ES2) calibrates or uses a trigger sequence that includes emitting a light beam to take a reading to create a set-point based on the environment. As the sensor or environment dirties, the sensor continues to adjust the set-point a little below the reading. If needed, the sensor continues to lower the set-point to account for the environment or sensor becoming dirty. The sensor could include, but is not limited to, a sonar-based sensor, a vision-based sensor or a pneumatic-based sensor. Counted seed remains in air tube 35 until line vac (LV4) is actuated. When line vac (LV4) is actuated, soybean seed is pneumatically communicated through air tube 35. As seed counter sensor (ES2) counts the seed passing through seed receiving port 128, the total count of seed is continually monitored and updated until the requested seed count is met (seed count matches the number of seed requested or ordered) (step 74). In the case where the number of seed exceeds the number of seed requested in the seed request or order, controller 12 provides instruction to seed counter 36 to discard the excess seed (step 80). Unwanted or remaining seed within housing 118 is discarded by actuation of pneumatic actuator (PN3) via instruction from controller 12. Pneumatic actuator (PN3) is connected to the pneumatic system via pneumatic supply lines 121, 122 connected to pneumatic valve 176 receiving instructions from controller 12 to actuate pneumatic actuator (PN3) to an extended or retracted position as best illustrated in FIGS. 11D, 11E and 38. The piston associated with pneumatic actuator (PN3) is attached to gate 131. Gate 131 has a dispensing aperture 133 and a discard aperture 134. Dispensing aperture 133 corresponds and is in communication with seed receiving port 128 and inlet 124 of air tube 35 whereas discard aperture 134 in gate 131 corresponds and is in communication with discard tube 120. With pneumatic actuator (PN3) in the dispensing position shown in FIG. 11E, gate 131 is positioned so that dispensing aperture 133 is in communication with seed receiving port 128 and inlet 124 of air tube 35 whereas the inlet of air tube 120 is blocked by gate 131. When pneumatic actuator (PN3) is in the opposite position as shown in FIG. 11D, gate 131 is positioned so that inlet 124 of air tube 35 is blocked by gate 131 whereas the inlet of air tube 120 is in communication with discard aperture 134 in gate 131 and apertures 127 in seed disk 126. Pneumatic actuator (PN3) may be controlled automatically by automated operations performed by instructions received from controller 12 or from manual input from an operator or user input submitted using graphical user interface 178 of the manual operation screen shown in FIG. 53. Thus, if the seed count is determined to exceed the amount needed (step 74) pneumatic actuator (PN3) may be actuated so that discard aperture 134 in gate 131 is in communication with the inlet of air tube 120 and the apertures 127 in seed disk 126. Seed remaining within housing 118 is picked up by apertures 127 in seed disc 126 and then passed through discard aperture 134 into air tube 120 for discarding (step 80); the system 10 then resets and prepares to run another sample matching the seed request. Alternatively, in the case where the seed count is inadequate, good seed manually picked from discarded seed from spiral separator 30 or thresher 28 may be used to make-up the deficiency in the count (step 79) to match the number of seed requested in the seed request or order. Preferably, deficient seed counts in a seed request are handled by processing another plant. In the case where the seed count matches the number of seed requested in the seed request or order, controller 12 then by automation or manual instruction actuates line vac (LV4) to move seed by vacuum force through air tube 35. Excess seed in housing 118 may be removed from housing 118 before or after line vac Line vac (LV4) receives pressurized air via pneumatic supply lines 125 connected to pneumatic valve 169 controlled by electronic instruction received from controller 12 as shown and illustrated in FIG. 32. For example, in the case where the number of seed within housing 118 of seed counter 136 exceeds the number of seed requested in seed request or order, seed counter 36 may be cycled so that remaining seed within housing 118 may be discarded through discard tube 120 (step 77). Prior to or subsequent to each seed counting event, controller 12 may provide instructions to air jet (AJ3) to provide a burst of air into the seed counter 36 to remove any debris or residual (unwanted matter or material) residing within housing 118. The counter seed assist air jet nozzle (AJ3) as best illustrated in FIG. 40 is in pneumatic communication with the pneumatic system via pneumatic supply line 180 which receives pressurized air by instruction from controller 12 to pneumatic valve 169 (step 86). Before cycling line vac (LV4) controller 12 identifies if nozzle 144 of multi-axis shuttle 141 is in the desired position (step 85). Further, before cycling line vac (LV4), controller 12 determines if the counting cycle is complete (step 82) and whether it is okay to proceed (step 83). If the operator needs to attend to issues or matters relating to the seed counter 36 an alarm notifies the operator or user of the status of seed counter 36 (step 84) so that any issues may be immediately addressed. If the seed counter 36 has run its proper cycle and the number of seed requested in the seed request matches the seed counted, controller 12 determines that it is free to proceed (step 81) and positions nozzle 144 of multi-axis shuttle 141 atop the desired well in container 20A (step 85) after which controller 12 cycles line vac (LV4) to move counted seed to container 20A (step 87), or alternatively another type of container such as envelope 20B or bag 30C.

Positioned between the seed packager 37 and seed counter 36 is a seed distribution manifold 161 controlling distribution of seed in conveyance path 117 as best illustrated in FIGS. 14A-B. Seed distribution manifold 161 allows generally the option of passing seed from seed counter 36 to air tube 35 onto diffuser or cyclone 143 in communication with air tube 148 attached to multi-axis shuttle 141 for distribution of seed into a container through nozzle 144. Alternatively, seed passing through air tube 35 may be communicated through a discard point through air tube 152 for collection. Distribution manifold 161 is configured having a base plate 160 to which a pneumatic actuator (PN4) is attached. Pneumatic actuator (PN4) receives air through pneumatic supply lines 153, 154 in communication with pneumatic valve 176 receiving instruction from controller 12 whereby pneumatic actuator (PN4) is extended and retracted (see FIG. 34). Attached to the piston of pneumatic actuator (PN4) is a slide gate 155 that is actuated (extended and retracted) by pneumatic actuator (PN4). Actuation of slide plate 154 moves apertures 157, 158 in slide gate 155 into communication with aperture 159 in base plate 160 depending upon the position of slide gate 155. Aperture 159 in base plate 160 is in communication with outlet 137 of air tube 35. Aperture 159 and base plate 160 may include a male nipple attached to base plate 160 and in communication with aperture 159 for connecting outlet 137 of air tube 135 to base plate 160. Slide gate 155 includes an exchange plate 156 with the aforementioned apertures 157, 158. Like base plate 160, male nipples may be connected to exchange plate 156 for providing attachment of air tubes to exchange plate 156 and further providing communication of seed through apertures 157, 158. Attached to the nipple corresponding with aperture 158 in exchange plate 156 is air tube 152. Air tube 152 is provided for communicating seed to a discard point. Another nipple corresponding with aperture 157 in exchange plate 156 is provided whereby air tube 149 may be connected to exchange plate 156 so that air tube 149 is in communication with aperture 157 in exchange plate 156. Air tube 149 is in communication with diffuser or cyclone 143. By actuation of pneumatic actuator (PN4) slide gate 155 may be moved across base plate 160 so that either aperture 157 with corresponding connected air tube 149 or aperture 158 with corresponding air tube 152 may be connected or brought into communication with aperture 159 attached to corresponding air tube 35. For example, if in the case where the number of seed counted by seed counter 36 is inadequate (the number of seed does not meet the number of seed requested in the seed request or order), the entire batch of seed may be discarded through air tube 152 by actuating pneumatic actuator (PN4) to move aperture 158 in exchange plate 156 in communication with aperture 159 in base plate 160 whereby seed passing through seed tube 35 is able to be communicated through distribution manifold 161 into air tube 152 to be discarded. Furthermore, in the case where the seed count has been met but a number of seed still reside within housing 118 of seed counter 36, the residual seed residing within housing 118 of seed counter 36 may be moved through air tube 35 in communication with discard tube 152 to a discard point. If the seed count is found to be adequate (matching the number of seed requested in the seed request or order) pneumatic actuator (PN4) is actuated by controller 12 and moved to a position whereby aperture 157 in exchange plate 156 is brought into communication with aperture 159 in base plate 160 whereby seed communicated through air tube 35 is further communicated through air tube 149 and onto seed packager 37 for packaging (step 87).

d. Seed Packager

FIGS. 13A-E illustrate seed packager 37 according to an embodiment of the present invention. Seed packager 37 consists generally of a cabinet body 140 having a control panel 162 with an upper working surface supporting multi-axis shuttle 141. Multi-axis shuttle 141 is configured to move relative to positioners 142 adapted to hold one or more seed containers, such as container 20A shown in FIG. 7A. Multi-access shuttle 141 is attached to nozzle 144 whereby movement in the X and Y direction of shuttle 141 causes movement of nozzle 144 in corresponding X and Y directions. A pneumatic actuator (PN4) provides movement of nozzle 144 in the X direction. Pneumatic actuator (PN4) is retracted and extended as air is communicated to it through pneumatic supply lines 150, 151 from pneumatic valve 176 receiving instructions from controller 12 as illustrated in FIG. 34. Pneumatic actuator (PN4) is attached to slide plate 181 which in-turn is driven in the positive and negative Y directions by motor 147 receiving instructions via electronic control (EC3) from controller 12 according to the embodiments illustrated in FIGS. 41-49. Thus, controller 12 providing instructions to pneumatic actuator (PN4) and motor 147 via electronic control (EC3) moves nozzle 144 in the positive and negative X and Y directions to position nozzle 144 relative to a container positioned on top of cabinet 140 using positioners 142. Slide plate 181 is shuttled back and forth in the positive and negative Y direction following guide track 145. Slide plate 181 may be connected and driven by a motor 147 via a chain or belt or other means known in the art. Electronic sensors (ES4 and ES5) positioned along guide track 145 provide feedback to controller 12 regarding the position of slide plate 181 to thereby control the linear extension and retraction of slide plate 181 along guide track 185. Electronic sensors (ES4 and ES5), such as for example a fiber optic photo sensor, are in electronic communication with controller 12 and motor 147 according to the embodiments illustrated in FIGS. 42, 45 and 46. In a preferred form, seed packager 37 has an upward facing surface configured to receive a multi-well container or tray of the type illustrated in FIG. 1, such as tray 20A. Positioners 142 control position of container when rested on top of cabinet 140 (see FIG. 7A). A tray sensor, such as electronic sensor (ES3A) is in electronic communication with controller 12 to provide feedback when the tray is present and properly positioned relative to positioners 142 atop cabinet body 140. Tray sensor (ES3A) is in electronic communication with controller 12 of system 10 according to the embodiment illustrated and shown in FIG. 27. As container 20A illustrated in FIG. 1 has multiple wells, a sensor positioned relative to positioners 142 provides feedback to controller 12 of system 10 to monitor the position of nozzle 144 relative to the individual wells within the multi-well container 20A. Well sensor (ES3B) is in electronic communication with controller 12 of system 10 according to an embodiment shown and illustrated in FIG. 42. Thus, before seed is communicated from counter 36, pneumatic actuator (PN4) and motor 147 via control from electronic control (EC3) move nozzle 144 of multi-access shuttle 141 to the desired well within container 20A for filling the well with the batch of seed associated with the current seed request or order being processed. For example, depending upon the desired position for the batch or set of seed associated with each seed request in wells of container 20A, system 10 may direct via controller 12 that one batch be positioned in column 1, row 1, and another batch be positioned in column 1, row 3 or column 3, row 1, so on and so forth (supra discussion on page 25). In this manner, each seed request or order in the associated batch of seed for each seed request or order are positioned within a well of container 20A according to desired batch position relative to container 20A as illustrated in FIGS. 51A-B. In the case where the well of container 20A located at row 1, column 1 is desired to receive a certain seed request or order, nozzle 144 is positioned over top the well (step 85) and line vac (LV4) is cycled (step 86) via control of controller 12 so that the batch seed counted to match the seed request or order is communicated from counter 36 through air tubes 35, 149 and 148, out nozzle 144 into the desired well in container 20A (step 87). System 10 then determines at this point if all the seed in the batch has been communicated to the desired well in container 20A (step 89). If there is an error or it is not okay to proceed (step 90) the user or operator is alerted by an alarm (step 91), preferably via display 13, to indicate to the operator or user the concern or error that has occurred. For example, if a portion of the batch or set of seed was not communicated through nozzle 144, controller 12 may actuate line vac (LV4) to cycle another time to communicate the remainder of the seed from seed counter 36 through nozzle 144 of multi-access shuttle 141 into the desired well in container 20A. Further, the user or operator may manually control operation of system 10 via a graphical user interface at display 13, such as manual operations screen shown in FIG. 53. If system 10 identifies that it is okay to proceed with processing of the mixed batch (step 88), assuming more than one batch of seed is to be included in container 20A, system 10 repeats the process of presenting a plant 19A at the input chute of thresher 28 for processing by system 10 wherein the appropriate number of seed corresponding with the seed request or order is counted by seed counter 36 and communicated to seed packager 37 through nozzle 144 and into the desired well in container 20A. Each seed order or request may include one or more plants to be processed so that container 20A may include X number of seed from one plant in one well and Y number of seed from another plant in another well until the seed request or order is completely filled (see also FIGS. 54A-B).

e. Labeler

If system 10 detects that it is free to proceed (step 88), instructions are given to label printer 42 (step 94) from controller 12 to print and apply a label 22 to container 20A. The label may be applied by automation or manually by the operator or user. If box 44 in which container 20A needs to be shipped is ready to send out (step 95), label printer 42 may print a label 45 to be placed on box 44 to provide shipping details for box 44 (step 96). Databases associated with system 10 are updated with information regarding each seed request or order processed, such as seed type, seed count, package type, seed packing arrangement, number of plants processed in the package, date and time information for when the seed request or order is processed, seed requesting location, etc. (step 97). The aforementioned information may be stored in one or more of the databases of system 10 by scanning labels 22, 45 associated with container and shipping box (step 98 and 99) before loading container 20A into shipping box 44. Upon electronic or manual recordation of the aforementioned information, container 20A is loaded into shipping box 44 (step 100) and shipped to the requesting location (step 101).

As shown in FIGS. 1 and 6, a label printer 42 (e.g. Model 105SE from Zebra, Vernon Hills, Ill.), controlled by PC 14 and/or controller 12, could print and apply a bar-coded label with desired information to container 20A.

The information on label 22, and a corresponding database, could be in the form of Table 2.

TABLE 2

Entries Table

| Database field | Data |
|---|---|
| Field 1 | search barcode:_____ |
| Field 2 | weight:_____ |
| Field 3 | seed request number:_____ |
| Field 4 | seed count:_____ |
| Field 5 | requesting location:_____ |
| Field 6 | box ID:_____ |
| Field 7 | process time & date:_____ |
| Field 8 | duplicate sample:_____ |
| Field 9 | duplicate sequence number:_____ |
| Field 10 | seed packaging arrangement:_____ |
| Field 11 | contact e-mail:_____ |
| Field 12 | <user defined> (as many fields as needed) |

Other information, of course, can be contained in such database tables, including specific test plot identification and location, seed inventory number(s), experiment number(s), etc.

PC 14 and/or controller 12 can use a program to match up certain columns in its local database 37 with what is desired to be printed in label 22. For example, commercially available program Bar Tender from Seagull Scientific, Inc. of Bellevue, Wash. can be used for this purpose. It makes it easy to format the label relative the database. Therefore, other or different information could be printed on label 22, as desired. Normally, label 22 will always have a unique ID of the sample that can be correlated to the local and/or central database.

Label could be part bar code and part human readable. For example, it could contain special information such as warnings, that would be human readable. One example is that it could explicitly state that the contents of the package contain genetically modified seeds, which have to be handled carefully.

Software of system 10 thus creates a label for each validated sample that arrives at and is ready for packaging. Printer 42 can also create a box label 45 for box, which would essentially be a packing label for box 44, listing by some identification, everything to be placed in box 44. Also, because weight of each sample is known (along with weight of the empty bags), system 10 can accumulate total weight for multiple packaged samples and alert the operator when a total weight threshold is reached (for example, certain air freight or overnight air express companies have a maximum weight limit per box.

As shown in the Figures, and described herein, system 10 presents a combination of apparatus that can receive soybean plant 19A, automatically processes it, counts and packages seed into containers. Within system 10, components autonomously move the soybean plant and/or seed from station to station. Additionally, system 10 instructs each station and the conveying components to perform their respective operations.

Additionally, as illustrated at FIG. 1, one or more automatic message can be generated and sent (e.g. via an email server such as are known) by system 10 after processing of a sample. For example, PC 14 and/or controller 12 could use an application such as Microsoft Outlook and its MAPI function to automatically send emails to a designated person(s) notifying them of the date a certain seed request or order had been processed and its count, and intended delivery date and time. Such persons thus are notified what to expect. The requesting location or person of the seed request or order could be a key contact for the experiment, a customer/client of the plant breeder, or in-house personnel. System 10 can evaluate whether the sample meets a request from the central database. Other information or uses of the information about samples in system 10 of course are possible. Automatic facsimile, paging, or other notifications are possible.

F. Option, Alternatives, and Features

The included preferred embodiment is given by way of example only and not by way of limitation to the invention which is solely described by the claims herein. Variations obvious to one skill in the art will be included within the invention defined by the claims.

For example, system 10 could be configured to provide just one or just a couple of functions. Use of only the seed counter and packager alone (assuming good seed is delivered having been separated from all plant parts) will decrease labor and increase throughput.

Or, some functions could be eliminated or combined. For example, sometimes the threshing function may not be necessary. By way of another example, threshing and separating might be combined into one station.

Computer 14 and controller 12 might be combined into one station, device or processor.

The ability to automate all or part of the process can be combined with the automated labeling and bar code scanning processes to keep control of inventory and shipping.

Alternatives to bar codes on tags or labels could possibly be used. One example is radio frequency (RF) identification or tags, such as are commercially available. Any type of digitizable ID that can be machine read may be possible.

Separator 30 could be a vision sorter using machine vision to determine size and/or shape of individual seeds and accept or discard them based on programmed parameters. Machine vision could also perform the counting function.

System 10 can include automatic dust collection. Using the ability to create vacuum, system 10 could vacuum up dust or lighter debris in system 10 and discharge it, or convey it to a discard bin.

System 10 could also be configured to run a clean out or unload cycle using aforementioned air jets or other systems. System would run a conventional sequence of processes but without a sample to clean out lingering debris or seeds from system 10.

System 10 could optionally be used for any of its functions. For example, it could be used for a seed counter alone Likewise, just for any of the other functions, or, for any combination of functions.

Alternative conveyors could be used in place of the pneumatic conveyors. Examples might include bucket conveyors or augers. Others are possible.

Optionally, sensors could be used at locations throughout system 10 to detect the presence of a sample and be used by controller 12 to process each sample, as opposed to using primarily timing to control conveyance and operations of each station on a sample.

System 10 could also be programmed to automatically adjust the settings of various stations based upon monitoring of what occurs with a sample at a first station, or based on information in the harvest tag. For example, if the time to thresh a seed request were measured at thresher 28, system 10 could be configured to change its timing for succeeding stations based on threshing time, and further, even the time required for performing the spiral separation function. If a relatively long threshing or separating time is observed, system 10 would assume a relatively large sample quantity and perhaps lengthen the time between running batches in each of the seed request(s) or order(s).

The concept of tracking individual sets of seed or samples associated with each seed request or order through system 10 can be used to maintain spatial separation of one batch of seed from other batches of seed, whether associated with the same or different seed request or order. One can establish, by empirical testing, a timing regime wherein each batch of seed associated with a seed request or order has a certain amount of time in or at each station of system 10. Because actuated line vacs (LV1 . . . n) control when seed can move in and out of each station, controller 12 can keep track of where each batch of seed is at in system 10. Empirical testing for a given type and/or volume and/or characteristics of seed can reveal how much time is needed in each station for the batch of seed corresponding to a seed request to be completely processed. Controller 12 can be programmed to give that amount of time, or perhaps a little more, for its relevant station, before letting the next set of seeds or sample to begin entry into that station. Thus, system 10 can be programmed in a timing regime in a manner which has shown to allow acceptable processing with clean out for each station until a succeeding sample is allowed to progress into that station. The amount of time should be minimized while maintaining sufficient time to ensure reliable completion of processing and clean out. Thus, even without position sensors, spatial separation of plural seed samples progressing through system 10 can be maintained.

What is claimed is:

1. An apparatus for automated processing of sets of seed for use in plant breeding programs, the apparatus comprising:
   an identification system configured to match identification information associated with previously harvested seed with a seed request order;
   a single seed counting system configured to autonomously quantify sets of seed to fill the seed request order, wherein the single seed counting system comprises a seed receiving port and a seed counter sensor, wherein the single seed counting system is configured to singulate each respective seed from other seed and individually deliver each singulated seed to the seed receiving port, wherein the seed counter sensor is configured to individually detect each singulated seed, and wherein the single seed counting system is further configured to selectively discard seed received through the seed receiving port and detected by the seed counter sensor;
   a packaging system providing ordered separation of one set of quantified seed from other sets of quantified seed by packaging the seed request order; and
   a controller positioned in operative communication with the single seed counting system,
   wherein the controller is configured to automatically instruct the single seed counting system to discard seed above a target seed count from the seed request order.

2. The apparatus according to claim 1 wherein the seed request order is:
   a. submitted over a network from a seed requesting location;
   b. manually entered at the apparatus; or
   c. electronically entered at a location remote to or at the apparatus.

3. The apparatus according to claim 1 further comprising a separation system for autonomously separating seed from unwanted plant parts.

4. The apparatus according to claim 3 wherein the separation system comprises a thresher for separating the seed from its plant or plant parts.

5. The apparatus according to claim 1 further comprising a sorting system for autonomously sorting seed based on characteristics automatically non-destructively sensed from the seed.

6. The apparatus according to claim 5 wherein the sorting system comprises a spiral separator for sorting desired seed from a set of seed being processed.

7. The apparatus according to claim 1 further comprising a pneumatic conveyance system for communicating seed:
   a. from the identification system to the single seed counting system; and
   b. from the single seed counting system to the packaging system.

8. An apparatus for automated processing of soybean seed comprising:
   i. a conveyance path comprising:
      a. an input adapted for receipt of a soybean plant, a soybean pod, and/or soybean seed;
      b. an output adapted to provide quantified, packaged soybean seed;
   ii. the apparatus further comprising a soybean seed processing station between the inlet and outlet, said soybean seed processing station comprising:
      a. a sorting station for autonomously sorting soybean seed based on characteristics automatically non-destructively sensed from the seed;
      b. a counting station for counting sets of soybean seed by a single seed quantifier, wherein the counting station comprises a seed receiving port and a seed counter sensor, wherein the counting station is configured to singulate each respective seed from other seed and individually deliver each singulated seed to the seed receiving port, wherein the seed counter sensor is configured to individually detect each singulated seed, and wherein the counting station is further configured to selectively discard seed received through the seed receiving port and detected by the seed counter sensor; and
      c. a packaging station for compartmentalizing quantified sets of soybean seed within a container for delivery to a seed requesting location; and
   iii. a controller positioned in operative communication with the counting station,
      wherein the controller is configured to automatically instruct the the counting station to discard seed above a target seed count.

9. The apparatus according to claim 8 wherein the sorting station comprises at least one of:
   a. a soybean thresher;
   b. a spiral separator;
   c. an aspirator and screen combination.

10. The apparatus according to claim 8 wherein the single seed quantifier comprises autonomous single seed counting of each soybean seed.

11. A seed processing apparatus providing automated submission and filling of seed delivery requests for use in plant breeding, the seed processing apparatus comprising:
   a seed identification means for matching an identity of previously harvested seed with a seed delivery request;
   a seed sorting means for autonomously separating and sorting seed from unwanted seed and/or plant parts based on distinguishing characteristics automatically non-destructively sensed from each seed;

a single seed counting means for quantifying sets of seed from retained seed by singulating each respective seed from other seed and individually delivering each singulated seed to a seed receiving port, wherein the single seed counting means comprises a seed counter sensor configured to individually detect each singulated seed, and wherein the seed counting means is configured to selectively discard seed received through the seed receiving port and detected by the seed counter sensor;

a seed packaging means for compartmentalizing counted sets of seed from subsequent counted sets of seed within packaging for delivery to a seed requesting location; and a controller positioned in operative communication with the the single seed counting means, wherein the controller is configured to automatically instruct the single seed counting means to discard seed above a target seed count from the seed request order.

12. The apparatus according to claim 11 wherein the seed identification means comprises at least one of:

a. manual matching of previously harvested seed with identity of seed in a seed delivery request; or b. automated matching of previously harvested seed with identity of seed in a seed delivery request.

13. The apparatus according to claim 11 wherein the single seed counting means comprises a disc with apertures providing singulation of seed within each aperture for quantification by the seed counter sensor.

14. The apparatus according to claim 11 wherein the seed packaging means comprises a shuttlable nozzle moveable relative to a seed container, whereby sets of seed are compartmentalized within the seed container commensurate with an instruction in the seed delivery request for delivery of the seed container to the seed requesting location.

* * * * *